United States Patent [19]

Hotta et al.

[11] Patent Number: 5,342,257
[45] Date of Patent: Aug. 30, 1994

[54] PLANETARY GEAR TRANSMISSION

[75] Inventors: Takashi Hotta; Yukio Morita; Yoichi Kojima; Kimihiko Kikuchi; Tsunefumi Niiyama; Yorinori Kumagai; Hiroshi Nakayama, all of Saitama, Japan

[73] Assignee: Honda Giken Kogyo Kabushiki Kaisha, Tokyo, Japan

[21] Appl. No.: 121,670

[22] Filed: Sep. 15, 1993

Related U.S. Application Data

[63] Continuation of Ser. No. 757,005, Sep. 9, 1991, abandoned.

[30] Foreign Application Priority Data

Sep. 14, 1990 [JP] Japan .................... 2-245167

[51] Int. Cl.$^5$ ............................................ F16H 3/62
[52] U.S. Cl. ................................ 475/275; 475/276; 475/277; 475/278; 475/280
[58] Field of Search ................ 475/275, 276, 277, 278, 475/280

[56] References Cited

U.S. PATENT DOCUMENTS

| | | | |
|---|---|---|---|
| 3,946,624 | 3/1976 | Murakami et al. | 475/280 X |
| 4,038,888 | 8/1977 | Murakami et al. | 475/276 OR |
| 5,007,887 | 4/1991 | Asada | 475/280 X |
| 5,071,398 | 12/1991 | Hotta et al. | 475/276 OR |

Primary Examiner—Leslie A. Braun
Assistant Examiner—Daniel Wittels
Attorney, Agent, or Firm—Lyon & Lyon

[57] ABSTRACT

A planetary gear transmission typically for use on automobiles has first, second, and third planetary gear trains arranged coaxially with each other and each having elements including a sun gear, a carrier, and a ring gear. Two of the elements of each of the first, second, and third planetary gear trains are directly or disengageably coupled to elements of the other planetary gear trains. The transmission also has three clutch means and two brake means for selectively establishing a power transmitting path from an input shaft to an output gear member through the first, second, and third planetary gear trains. At least one of the first, second, and third planetary gear trains comprises a double-pinion planetary gear train, one of the sun gear and the carrier of the double-pinion planetary gear train being coupled to the input shaft and the other being nonrotatably fixed. The elements of the first, second, and third planetary gear trains are corotatably coupled into first, second, third, fourth, and fifth rotational members in a speed diagram, the third and fifth rotatable members being coupled to the input member, the fourth rotational member being coupled to the output member and. The carrier of the double-pinion planetary gear train may be coupled to the input shaft, and the sun gear thereof may be nonrotatably fixed.

71 Claims, 65 Drawing Sheets

| RANGES | K1 | K2 | K3 | B1 | B2 | RATIOS |
|---|---|---|---|---|---|---|
| LOW | | | ○ | ○ | | 3.577 |
| 2ND | | | ○ | | ○ | 2.100 |
| 3RD | | ○ | ○ | | | 1.400 |
| 4TH | ○ | | ○ | | | 1.000 |
| 5TH | ○ | ○ | | | | 0.711 |
| REV | | ○ | | ○ | | 2.953 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | | R3 | C3 | S3 | 0.39 |

| RANGES | K1 | K2 | K3 | B1 | B2 | RATIOS |
|---|---|---|---|---|---|---|
| LOW |  |  | ○ | ○ |  | 3.577 |
| 2ND |  |  | ○ |  | ○ | 2.100 |
| 3RD |  | ○ | ○ |  |  | 1.400 |
| 4TH | ○ |  | ○ |  |  | 1.000 |
| 5TH | ○ | ○ |  |  |  | 0.711 |
| REV |  | ○ |  | ○ |  | 2.953 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | S2 | R2 | C2 | | 0.43 |
| | G3 | | R3 | C3 | | S3 | 0.38 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | R3 | C3 | | S3 | 0.38 |

| RANGES | K1 | K2 | K3 | B1 | B2 | RATIOS |
|---|---|---|---|---|---|---|
| LOW |  |  | O | O |  | 3.577 |
| 2ND |  |  | O |  | O | 2.100 |
| 3RD |  | O | O |  |  | 1.400 |
| 4TH | O |  | O |  |  | 1.000 |
| 5TH | O | O |  |  |  | 0.711 |
| REV |  | O |  | O |  | 2.953 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | R3 | C3 | | S3 | 0.37 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | S2 | | 0.57 |
| | G3 | | R3 | C3 | | S3 | 0.37 |

| RANGES | K1 | K2 | K3 | B1 | B2 | RATIOS |
|---|---|---|---|---|---|---|
| LOW |  |  | O | O |  | 3.577 |
| 2ND |  |  | O |  | O | 2.100 |
| 3RD |  | O | O |  |  | 1.400 |
| 4TH | O |  | O |  |  | 1.000 |
| 5TH | O | O |  |  |  | 0.711 |
| REV |  | O |  | O |  | 2.953 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | R2 | S2 | | 0.57 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | R2 | S2 | | 0.57 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | S3 | | R3 | C3 | 0.52 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | | R3 | S3 | 0.48 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | C3 | | R3 | C3 | 0.48 |

|  | | ROTATIONAL MEMBERS | | | | | λ |
|---|---|---|---|---|---|---|---|
|  | | 1ST | 2ND | 3RD | 4TH | 5TH |  |
| PLANETARY GEAR TRAINS | G1 | S1 | R1 |  |  | C1 | 0.55 |
|  | G2 |  | S2 | R2 | C2 |  | 0.43 |
|  | G3 |  | R3 | C3 |  | S3 | 0.38 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | | S2 | R2 | C2 | | 0.43 |
| | G3 | | R3 | C3 | | S3 | 0.38 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | R2 | S2 | | 0.57 |
| | G3 | | R3 | C3 | | S3 | 0.37 |

| | ROTATIONAL MEMBERS | | | | | |
|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | C3 | R3 | | S3 | 0.27 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | R2 | S2 | | 0.57 |
| | G3 | | C3 | R3 | | S3 | 0.27 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | C2 | R2 | S2 | | 0.57 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G 1 | C1 | R1 | | | S1 | 0.45 |
| | G 2 | | S2 | R2 | C2 | | 0.43 |
| | G 3 | | | R3 | C3 | S3 | 0.39 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | S2 | R2 | C2 | | 0.43 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | | C3 | R3 | S3 | 0.28 |

|  | | ROTATIONAL MEMBERS | | | | | |
|---|---|---|---|---|---|---|---|
|  |  | 1ST | 2ND | 3RD | 4TH | 5TH | λ |
| PLANETARY GEAR TRAINS | G1 | S1 | R1 |  |  | C1 | 0.55 |
|  | G2 |  | S2 | R2 | C2 |  | 0.43 |
|  | G3 |  | R3 | C3 |  | S3 | 0.38 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | R3 | C3 | | S3 | 0.38 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | R3 | C3 | | S3 | 0.37 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | C2 | R2 | S2 | | 0.57 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | R3 | | S3 | 0.27 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | R2 | S2 | | 0.57 |
| | G3 | | C3 | R3 | | S3 | 0.27 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | S2 | | 0.57 |
| | G3 | | C3 | R3 | | S3 | 0.27 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | S2 | R2 | C2 | | 0.43 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | | R3 | S3 | 0.48 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | S2 | R2 | C2 | | 0.43 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | R2 | C2 | | S2 | 0.37 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | R2 | C2 | | S2 | 0.37 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | R2 | | S2 | 0.27 |
| | G3 | | | C3 | R3 | S3 | 0.27 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | | S2 | 0.27 |
| | G3 | | | C3 | R3 | S3 | 0.27 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | S2 | | R2 | C2 | 0.52 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | | R2 | C2 | 0.52 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | | R2 | C2 | 0.52 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | | R2 | C2 | 0.52 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | | R2 | S2 | 0.48 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | | C2 | | R2 | S2 | 0.48 |
| | G3 | | | R3 | C3 | S3 | 0.39 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | | R2 | S2 | 0.48 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | | R2 | S2 | 0.48 |
| | G3 | | | C3 | R3 | S3 | 0.28 |

Fig. 117

| | | ROTATIONAL MEMBERS | | | | |
|---|---|---|---|---|---|---|
| | | 1ST | 2ND | 3RD | 4TH | 5TH |
| PLANETARY GEAR TRAINS | G 1 | ○ | ○ | | | ○ |
| | G 2 | | ○ | ○ | ○ | |
| | G 3 | | ○ | ○ | | ○ |

Fig. 119
| PLANETARY GEAR TRAINS | ROTATIONAL MEMBERS | | | | |
|---|---|---|---|---|---|
| | 1ST | 2ND | 3RD | 4TH | 5TH |
| G 1 | ○ | ○ | | | ○ |
| G 2 | | ○ | ○ | ○ | |
| G 3 | | ○ | | ○ | ○ |
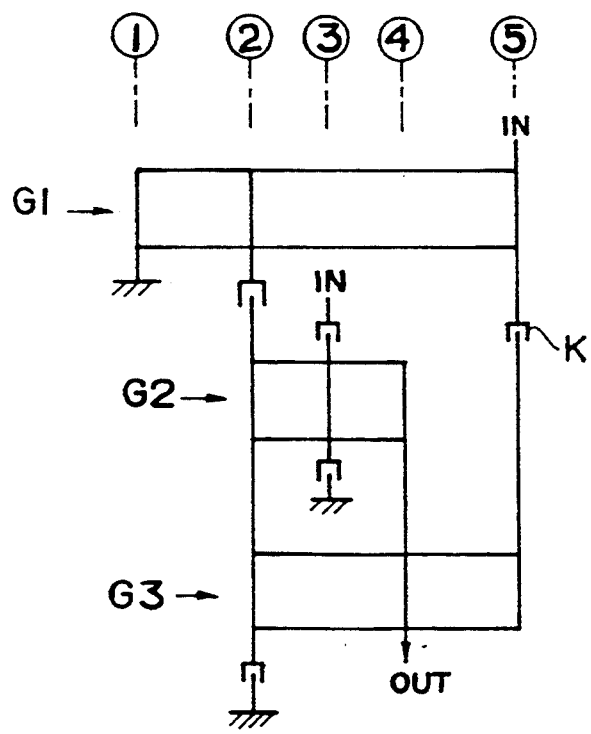
FIG. 120A
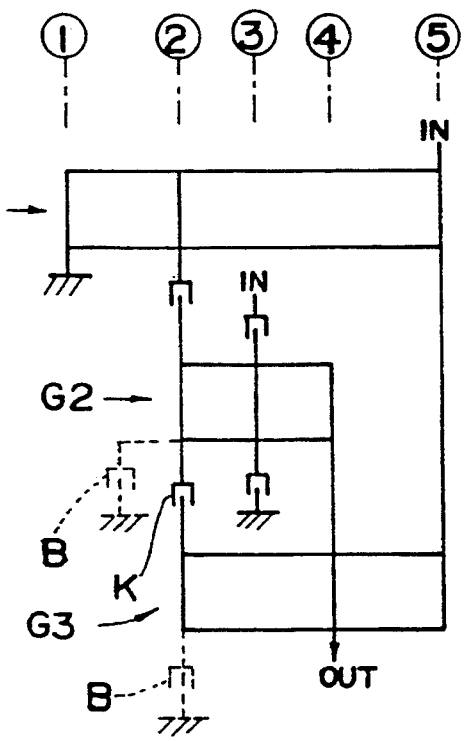
FIG. 120B Fig. 121
| PLANETARY GEAR TRAINS | ROTATIONAL MEMBERS | | | | |
|---|---|---|---|---|---|
| | 1ST | 2ND | 3RD | 4TH | 5TH |
| G1 | O | O | | | O |
| G2 | | O | O | O | |
| G3 | | | O | O | O |
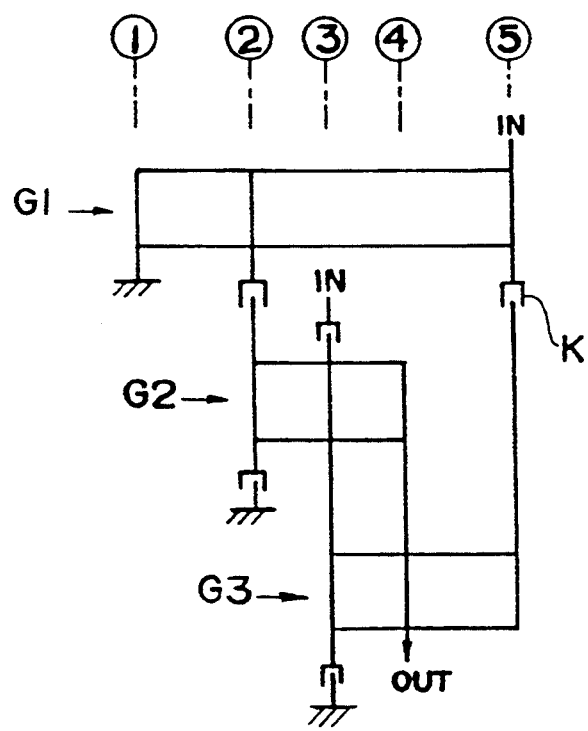
FIG. 122A
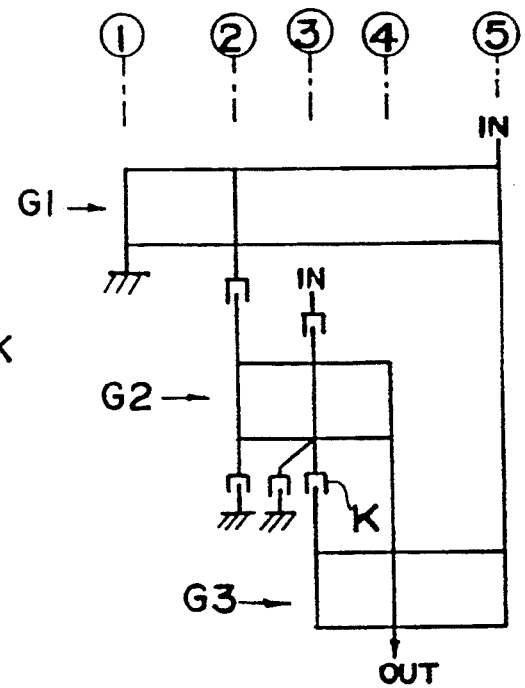
FIG. 122B

| PLANETARY GEAR TRAINS | ROTATIONAL MEMBERS | | | | |
|---|---|---|---|---|---|
| | 1ST | 2ND | 3RD | 4TH | 5TH |
| G1 | O | O | | | O |
| G2 | | O | O | | O |
| G3 | | | O | O | O |

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | | ○ | ○ |
| G3 | | | ○ | ○ | ○ |

PLANETARY GEAR TRANSMISSION

This application is a continuation of application Ser. No. 07/757,005, filed on Sep. 9, 1991, now abandoned.

BACKGROUND OF THE INVENTION

1. Field of the Invention

The present invention relates to a planetary gear transmission which comprises three planetary gear trains with two elements of each of the planetary gear trains being directly or disengageably coupled to elements of the other planetary gear trains.

2. Description of the Prior Art

Planetary gear transmissions are widely used as automatic transmissions for automobiles or the like. Many conventional planetary gear transmissions comprise two planetary gears such as Ravigneaux gear trains, Simpson gear trains, or the like, which are combined with each other, and generally have gear positions up to a fourth forward gear position. To meet demands for more gear positions for improved running characteristics, there have been proposed transmissions having gear positions up to and more than a fifth forward gear position, and some of those proposed transmissions have already been in use.

Transmissions with an increased number of gear positions are disclosed in Japanese Laid-Open Patent Publication No. 63-318349 and Japanese Laid-Open Utility Model Publication No. 61-103654, for example. The disclosed transmissions comprise two planetary gear trains each combined with three clutches and three brakes, and have six forward gear positions and one reverse gear position. Since only two planetary gear trains are employed, the disclosed transmissions may share components with conventional planetary gear transmissions. However, the disclosed transmissions are complex in transmission control because they cannot avoid gearshifts which require two engaging means (a clutch and a brake) to be disengaged and two other engaging means to be engaged at the same time.

For example, when the disclosed transmissions effect a gearshift from the second gear position to the third gear position or a gearshift from the third gear position to the second gear position, it is necessary for the transmission to disengage one clutch and one brake and also to engage another clutch and another brake.

Japanese Laid-Open Patent Publications Nos. 59-222644, 1-320361, and 1-320362, for example, disclose planetary gear transmissions each having three planetary gear trains. In the disclosed planetary gear transmissions, two elements of each planetary gear train are mechanically coupled to elements of the other planetary gear trains, and three or four clutches and three brakes are combined with the planetary gear trains. The disclosed planetary gear transmissions have five forward gear positions and one reverse gear position which can be selected by controlling the operation of the engaging means (i.e., the clutches and the brakes). More specifically, each of the gear positions can be selected by engaging two of the engaging means, and any gearshifts between adjacent ones of the five forward gear positions can be accomplished by disengaging one engaging means and engaging another engaging means. Therefore, controlling the disclosed planetary gear transmissions is relatively simple.

However, the planetary gear transmissions each with three planetary gear trains require many engaging means, i.e., six or seven engaging means, in order to establish the desired gear positions. Use of the many engaging means results in a greater transmission size and a more complex transmission structure, and reduces the power transmitting efficiency of the transmissions due to the resistance presented to rotation by the engaging means. Another problem with the above planetary gear transmissions is that a planetary pinion supported on a carrier rotates at a considerably higher speed than an input member (e.g., at a speed which is five or six times the speed of the input member) in certain gear positions (e.g., LOW and 2ND ranges), and, as a result, the planetary pinion may not be sufficiently lubricated.

SUMMARY OF THE INVENTION

It is an object of the present invention to provide a planetary gear transmission with three planetary gear trains which is capable of establishing an increased number of gear positions.

Another object of the present invention is to provide a planetary gear transmission which can effect a gearshift between two adjacent gear positions by disengaging one engaging means (a clutch or a brake) and engaging another engaging means, for thereby easily controlling gearshifts.

Still another object of the present invention is to provide a planetary gear transmission which has a reduced number of engaging means (clutches and brakes) for establishing gear positions, so that the planetary gear transmission is relatively small in size, simple in structure, and has a relatively high power transmitting efficiency.

A further object of the present invention is to provide a planetary gear transmission with three planetary gear trains whose planetary pinions are not rotated at excessively high speed.

According to the present invention, there is provided a planetary gear transmission comprising an input member, first, second, and third planetary gear trains arranged coaxially with each other and each having elements including a sun gear, a carrier, and a ring gear, two of the elements of each of the first, second, and third planetary gear trains being directly or disengageably coupled to elements of the other planetary gear trains, an output member, and three clutch means and two brake means for selectively establishing a power transmitting path from the input member to the output member through the first, second, and third planetary gear trains, at least one of the first, second, and third planetary gear trains comprising a double-pinion planetary gear train, the sun gear of the double-pinion planetary gear train being coupled to the input member and the carrier being nonrotatably fixed, the elements of the first, second, and third planetary gear trains being corotatably coupled into first, second, third, fourth, and fifth rotational members in a speed diagram, the third and fifth rotatable members being coupled to the input member, the fourth rotational member being coupled to the output member.

The carrier of the double-pinion planetary gear train may be coupled to the input member, and the sun gear thereof may be nonrotatably fixed.

Since only the five engaging means, i.e., the three clutch means and the two brake means, are employed in the above planetary gear transmission, the number of engaging means required is smaller than the number of engaging means in the conventional planetary gear transmission which comprises three planetary gear trains. Therefore, any loss in the transmitted power due to the frictional resistance caused by the engaging means is relatively small, and hence the power transmitting efficiency of the transmission as a whole is improved.

The planetary gear train coupled to the input member may comprise a double-pinion planetary gear train, and the sun gear of the double-pinion planetary gear train may be coupled to the input member and the carrier thereof may be nonrotatably fixed. With this arrangement, the pinion of the double-pinion planetary gear train is prevented from rotating at an excessively high speed. The carrier of the double-pinion planetary gear train may be coupled to the input member and the sun gear thereof may be nonrotatably fixed. This arrangement is also effective to prevent the pinion from rotating at an excessively high speed.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 117–126 are tables showing how elements are coupled into rotational members in the five representative combinations, and diagrams showing skeletons of transmissions with regard to each of the types.

DETAILED DESCRIPTION OF THE PREFERRED EMBODIMENTS

Figures 1, 2:
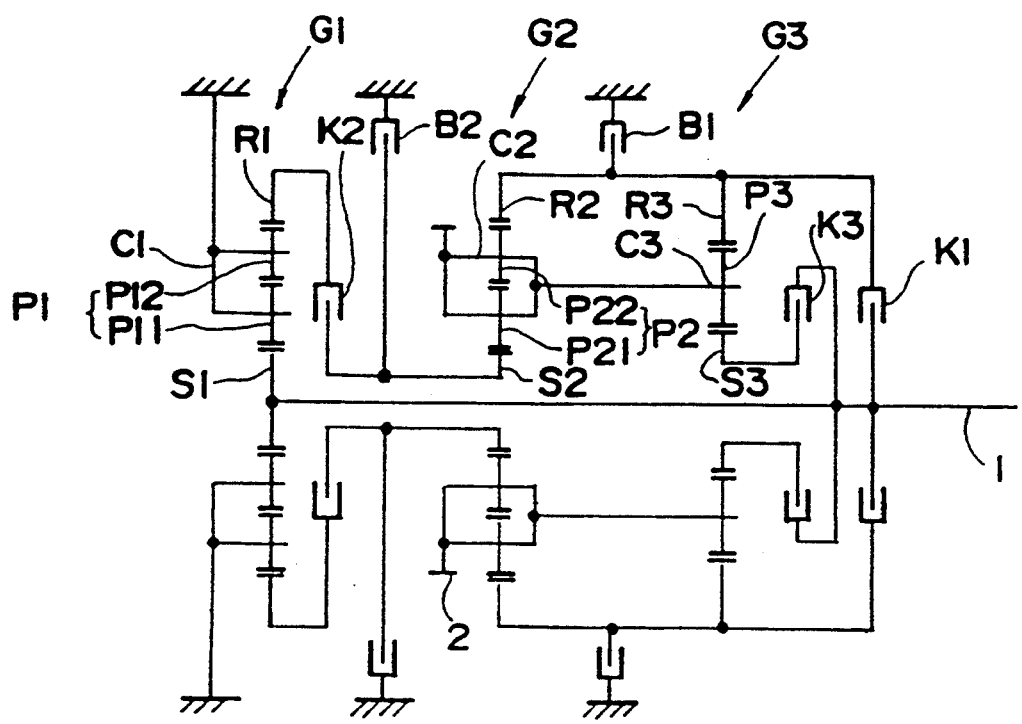
FIG. 1 is a diagram showing a skeleton of a planetary gear transmission according to a first embodiment of the present invention.
FIG. 2 is a table showing the relationship between gear ranges, engagement of engaging means, and speed reduction ratios of the planetary gear transmission shown in FIG. 1.

Like or corresponding reference characters denote like or corresponding parts throughout views.

FIG. 1 shows a skeleton of a planetary gear transmission according to a first embodiment of the present invention. The planetary gear transmission has first, second, and third planetary gear trains G1, G2, G3 which are coaxially arranged parallel to each other. The first, second, and third planetary gear trains G1, G2, G3 have respective first, second, and third sun gears S1, S2, S3 which are positioned centrally, respective first, second, and third planetary pinions P1, P2, P3 held in mesh with the first, second, and third sun gears S1, S2, S3, respectively, and rotatable therearound while rotating about their own axes, respective first, second, and third carriers C1, C2, C3 on which the respective first, second, and third planetary pinions P1, P2, P3 are rotatably supported and which are rotatable therewith around the first, second, and third sun gears S1, S2, S3, respectively, and respective first, second, and third ring gears R1, R2, R3 comprising internal gears meshing with the respective first, second, and third planetary pinions P1, P2, P3. The first and second planetary gear trains G1, G2 comprise double-pinion planetary gear trains, respectively. Specifically, the first pinion P1 comprises two pinion gears P11, P12 and the second pinion P2 comprises two pinion gears P21, P22.

The first sun gear S1 is securely connected to an input shaft 1 for rotation therewith at all times, and the first carrier C1 is nonrotatably fixed to a stationary member. The first ring gear R1 is connected to the second sun gear S2 through a second clutch K2. The second sun gear S2 can be held against rotation by a second brake B2. The second carrier C2 is directly coupled to the third carrier C3, and is also connected to an output gear 2. Therefore, rotation of the second and third carriers C2, C3 is picked up as output rotation of the planetary gear transmission. The second ring gear R2 is directly coupled to the third ring gear R3, and these ring gears R2, R3 can be held together against rotation by a first brake B1. The second and third ring gears R2, R3 are disengageably connected to the input shaft 1 through a first clutch K1. The third sun gear S3 is also disengageably connected to the input shaft 1 through a third clutch K3.

In the planetary gear transmission of the above structure, gear positions can be established and gearshifts can be controlled by controlling engagement and disengagement of the first, second, and third clutches K1, K2, K3 and the first and second brakes B1, B2. More specifically, five forward gear positions or ranges (LOW, 2ND, 3RD, 4TH, and 5TH) and one reverse gear position (REV) can be established by engaging and disengaging the first, second, and third clutches K1, K2, K3 and the first and second brakes B1, B2, as shown in FIG. 2. Speed reduction ratios in the respective gear ranges vary depending on the number of teeth of each of the gears, but are shown by way of illustrative example in FIG. 2.

The table of FIG. 2 shows that each of the five forward gear positions or ranges (LOW~5TH) can be established by engaging two of the clutches or by engaging one of the clutches and one of the brakes the clutches and brakes will be referred to as "engaging means"). Any gearshifts between adjacent gear positions can be achieved by disengaging one of the two engaging means and engaging the other engaging means, but not disengaging or engaging the two engaging means simultaneously. Therefore, the gearshifts can be controlled easily.

Figure 3:
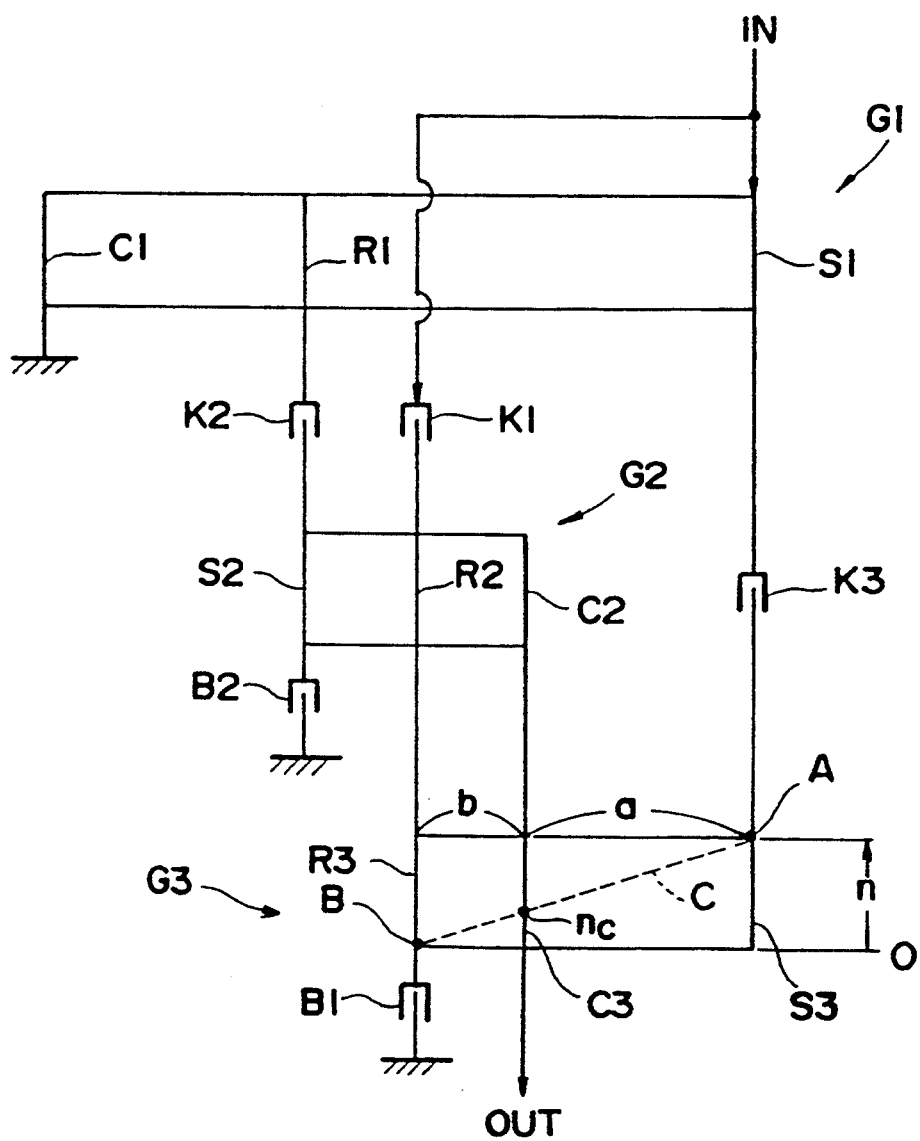
FIGS. 3, 5, and 6A through 6D are diagrams showing rotational speeds of elements of the planetary gear transmission shown in FIG. 2.

The relationship between rotational speeds of the elements of the planetary gear transmission is shown in FIG. 3.

In FIG. 3, the first, second, and third planetary gear trains G1, G2, G3 are plotted separately from each other. In each of the plotted planetary gear trains G1, G2, G3, each vertical line represents one element of the planetary gear train, and the length thereof represents the rotational speed of the element. The distances between the vertical lines are proportional to the reciprocal of the number of teeth of the sun gears or, the reciprocal of the number of teeth of the ring gears.

For example, the three vertical lines (FIG. 3) of the third planetary gear train G3 correspond, successively from the right to the left, to the third sun gear S3, the third carrier C3, and the third ring gear R3, respectively. The upward length of each of the vertical lines represents the rotational speed "n" in the forward direction. The distance "a" between the vertical line indicating the third sun gear S3 and the vertical line indicating the third carrier C3 corresponds to the reciprocal ($1/Zs$) of the number $Zs$ of teeth of the third sun gear S3. The distance "b" between the vertical line indicating the third carrier C3 and the vertical line indicating the third ring gear R3 corresponds to the reciprocal ($1/Zr$) of the number $Zr$ of teeth of the third ring gear R3. Therefore, when the third clutch K3 is engaged to rotate the third sun gear S3 at the same speed n as the rotational speed of the input shaft 1, and the third ring gear R3 is held against rotation by the first brake B1, the rotational speed of the third carrier C3 is indicated by $n_c$ (FIG. 3) indicated by a point of intersection between the vertical line corresponding to the third carrier C3 and a line C which interconnects points A, B, the point A representing the rotation of the third sun gear S3 at the speed n and the point B representing the braked condition of the third ring gear R3.

The first and second planetary gear trains G1, G2 are defined basically in the same manner as described above. However, since the first and second planetary gear trains G1, G2 are double-pinion planetary gear trains, their ring gears rotate with respect to the sun gear in a direction opposite to the direction in which the ring gear of a single-pinion planetary gear train rotates. In FIG. 3, the vertical lines indicative of the sun gear S3 and the ring gear R3 of the third planetary gear train G3 which is a single-pinion planetary gear train are positioned one on each side of the vertical line indicative of the carrier C3 thereof. In the first and second planetary gear trains G1, G2 which are double-pinion planetary gear trains, the vertical lines indicative of the sun gears S1, S2 and the ring gears R1, R2 are positioned on one side of the vertical lines indicative of the carriers C1, C2. The definition of the distances between the vertical lines is the same as described above, i.e., the distances are proportional to the reciprocal of the number of teeth of the sun and ring gears.

Figures 4, 5:
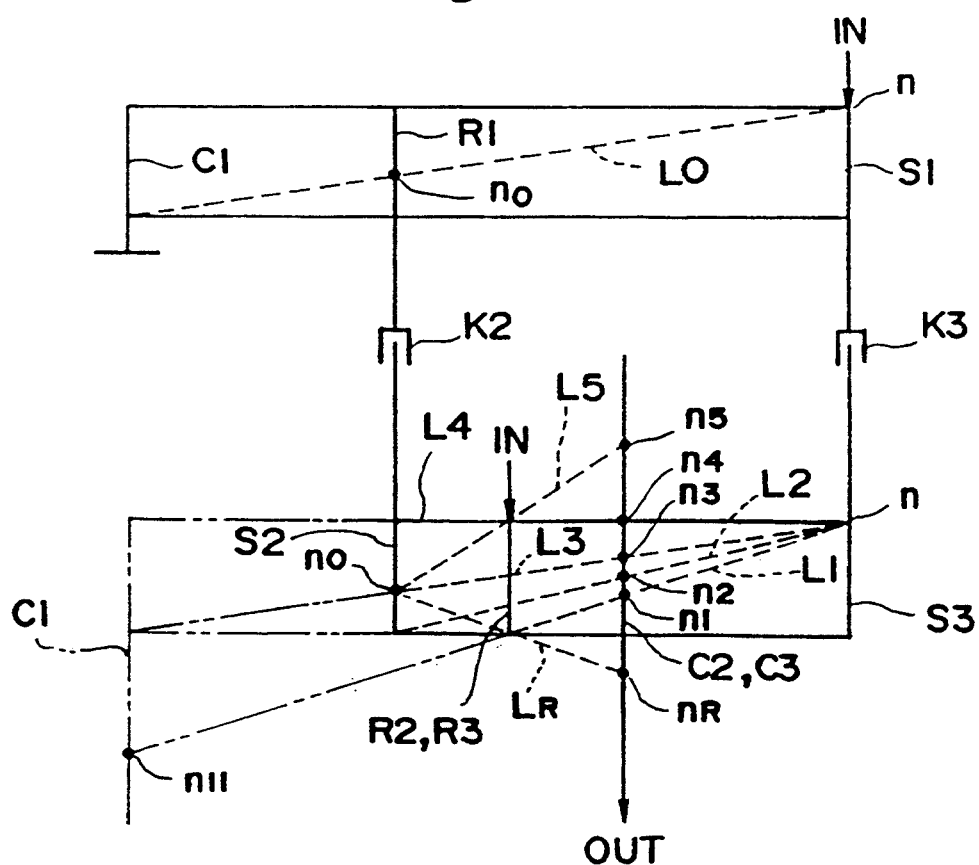
FIG. 4 is a table showing how elements are coupled into rotational members in the planetary gear transmission shown in FIG. 2.

FIG. 4 shows how the elements (the sun gears, the carriers, and the ring gears) shown in FIG. 3 are coupled into rotational members. The first carrier C1 singly serves as a first rotational member, and the first ring gear R1 and the second sun gear S2 can be coupled to each other and jointly serve as a second rotational member. The second ring gear R2 and the third ring gear R3 can be coupled to each other and jointly serve as a third rotational member, and the second carrier C2 and the third carrier C3 can be coupled to each other and jointly serve as a fourth rotational member. The first sun gear S1 and the third sun gear S3 can be coupled to each other and jointly serve as a fifth rotational member. As can be understood from FIGS. 3 and 4, the third and fifth rotational members are directly or disengageably coupled to the input shaft 1, and the fourth rotational member is coupled to the output gear 2.

Furthermore, in all of the subsequent embodiments, the third and fifth rotational members are directly or disengageably coupled to the input shaft 1, and the fourth rotational member is coupled to the output gear 2.

FIG. 4 also illustrates ratios $\lambda$ between the number $Zs$ of teeth of the sun gears and the number $Zr$ of teeth of the ring gears ($\lambda = Zs/Zr$). The ratio indicates the sizes of the sun gear and the ring gear, and also the size of the planetary pinion between the sun and ring gears. In order for a planetary gear train to be physically established, the ratio $\lambda$ should be approximately in the range of from 0.3 to 0.6.

The ratio of the rotational speed of the output gear 2 to the rotational speed of the input shaft 1, i.e., a speed reduction ratio, in each of the gear ranges will be determined using a speed diagram.

In the planetary gear transmission of this embodiment, irrespective of which gear range is selected, the first sun gear S1 of the first planetary gear train G1 is fixedly coupled to the input shaft 1 and rotates at the same speed n as the speed of the input shaft 1, and the first carrier C1 is fixed to the stationary member. Therefore, the first ring gear R1 rotates at a speed no (FIG. 5) indicated by a point of intersection between the vertical line indicative of the first ring gear R1 and a dotted straight line Lo between points indicating, respectively, the rotation of the first sun gear S1 and the fixed condition of the carrier C1. The first ring gear R1 always rotates at the speed no irrespective of which gear range is selected.

In the LOW speed range (gear position), the third clutch K3 and the first brake B1 are engaged (FIG. 2). Since the ring gears R2, R3 are mechanically coupled to each other and the carriers C2, C3 are mechanically coupled to each other, the second and third planetary gear trains G2, G3 are integrally coupled to each other as a unitary planetary gear train, and may be plotted together as shown in FIG. 5. Because the second clutch K2 is disengaged, the first planetary gear train G1 is separate from the second and third planetary gear trains G2, G3, with only one element (i.e., the first sun gear S1) of the first planetary gear train G1 being coupled to the second and third planetary gear trains G2, G3.

If the input shaft 1 rotates at a speed n, then the third sun gear S3 coupled to the input shaft 1 also rotates at the speed n. Since the second and third ring gears R2, R3 are held against rotation by the first brake B1, the output gear 2 coupled to the carriers C2, C3 rotates at a speed n1 indicated by a point of intersection between the vertical line indicative of these carriers C2, C3 and a dotted straight line L1 interconnecting points which indicate, respectively, the rotation of the third sun gear S3 and the braked condition of the second and third ring gears R2, R3.

According to the conventional planetary gear transmission, the second clutch K2 is dispensed with, and the first ring gear R1 and the second sun gear S2 are directly coupled to each other, and the first, second, and third planetary gear trains are plotted together as indicated by the two-dot-and-dash lines in FIG. 5. In the conventional arrangement, therefore, the first carrier C1 rotates at a speed n11 indicated by a point of intersection between an extension (indicated by a two-dot-and-dash line) of the straight line L1 and the vertical line indicative of the first carrier C1, the first carrier C1 rotating in a direction opposite to the direction in which the first sun gear S1 rotates. The first pinion P1 (i.e., the pinion gears P11, P12) rotatably supported on the carrier C1 thus rotates at an excessively high speed, and cannot be sufficiently lubricated. Specifically, with the speed reduction ratios selected as shown in FIG. 2, the rotational speed of the first pinion is about six times the rotational speed n of the input shaft 1.

According to this embodiment, however, since the first carrier C1 is fixed to the stationary member, the rotational speed of the first pinion P1 is much lower, e.g., about 2.0 times the rotational speed n of the input shaft 1 with the speed reduction ratios selected as shown in FIG. 2. Consequently, the first pinion P1 is almost free of the problem of insufficient lubrication. Particularly, the first pinion P1 can easily be supplied with lubricating oil because the first carrier C1 on which the first pinion P1 is rotatably supported is fixed in position.

In the 2ND speed range (gear position), the third clutch K3 remains engaged, the first brake B1 is disengaged, and the second brake B2 is engaged. The third sun gear S3 rotates at the same speed n as the rotational speed of the input shaft 1, and the second sun gear S2 is held against rotation. At this time, the output gear 2 coupled to the carriers C2, C3 rotates at a speed n2 indicated by a point of intersection between the vertical line indicative of the second and third carriers C2, C3 and a dotted straight line L2 between points which indicate, respectively, the rotation of the third sun gear S3 and the braked condition of the second sun gear S2.

In the speed 3RD speed range (gear position), the third clutch K3 remains engaged, the second brake B2 is disengaged, and the second clutch K2 is engaged. The third sun gear S3 rotates at the same speed n as the rotational speed of the input shaft 1, and the second sun gear S2 rotates at the same speed no as the rotational speed of the first ring gear R1 because the second sun gear S2 is coupled to the first ring gear R1 by the second clutch K2. At this time, the output gear 2, coupled to the carriers C2, C3, rotates at a speed n3 indicated by a point of intersection between the vertical line indicative of the second and third carriers C2, C3 and a dotted straight line L3 between points which indicate, respectively, the rotation of the third sun gear S3 and the rotation of the second sun gear S2.

In the 4TH speed range (gear position), the third clutch K3 remains engaged, and the second clutch K2 is disengaged and the first clutch K1 is engaged. The first, second, and third planetary gear trains G1, G2, G3 rotate together with the input shaft 1. The third sun gear S3, the second and third ring gears R2, R3 rotate at the same speed n as the rotational speed of the input shaft 1. At this time, the output gear 2, coupled to the carriers C2, C3, rotates at a speed n4 (=n) indicated by a point of intersection between the vertical line indicative of the second and third carriers C2, C3 and a horizontal solid straight line L4.

In the 5TH speed range (gear position), the first clutch K1 remains engaged, the third clutch K3 is disengaged, and the second clutch K2 is engaged. The second and third ring gears R2, R3 rotate at the same speed n as the rotational speed of the input shaft 1. Since the second sun gear S2 is coupled to the first ring gear R1 by the second clutch K2, the first sun gear S2 rotates at the same speed no as the rotational speed of the first ring gear R1. At this time, the output gear 2, coupled to the carriers C2, C3, rotates at a speed n5 indicated by a point of intersection between the vertical line indicative of the second and third carriers C2, C3 and a dotted straight line L5 connecting points which indicate, respectively, the rotation of the ring gears R2, R3 and the rotation of the second sun gear S2.

In the REV speed range (gear position), the second clutch K2 is engaged, and the first brake B1 is engaged. Since the second sun gear S2 is coupled to the first ring gear R1 by the second clutch K2, the first sun gear S2 rotates at the same speed no as the rotational speed of the first ring gear R1. The second and third ring gears R2, R3 are held against rotation by the first brake B1. At this time, the output gear 2, coupled to the carriers C2, C3, rotates at a speed nR indicated by a point of intersection between the vertical line indicative of the second and third carriers C2, C3 and a dotted straight line LR connecting points which indicate, respectively, the braked condition of the ring gears R2, R3 and the rotation of the second sun gear S2.

Figure 6A:
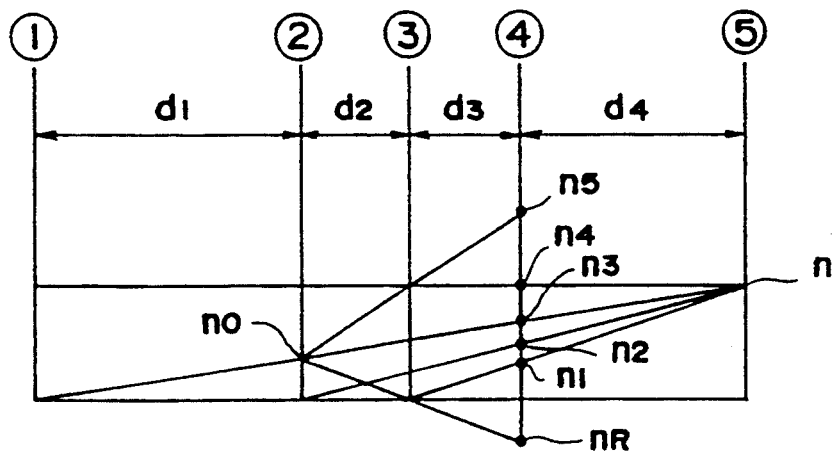

The rotational speeds of the output gear 2 with respect to the rotational speed n of the input shaft 1 in the respective gear positions or ranges can be determined in the manner described above. The rotational speeds thus determined are shown altogether in FIG. 6A. In FIG. 6A, five vertical lines ①~⑤ represent the first through fifth rotational members, respectively, and the distances $d_1 \sim d_4$ between the vertical lines are uniquely determined once the speed reduction ratios in the gear positions or ranges are given. For example, if the speed reduction ratios are given as shown in FIG. 2, the distances $d_1 \sim d_4$ between the vertical lines are indicated as follows:

$$d_1:d_2:d_3:d_4 = 455:111:149:286.$$

Figure 6B:
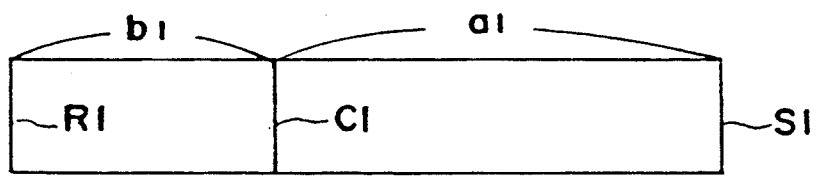

The first planetary gear train G1 is composed of the first rotational member ①, the second rotational member ②, and the fifth rotational member ⑤. If the first planetary gear train G1 comprised a single-pinion planetary gear train, then the first rotational member ① would be a ring gear, the second rotational member ② would be a carrier, and the fifth rotational member ⑤ would be a sun gear, as shown in FIG. 6B. The distances $a_1$, $b_1$ between the vertical lines, corresponding to the reciprocals of the numbers of teeth of the sun and ring gears, would be given by:

$$a_1:b_1 = 455:546$$

from the distances $d_1 \sim d_4$ between the vertical lines shown in FIG. 6A. In this case, the ratio λ between the numbers of teeth of the sun and ring gears would be λ=0.833. Since this value of the ratio is not in conformity with the condition in which the planetary gear train can be physically established, i.e., the numerical range of 0.3<λ<0.6, it is not possible to employ a single-pinion planetary gear train as the first planetary gear train G1 in this embodiment.

Figure 6C:
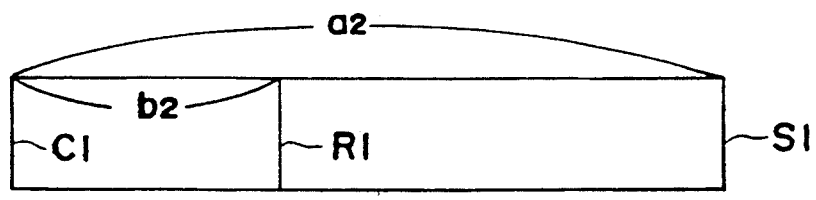

Now, it is assumed that the the first planetary gear train G1 comprises a double-pinion planetary gear train as with the illustrated embodiment. In this case, the first rotational member ①  would be a carrier, the second rotational member ②  would be a ring gear, and the fifth rotational member ⑤  would be a sun gear, as shown in FIG. 6C. The distances $a_2$, $b_2$ between the vertical lines, corresponding to the reciprocals of the numbers of teeth of the sun and ring gears, are given by:

$$a_2 : b_2 = 1000 : 455$$

from the distances $d_1 \sim d_4$ between the vertical lines shown in FIG. 6A. In this case the ratio $\lambda$ between the numbers of teeth of the sun and ring gears is $\lambda = 0.455$. This value of the ratio is in conformity with the condition in which the planetary gear train can be physically established, i.e., the numerical range of $0.3 < \lambda < 0.6$. Therefore, the first planetary gear train G1 must be a double-pinion planetary gear train.

Figure 6D:
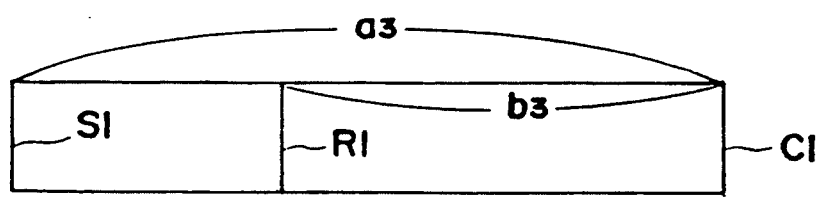

The first planetary gear train G1 may be a double-pinion planetary gear train with the first rotational member ①  as a sun gear, the second rotational member ②  as a ring gear, and the fifth rotational member ⑤  as a carrier, as shown in FIG. 6D. The distances a3, b3 between the vertical lines, corresponding to the reciprocals of the numbers of teeth of the sun and ring gears, are given by:

$$a_3 : b_3 = 1000 : 545$$

from the distances $d_1 \sim d_4$ between the vertical lines shown in FIG. 6A. In this time the ratio $\lambda$ between the numbers of teeth of the sun and ring gears is $\lambda = 0.545$. This value of the ratio is also in conformity with the condition in which the planetary gear train can be physically established, i.e., the numerical range of $0.3 < \lambda < 0.6$.

Other embodiment according to the present invention will be described hereinafter.

Figures 7, 8:
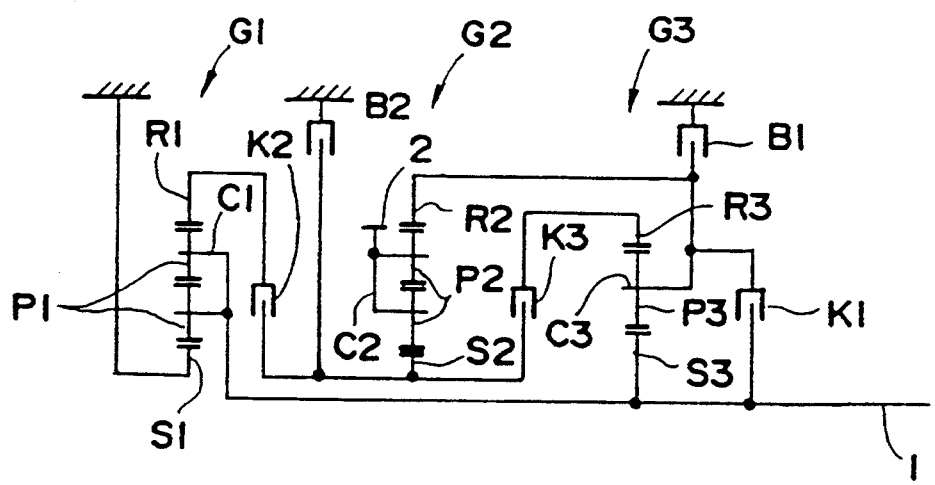
FIGS. 7, 11, 13, 17, and 19 are diagrams showing skeletons of planetary gear transmissions according to second through sixth embodiments, respectively, of the present invention.
FIGS. 8, 14, and 20 are tables showing the relationship between gear ranges, engagement of engaging means, and speed reduction ratios of the planetary gear transmissions shown in FIGS. 7, 13, and 19, respectively.

FIG. 7 shows a skeleton of a planetary gear transmission according to a second embodiment of the present invention. In the second embodiment and other subsequent embodiments, only an upper half of the skeleton of the planetary gear transmission, above the central axis about which the elements are rotatable, is shown for the sake of brevity. As shown in FIG. 7, the planetary gear transmission has first, second, and third planetary gear trains G1, G2, G3 which are coaxially arranged parallel to each other. The first and second planetary gear trains G1, G2 comprise double-pinion planetary gear trains, respectively, and the third planetary gear train G3 comprises a single-pinion planetary gear train.

The first sun gear S1 is nonrotatably fixed to a stationary member, and the first carrier C1 is securely connected to an input shaft 1 for rotation therewith at all times, as shown in FIG. 6D. The first ring gear R1 is connected to the second sun gear S2 through the second clutch K2. The second sun gear S2 can be held against rotation by the second brake B2, and is coupled to the third ring gear R3 by the third clutch K3. The second carrier C2 is directly coupled to the output gear 2. The second ring gear R2 is directly coupled to the third carrier C3, and the second ring gear R2 and the third carrier C3 can be held together against rotation by the first brake B1. The second ring gear R2 and the third carrier C3 are disengageably connected to the input shaft 1 through the first clutch K1. The third sun gear S3 is securely connected to the input shaft 1.

In the planetary gear transmission shown in FIG. 7, five forward and one reverse gear positions or ranges can be established by controlling engagement and disengagement of the first, second, and third clutches K1, K2, K3 and the first and second brakes B1, B2, as shown in FIG. 8.

Figures 9, 10:
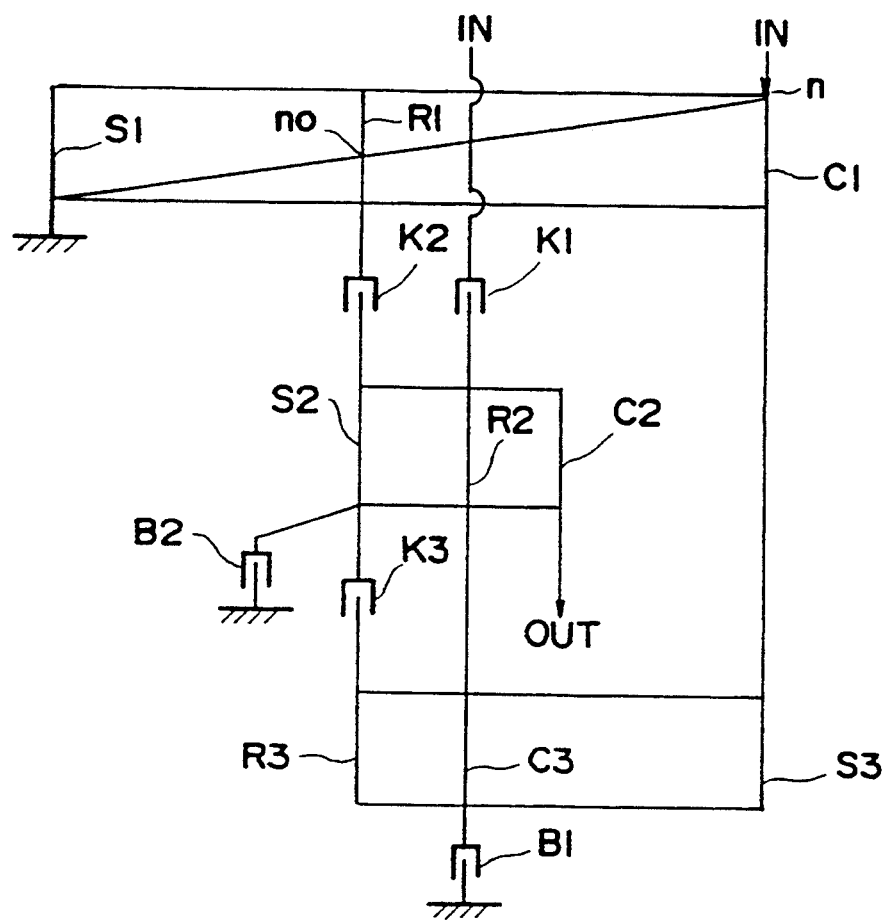
FIGS. 9, 15, and 21 are diagrams showing rotational speeds of elements of the planetary gear transmissions shown in FIGS. 7, 13, and 19, respectively.
FIGS. 10, 12, 16, 18, and 22 are tables showing how elements are coupled into rotational members in the planetary gear transmissions shown in FIGS. 7, 11, 13, 17, and 19, respectively.

The relationship between rotational speeds of the elements of the planetary gear transmission shown in FIG. 7 is shown in FIG. 9. FIG. 10 shows how the elements are coupled into rotational members in the planetary gear transmission shown in FIG. 7. In this embodiment, the first sun gear S1 singly serves as a first rotational member, and the first ring gear R1, the second sun gear S2, and the third ring gear R3 are coupled to each other and jointly serve as a second rotational member. The second ring gear R2 and the third carrier C3 are coupled to each other and jointly serve as a third rotational member, and the second carrier C2 singly serves as a fourth rotational member. The first carrier C1 and the third sun gear S3 are coupled to each other and jointly serve as a fifth rotational member. The third and fifth rotational members are coupled to the input shaft 1, and the fourth rotational member is coupled to the output gear 2.

As described above with reference to FIGS. 6A through 6D, the first planetary gear train G1 comprises a double-pinion planetary gear train because it satisfies the condition required for planetary gear trains to be physically established. Since the first sun gear S1 is nonrotatably fixed in position at all times and the first carrier C1 is securely coupled to the input shaft 1 for rotation therewith at all times, the first ring gear R1 rotates in the same direction and at the same speed no as the input shaft 1 irrespective of which gear position or range is selected. Consequently, the first pinion P1 is prevented from rotating at an excessively high speed. Specifically, with the speed reduction ratios selected as shown in FIG. 8, the rotational speed of the first pinion P1 is about 2.5 times the rotational speed n of the input shaft 1.

In the second embodiment, the speed reduction ratios in the respective gear positions or ranges may also be determined using a speed diagram in the same manner as described above with reference to the first embodiment.

Figures 11, 12:
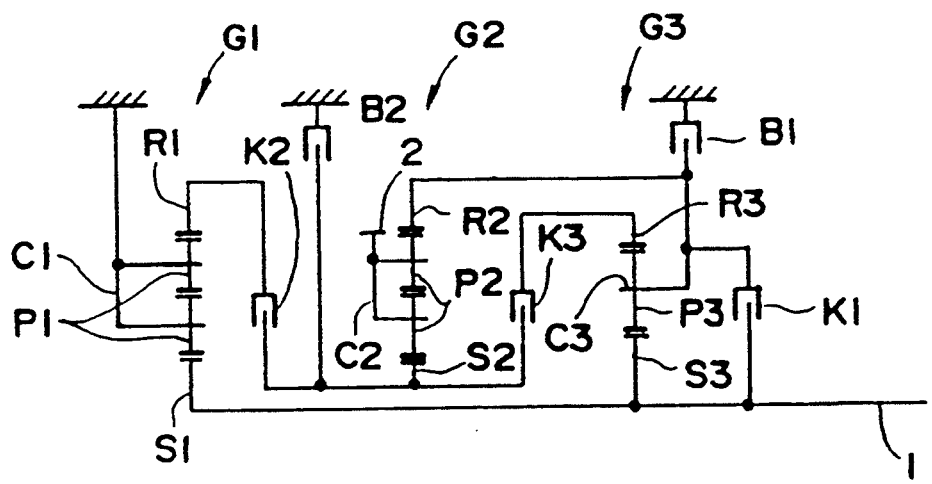

FIG. 11 shows a skeleton of a planetary gear transmission according to a third embodiment of the present invention. The planetary gear transmission shown in FIG. 11 differs from the planetary gear transmission shown in FIG. 7 only as to the first planetary gear train G1. Specifically, the first sun gear S1 is securely coupled to the input shaft 1 for rotation therewith at all times, and the first carrier C1 is nonrotatably fixed to a stationary member. The other details of the planetary gear transmission shown in FIG. 11 are identical to those of the planetary gear transmission shown in FIG. 7.

As shown in FIG. 12, the first carrier C1 serves as a first rotational member and the first sun gear S1 and the third sun gear S3 serve as a fifth rotational member in the planetary gear transmission shown in FIG. 11. Although the speed diagram of the first planetary gear train G1 of the planetary gear transmission according to the second embodiment corresponds to FIG. 6D, the speed diagram of the first planetary gear train G1 of the planetary gear transmission according to the third embodiment corresponds to FIG. 6C.

Figures 13, 14:
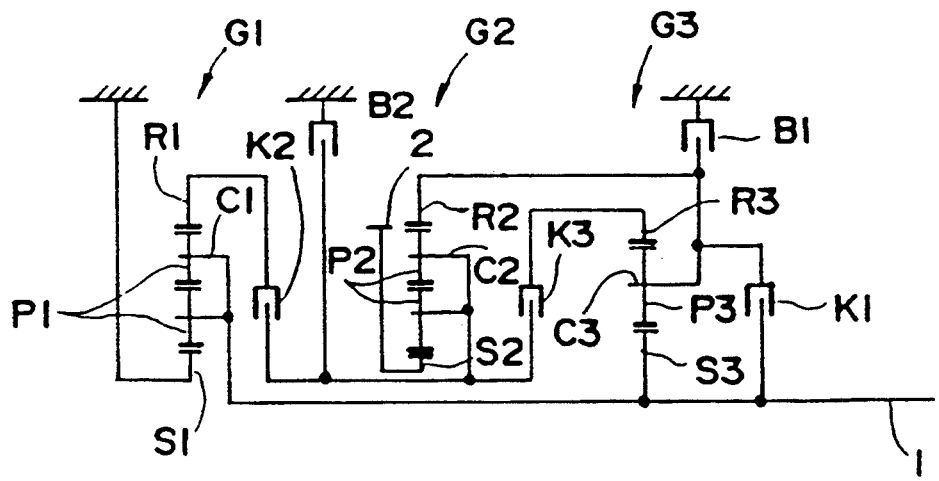

FIG. 13 shows a skeleton of a planetary gear transmission according to a fourth embodiment of the present invention. As shown in FIG. 13, the planetary gear transmission has first, second, and third planetary gear trains G1, G2, G3 which are coaxially arranged parallel to each other. The first and second planetary gear trains G1, G2 comprise double-pinion planetary gear trains, respectively, and the third planetary gear train G3 comprises a single-pinion planetary gear train.

The first sun gear S1 is nonrotatably fixed to a stationary member, and the first carrier C1 is securely connected to an input shaft 1 for rotation therewith at all times, with the first planetary gear train G1 being of a structure as shown in FIG. 6D. The first ring gear R1 is connected to the second carrier C2 through the second clutch K2. The second carrier C2 can be held against rotation by the second brake B2, and is coupled to the third ring gear R3 by the third clutch K3. The second sun gear S2 is directly coupled to the output gear 2. The second ring gear R2 is directly coupled to the third carrier C3, and the second ring gear R2 and the third carrier C3 can be held together against rotation by the first brake B1. The second ring gear R2 and the third carrier C3 are disengageably connected to the input shaft 1 through the first clutch K1. The third sun gear S3 is securely connected to the input shaft 1.

In the planetary gear transmission shown in FIG. 13, five forward and one reverse gear positions or ranges can be established by controlling engagement and disengagement of the first, second, and third clutches K1, K2, K3 and the first and second brakes B1, B2, as shown in FIG. 14.

Figures 15, 16:
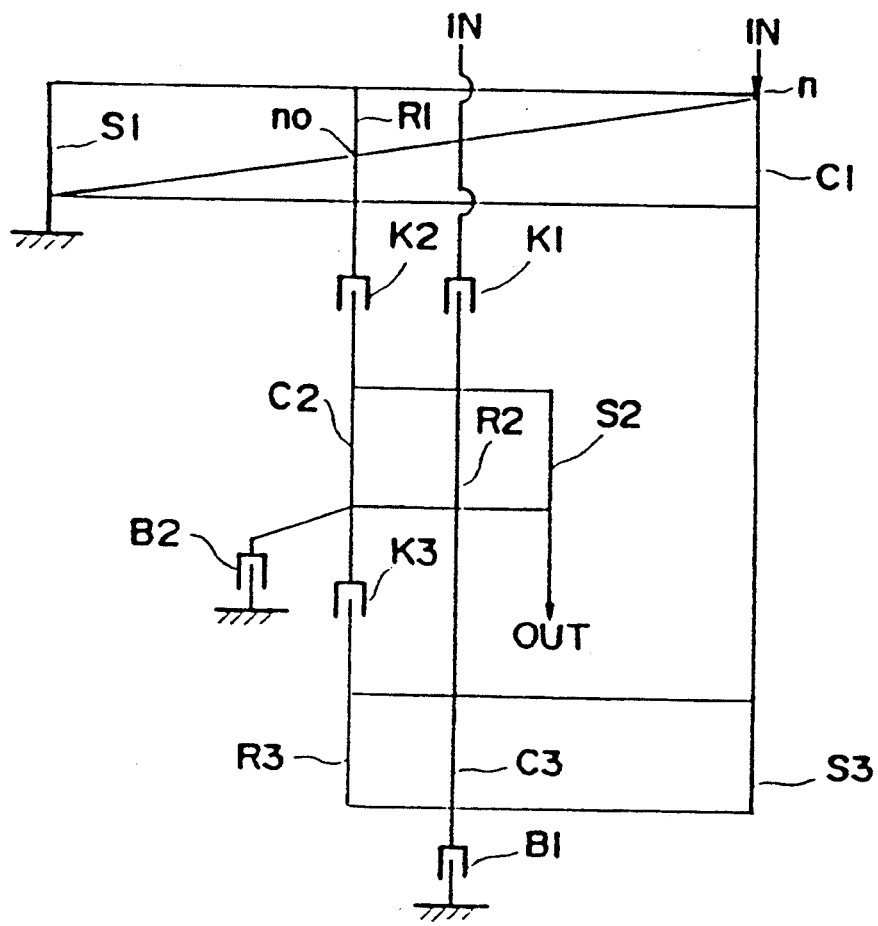

The relationship between rotational speeds of the elements of the planetary gear transmission shown in FIG. 13 is shown in FIG. 15. FIG. 16 shows how the elements are coupled into rotational members in the planetary gear transmission shown in FIG. 13. In this embodiment, the first sun gear S1 singly serves as a first rotational member, and the first ring gear R1, the second carrier C2, and the third ring gear R3 are coupled to each other and jointly serve as a second rotational member. The second ring gear R2 and the third carrier C3 are coupled to each other and jointly serve as a third rotational member, and the second sun gear S2 singly serves as a fourth rotational member. The first carrier C1 and the third sun gear S3 are coupled to each other and jointly serve as a fifth rotational member.

Figures 17, 18:
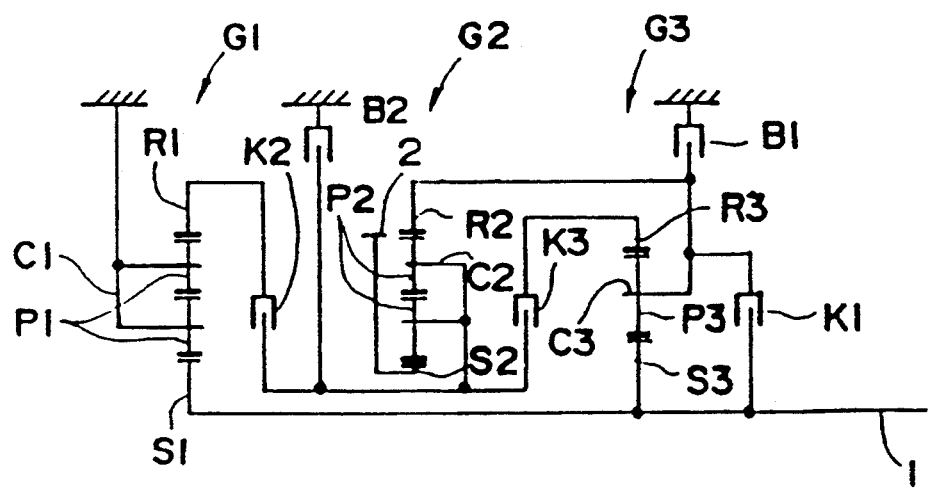

FIG. 17 shows a skeleton of a planetary gear transmission according to a fifth embodiment of the present invention. The planetary gear transmission shown in FIG. 17 differs from the planetary gear transmission shown in FIG. 13 only as to the first planetary gear train G1. Specifically, the first sun gear S1 is securely coupled to the input shaft 1 for rotation therewith at all times, and the first carrier C1 is nonrotatably fixed to a stationary member. The other details of the planetary gear transmission shown in FIG. 17 are identical to those of the planetary gear transmission shown in FIG. 13.

As shown in FIG. 18, the first carrier C1 serves as a first rotational member and the first sun gear S1 and the third sun gear S3 serve as a fifth rotational member in the planetary gear transmission shown in FIG. 17. The speed diagram of the first planetary gear train G1 of the planetary gear transmission according to the fifth embodiment corresponds to FIG. 6C.

Figures 19, 20:
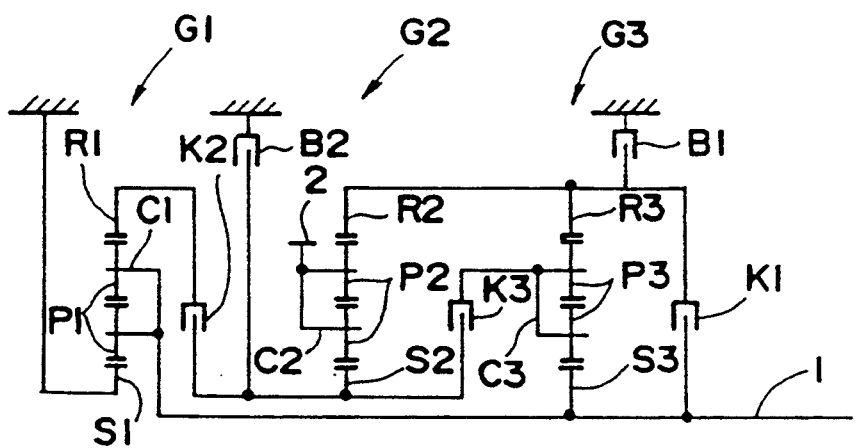

FIG. 19 shows a skeleton of a planetary gear transmission according to a sixth embodiment of the present invention. As shown in FIG. 19, the planetary gear transmission has first, second, and third planetary gear trains G1, G2, G3 which are coaxially arranged parallel to each other. All of the first, second, and third planetary gear trains G1, G2, G3 comprise double-pinion planetary gear trains, respectively.

The first sun gear S1 is nonrotatably fixed to a stationary member, and the first carrier C1 is securely connected to an input shaft 1 for rotation therewith at all times, with the first planetary gear train G1 being of a structure as shown in FIG. 6D. The first ring gear R1 is connected to the second sun gear S2 through the second clutch K2. The second sun gear S2 can be held against rotation by the second brake B2, and is coupled to the third carrier C3 by the third clutch K3. The second carrier C2 is directly coupled to the output gear 2. The second ring gear R2 is directly coupled to the third ring gear R3, and the second and third ring gears R2, R3 can be held together against rotation by the first brake B1. The second and third ring gears R2, R3 are disengageably connected to the input shaft 1 through the first clutch K1. The third sun gear S3 is securely connected to the input shaft 1.

In the planetary gear transmission shown in FIG. 19, five forward and one reverse gear positions or ranges can be established by controlling engagement and disengagement of the first, second, and third clutches K1, K2, K3 and the first and second brakes B1, B2, as shown in FIG. 20.

Figures 21, 22:
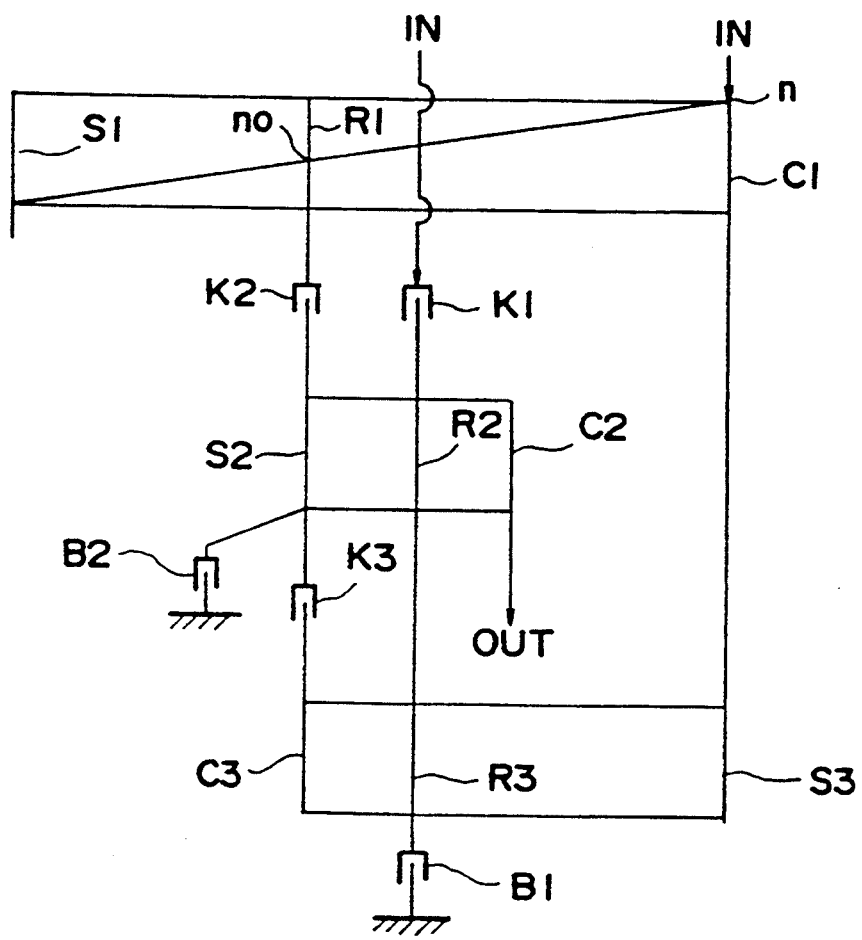

The relationship between rotational speeds of the elements of the planetary gear transmission shown in FIG. 19 is shown in FIG. 21. FIG. 22 shows how the elements are coupled into rotational members in the planetary gear transmission shown in FIG. 19. In this embodiment, the first sun gear S1 singly serves as a first rotational member, and the first ring gear R1, the second sun gear S2, and the third carrier C3 are coupled to each other and jointly serve as a second rotational member. The second ring gear R2 and the third ring gear R3 are coupled to each other and jointly serve as a third rotational member, and the second carrier C2 singly serves as a fourth rotational member. The first carrier C1 and the third sun gear S3 are coupled to each other and jointly serve as a fifth rotational member.

Figures 23, 24:
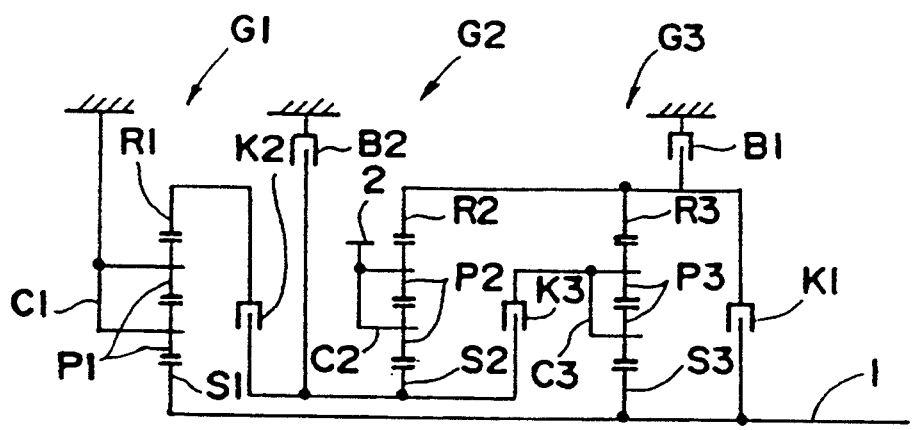
FIGS. 23–116 are diagrams showing skeletons of planetary gear transmissions according to seventh through fifty-fourth embodiments, respectively, of the present invention; and tables showing how elements are coupled into rotational members in the planetary gear transmissions.

FIG. 23 shows a skeleton of a planetary gear transmission according to a seventh embodiment of the present invention. The planetary gear transmission shown in FIG. 23 differs from the planetary gear transmission shown in FIG. 19 only as to the first planetary gear train G1. Specifically, the first sun gear S1 is securely coupled to the input shaft 1 for rotation therewith at all times, and the first carrier C1 is nonrotatably fixed to a stationary member. The other details of the planetary gear transmission shown in FIG. 23 are identical to those of the planetary gear transmission shown in FIG. 19.

As shown in FIG. 24, the first carrier C1 serves as a first rotational member and the first sun gear S1 and the third sun gear S3 serve as a fifth rotational member in the planetary gear transmission shown in FIG. 23. The speed diagram of the first planetary gear train G1 of the planetary gear transmission according to the seventh embodiment corresponds to FIG. 6C.

Figures 25, 26:
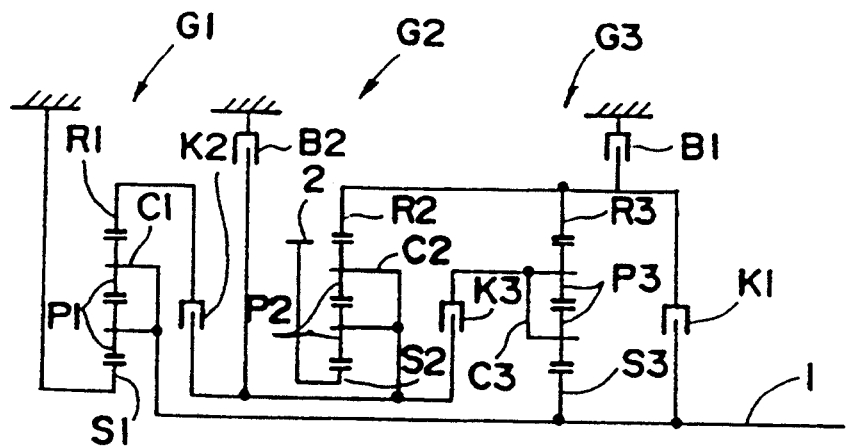

FIG. 25 shows a skeleton of a planetary gear transmission according to an eighth embodiment of the present invention. As shown in FIG. 25, the planetary gear transmission has first, second, and third planetary gear trains G1, G2, G3 which are coaxially arranged parallel to each other, and all of the first, second, and third planetary gear trains G1, G2, G3 comprise double-pinion planetary gear trains, respectively.

The first sun gear S1 is nonrotatably fixed to a stationary member, and the first carrier C1 is securely connected to an input shaft 1 for rotation therewith at all times, with the first planetary gear train G1 being of a structure as shown in FIG. 6D. The elements of the planetary gear trains are coupled as shown in FIG. 25.

Since the ways of connecting each elements are clearly shown in figures (shelton figures), the minute description thereabout will not be provided hereinafter.

In the planetary gear transmission shown in FIG. 25, five forward and one reverse gear positions or ranges can be established by controlling engagement and disengagement of the first, second, and third clutches K1, K2, K3 and the first and second brakes B1, B2, in the same manner as shown in FIG. 20. In all of subsequent embodiments, the relationship between the ranges, engagement of the clutches and the brakes, and the speed reduction ratios is the same as the relationship shown in FIG. 20. FIG. 26 shows how the elements are coupled into first through fifth rotational members.

The sun gear S1 serves as the first rotational member. The ring gear R1, the carrier C2 and the carrier C3 jointly serve as the second rotational member. The ring gear R2 and the ring gear R3 jointly serve as the third rotational member. The sun gear S2 serves as the fourth rotational member. The carrier C1 and the sun gear S3 jointly serve as the fifth rotational member.

Figures 27, 28:
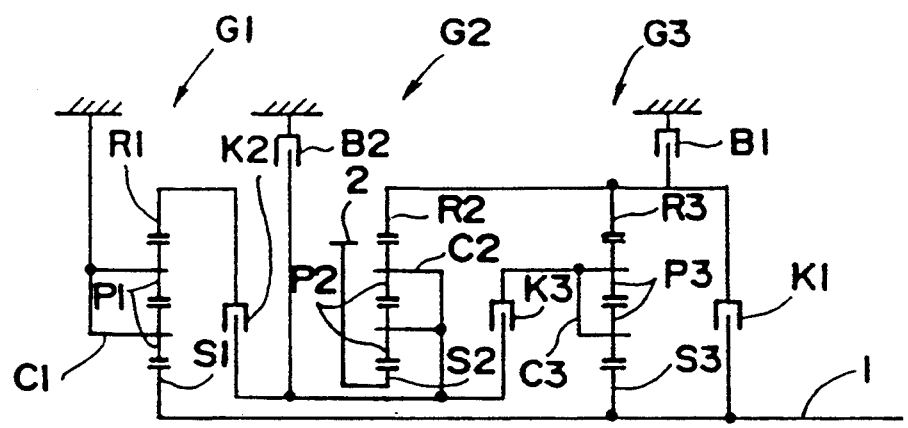

FIG. 27 shows a skelton of a planetary gear transmission according to a ninth embodiment of the present invention. The transmission shown in FIG. 27 differs from the transmission shown in FIG. 25 only as to the first planetary gear train G1. Specifically, the first sun gear S1 is securely coupled to the input shaft 1, and the first carrier C1 is nonrotatably fixed to a stationary member. The other details of the transmission shown in FIG. 27 are identical to those of the transmission shown in FIG. 25. FIG. 28 shows how the elements are coupled into first through fifth rotational members in the transmission shown in FIG. 27. The speed diagram of the first planetary gear train G1 corresponds to FIG. 6C.

Figures 29, 30:
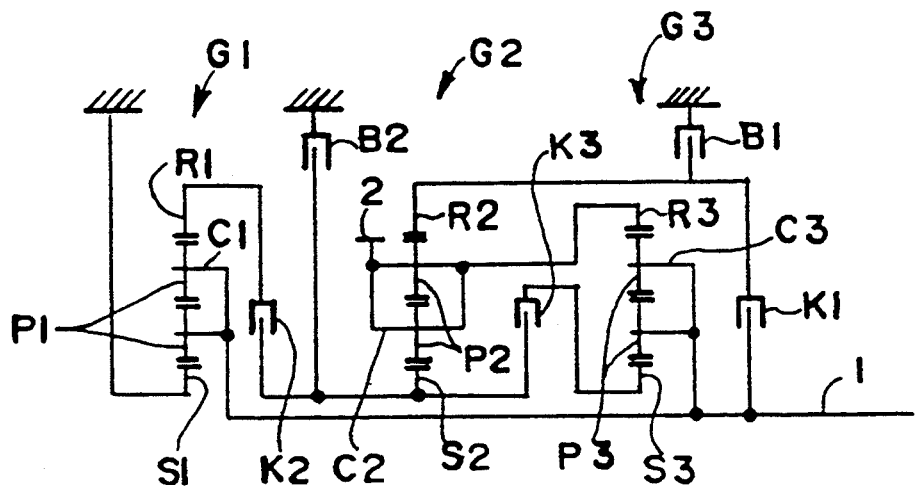

FIG. 29 shows a skelton of a planetary gear transmission according to a tenth embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 30 shows how the elements are coupled into first through fifth rotational members.

The sun gear S1 serves as the first rotational member. The ring gear R1, the sun gear S2 and the sun gear S3 jointly serve as the second rotational member. The ring gear R2 serves as the third rotational member. The carrier C2 and ring gear R3 jointly serve as the fourth rotational member. The carrier C1 and the carrier C3 jointly serve as the fifth rotational member.

Figures 31, 32:
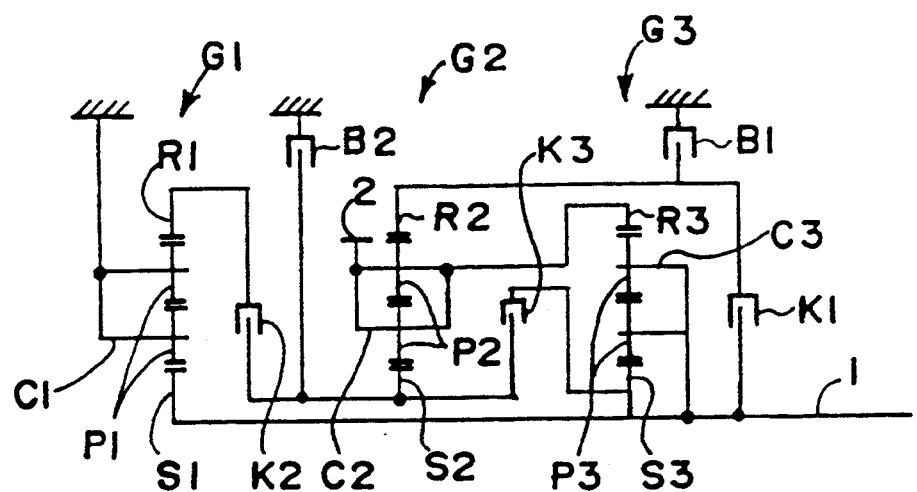

FIG. 31 shows a skelton of a planetary gear transmission according to an eleventh embodiment. The transmission shown in FIG. 31 differs from the transmission shown in FIG. 29 only as to the first planetary gear train G1. Specifically, the first sun gear S1 is securely coupled to the input shaft 1, and the first carrier C1 is nonrotatably fixed to a stationary member. The other details of the transmission shown in FIG. 31 are identical to those of the transmission shown in FIG. 29. FIG. 32 shows how the elements are coupled into first through fifth rotational members in the transmission shown in FIG. 31. The speed diagram of the first planetary gear train G1 corresponds to FIG. 6C.

Figures 33, 34:
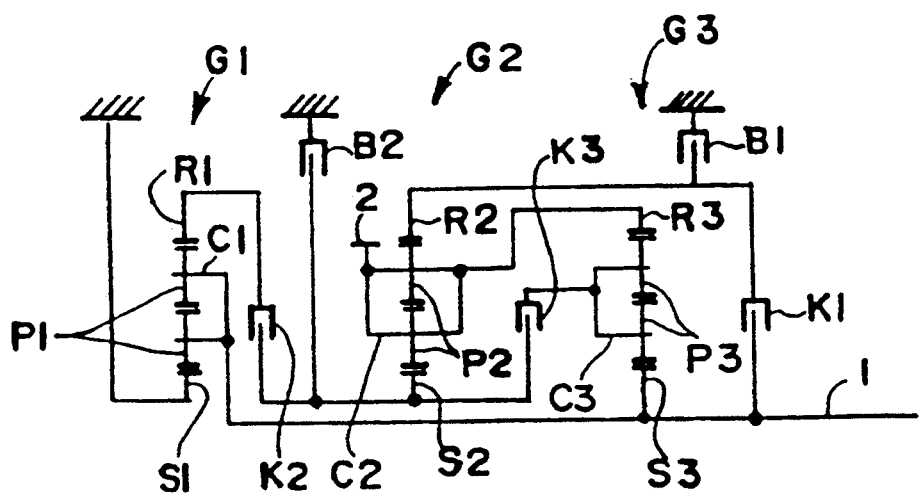

FIG. 33 shows a skelton of a planetary gear transmission according to a 12th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 34 shows how the elements are coupled into first through fifth rotational members.

The sun gear S1 serves as the first rotational member. The ring gear R1, the sun gear S2 and the carrier C3 jointly serve as the second rotational member. The ring gear R2 serves as the third rotational member. The carrier C2 and the ring gear R3 jointly serve as the fourth rotational member. The carrier C1 and the sun gear S3 jointly serve as the fifth rotational member.

Figures 35, 36:
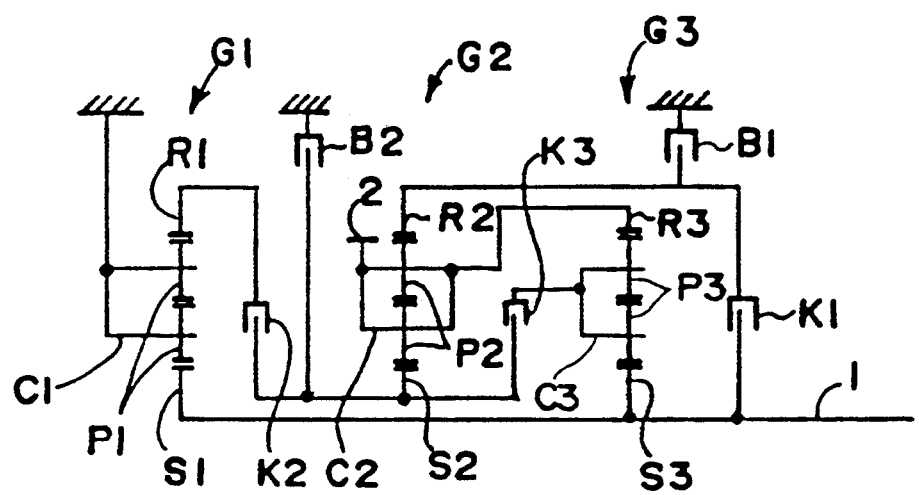

FIG. 35 shows a skelton of a planetary gear transmission according to a 13th embodiment. The transmission shown in FIG. 35 differs from the transmission shown in FIG. 33 only as to the first planetary gear train G1. Specifically, the first sun gear S1 is securely coupled to the input shaft 1, and the first carrier C1 is nonrotatably fixed to a stationary member. The other details of the transmission shown in FIG. 35 are identical to those of the transmission shown in FIG. 33. FIG. 36 shows how the elements are coupled into first through fifth rotational members in the transmission shown in FIG. 35. The speed diagram of the first planetary gear train G1 corresponds to FIG. 6C.

Figures 37, 38:
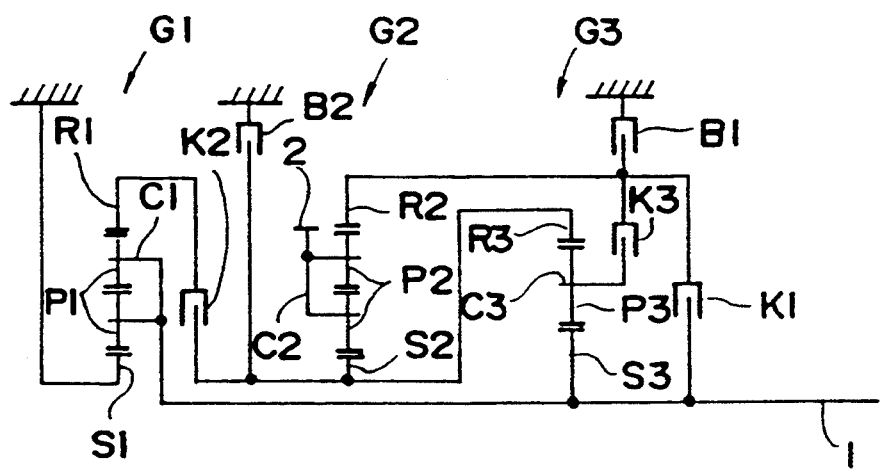

FIG. 37 shows a skelton of a planetary gear transmission according to a 14th embodiment. The transmission has first, second, and third planetary gear trains G1, G2, G3 which are coaxially arranged parallel to each other. The first and comprise double-pinion planetary gear trains, and the third planetary gear train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 38 shows how the elements are coupled into first through fifth rotational members.

The sun gear S1 serves as the first rotational member. The ring gear R1, the sun gear S2 and the ring gear R3 jointly serve as the second rotational member. The ring gear R2 and the carrier C3 jointly serve as the third rotational member. The carrier C2 serves as the fourth rotational member. The carrier C1 and the sun gear S3 jointly serve as the fifth rotational member.

Figures 39, 40:
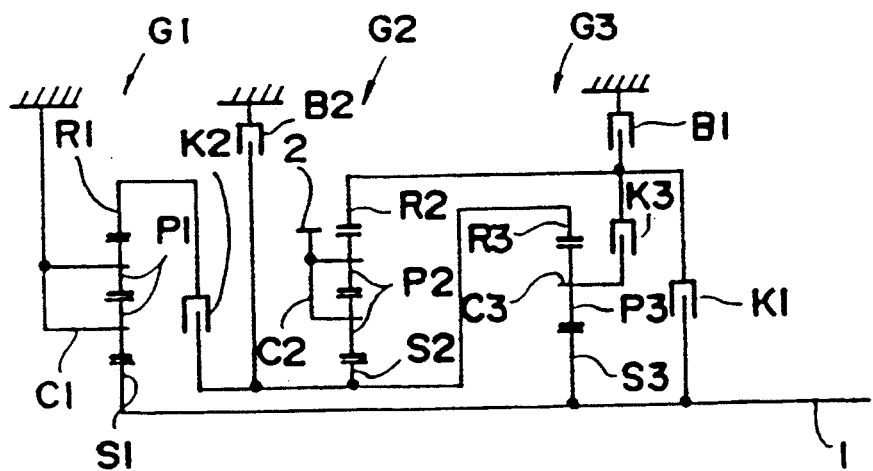

FIG. 39 shows a skelton of a planetary gear transmission according to a 15th embodiment. The transmission shown in FIG. 39 differs from the transmission shown in FIG. 37 only as to the first planetary gear train G1. Specifically, the first sun gear S1 is securely coupled to the input shaft 1, and the first carrier C1 is nonrotatably fixed to a stationary member. The other details of the transmission shown in FIG. 39 are identical to those of the transmission shown in FIG. 37. FIG. 40 shows how the elements are coupled into first through fifth rotational members in the transmission shown in FIG. 39. The speed diagram of the first planetary gear train G1 corresponds to FIG. 6C.

Figures 41, 42:
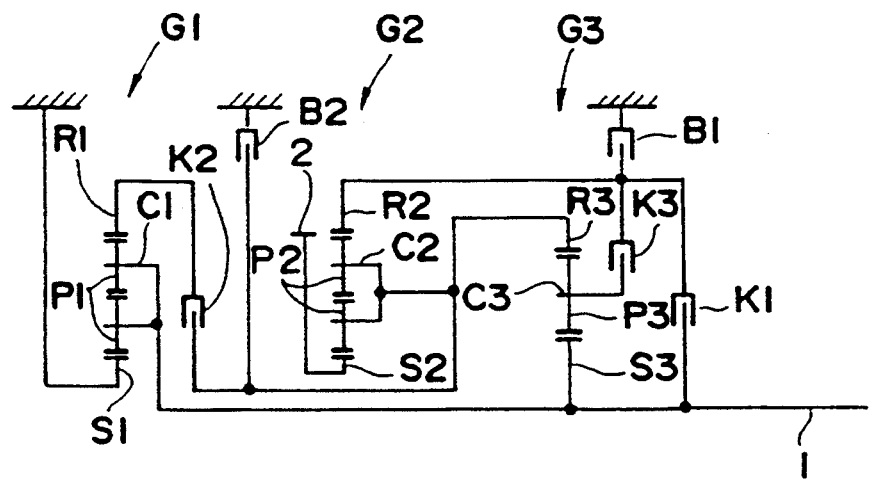

FIG. 41 shows a skelton of a planetary gear transmission according to a 16th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 42 shows how the elements are coupled into first through fifth rotational members.

The sun gear S1 serves as the first rotational member. The ring-gear R1, the carrier C2, and the ring gear R3 jointly serve as the second rotational member. The ring gear R2 and the carrier C3 jointly serve as the third rotational member. The sun gear S2 serves as the fourth rotational member. The carrier C1 and the sun gear S3 jointly serve as the fifth rotational member.

Figures 43, 44:
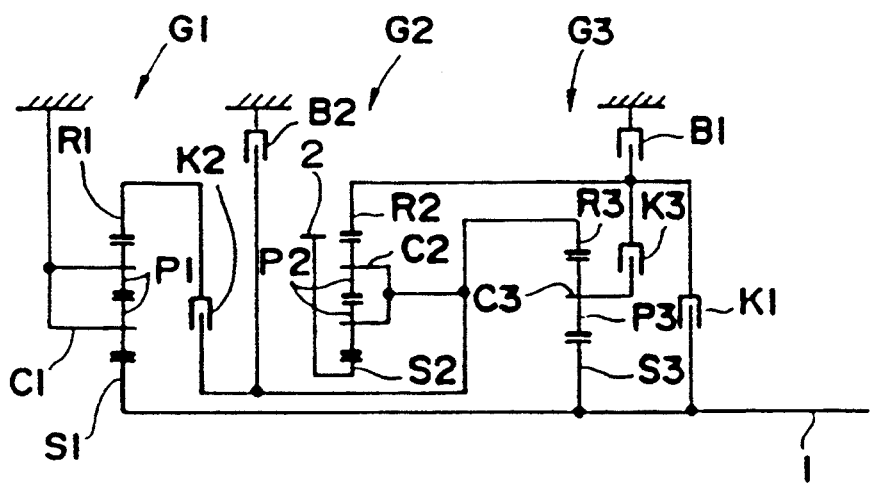

FIG. 43 shows a skelton of a planetary gear transmission according to a 17th embodiment. The transmission shown in FIG. 43 differs from the transmission shown in FIG. 41 only as to the first planetary gear train G1. Specifically, the first sun gear S1 is securely coupled to the input shaft 1, and the first carrier C1 is nonrotatably fixed to a stationary member. The other details of the transmission shown in FIG. 43 are identical to those of the transmission shown in FIG. 41. FIG. 44 shows how the elements are coupled into first through fifth rotational members in the transmission shown in FIG. 43. The speed diagram of the first planetary gear train G1 corresponds to FIG. 6C.

Figures 45, 46:
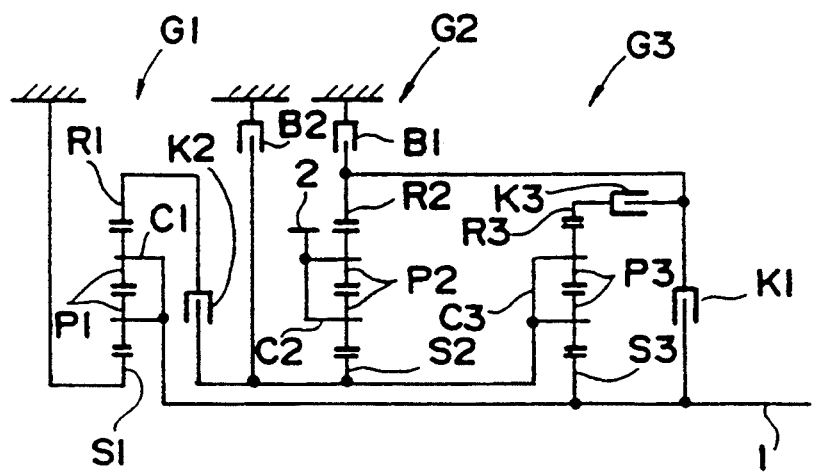

FIG. 45 shows a skelton of a planetary gear transmission according to an 18th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 46 shows how the elements are coupled into first through fifth rotational members.

The sun gear S1 serves as the first rotational member. The ring gear R1, the sun gear S2, and the carrier C3 jointly serve as the second rotational member. The ring gear R2 and the ring gear R3 jointly serve as the third rotational member. The carrier C2 serves as the fourth rotational member. The carrier C1 and the sun gear S3 jointly serve as the fifth rotational member.

Figures 47, 48:
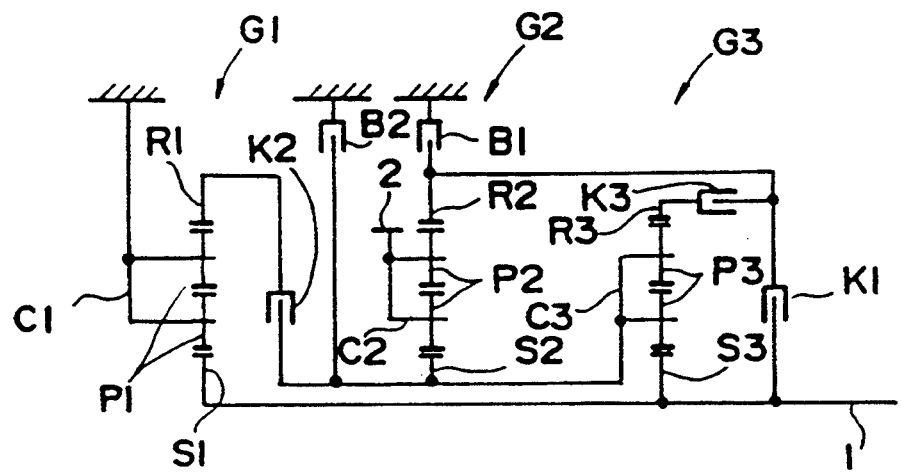

FIG. 47 shows a skelton of a planetary gear transmission according to a 19th embodiment. The transmission shown in FIG. 47 differs from the transmission shown in FIG. 45 only as to the first planetary gear train G1. Specifically, the first sun gear S1 is securely coupled to the input shaft 1, and the first carrier C1 is nonrotatably fixed to a stationary member. The other details of the transmission shown in FIG. 47 are identical to those of the transmission shown in FIG. 45. FIG. 48 shows how the elements are coupled into first through fifth rotational members in the transmission shown in FIG. 47. The speed diagram of the first planetary gear train G1 corresponds to FIG. 6C.

Figures 49, 50:
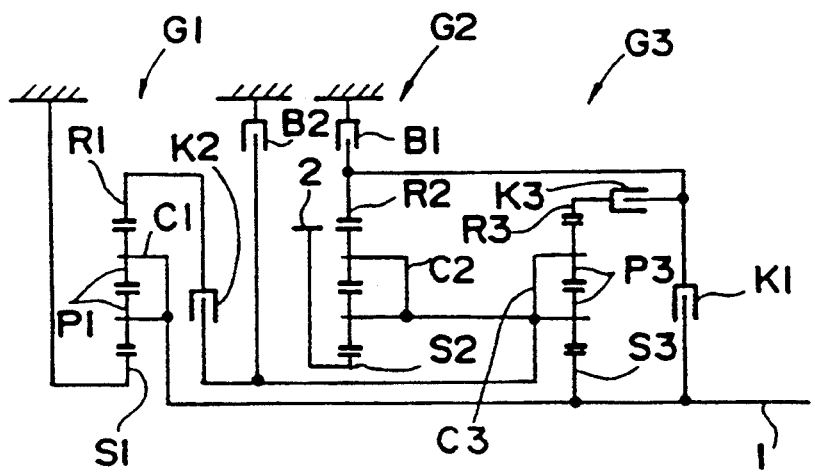

FIG. 49 shows a skelton of a planetary gear transmission according to a 20th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 50 shows how the elements are coupled into first through fifth rotational members.

The sun gear S1 serves as the first rotational member. The ring gear R1, the carrier C2, jointly serve as the second rotational member. The ring gear R2 and the ring gear R3 jointly serve as the third rotational member. The sun gear S2 serves as the fourth rotational member. The carrier C1 and the sun gear S3 jointly serve as the fifth rotational member.

Figures 51, 52:
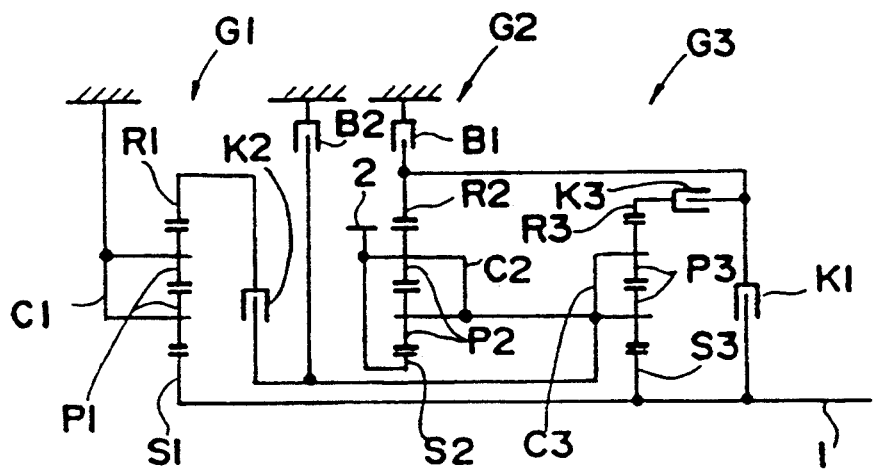

FIG. 51 shows a skelton of a planetary gear transmission according to a 21st embodiment. The transmission shown in FIG. 51 differs from the transmission shown in FIG. 49 only as to the first planetary gear train G1. Specifically, the first sun gear S1 is securely coupled to the input shaft 1, and the first carrier C1 is nonrotatably fixed to a stationary member. The other details of the transmission shown in FIG. 51 are identical to those of the transmission shown in FIG. 49. FIG. 52 shows how the elements are coupled into first through fifth rotational members in the transmission shown in FIG. 51. The speed diagram of the first planetary gear train G1 corresponds to FIG. 6C.

Figures 53, 54:
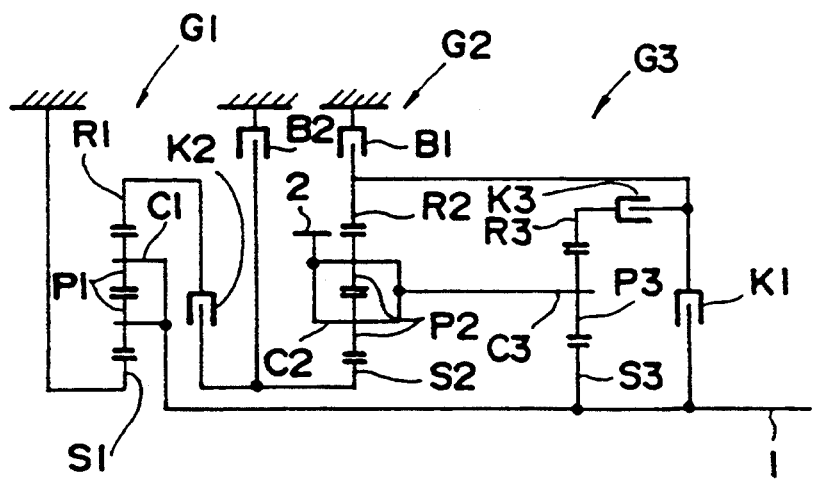

FIG. 53 shows a skelton of a planetary gear transmission according to a 22nd embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is nonrotatably fixed to a securely connected to an input shaft 1, with the first planetary gear train G1 being of a structure as shown in FIG. 6D. FIG. 54 shows how the elements are coupled into first through fifth rotational members.

The sun gear S1 serves as the first rotational member. The ring gear R1 and the sun gear S2 jointly serve as the second rotational member. The ring gear R2 and the ring gear R3 jointly serve as the third rotational member. The carrier C2 and the carrier C3 jointly serve as the fourth rotational member. The carrier C1 and the sun gear S3 jointly serve as the fifth rotational member.

Figures 55, 56:
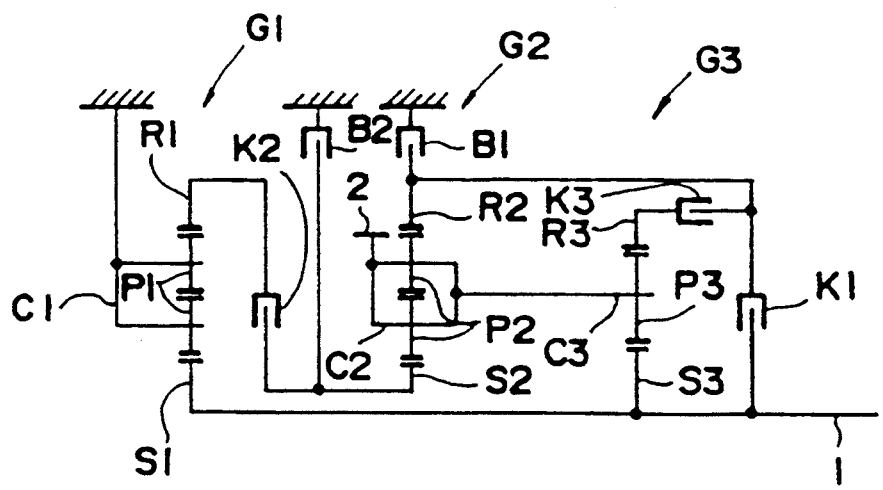

FIG. 55 shows a skelton of a planetary gear transmission according to a 23rd embodiment. The transmission shown in FIG. 55 differs from the transmission shown in FIG. 53 only as to the first planetary gear train G1. Specifically, the first sun gear S1 is securely coupled to the input shaft 1, and the first carrier C1 is nonrotatably fixed to a stationary member. The other details of the transmission shown in FIG. 55 are identical to those of the transmission shown in FIG. 53. FIG. 56 shows how the elements are coupled into first through fifth rotational members in the transmission shown in FIG. 55.

The speed diagram of the first planetary gear train G1 corresponds to FIG. 6C.

Figures 57, 58:
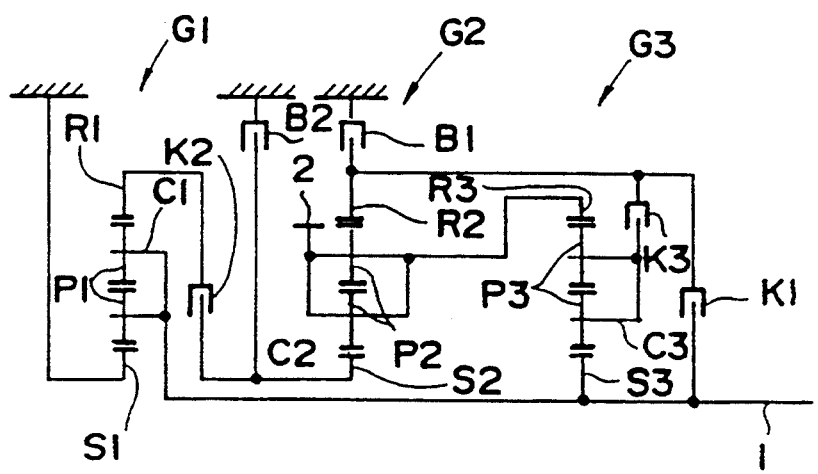

FIG. 57 shows a skelton of a planetary gear transmission according to a 24th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 58 shows how the elements are coupled into first through fifth rotational members.

The sun gear S1 serves as the first rotational member. The ring gear R1 and the sun gear S2 jointly serve as the second rotational member. The ring gear R2 and the carrier C3 jointly serve as the third rotational member. The carrier C2 and the ring gear R3 jointly serve as the fourth rotational member. The carrier C1 and the sun gear S3 jointly serve as the fifth rotational member.

Figures 59, 60:
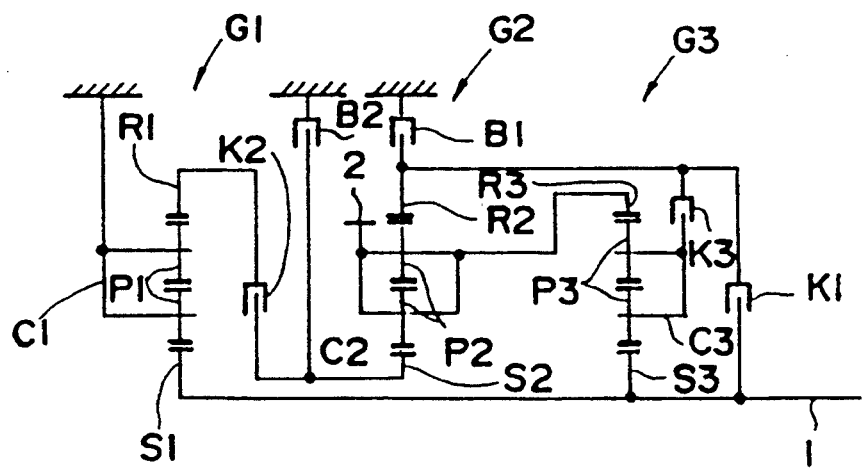

FIG. 59 shows a skelton of a planetary gear transmission according to a 25th embodiment. The transmission shown in FIG. 59 differs from the transmission shown in FIG. 57 only as to the first planetary gear train G1. Specifically, the first sun gear S1 is securely coupled to the input shaft 1, and the first carrier C1 is nonrotatably fixed to a stationary member. The other details of the transmission shown in FIG. 59 are identical to those of the transmission shown in FIG. 57. FIG. 60 shows how the elements are coupled into first through fifth rotational members in the transmission shown in FIG. 59. The speed diagram of the first planetary gear train G1 corresponds to FIG. 6C.

Figures 61, 62:
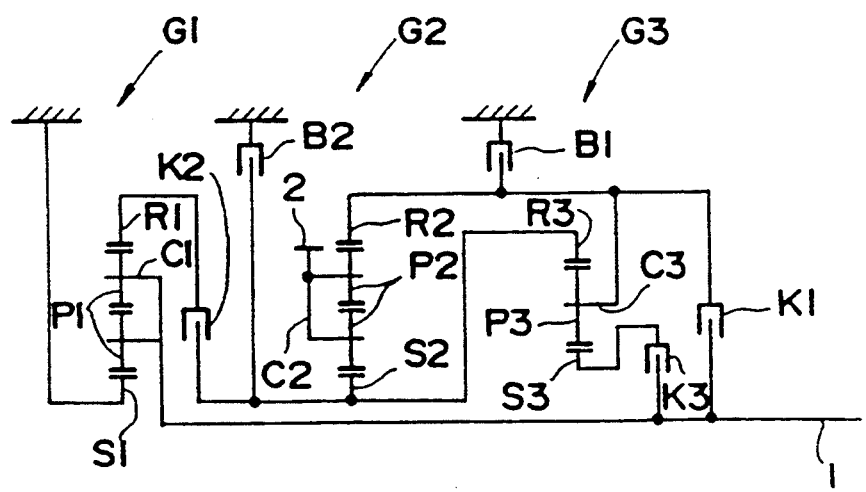

FIG. 61 shows a skelton of a planetary gear transmission according to a 26th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 62 shows how the elements are coupled into first through fifth rotational members.

The sun gear S1 serves as the first rotational member. The ring gear R1, the sun gear S2, and the ring gear R3 jointly serve as the second rotational member. The ring gear R2 and the carrier C3 jointly serve as the third rotational member. The carrier C2 serves as the fourth rotational member. The carrier C1 and the sun gear S3 jointly serve as the fifth rotational member.

Figures 63, 64:
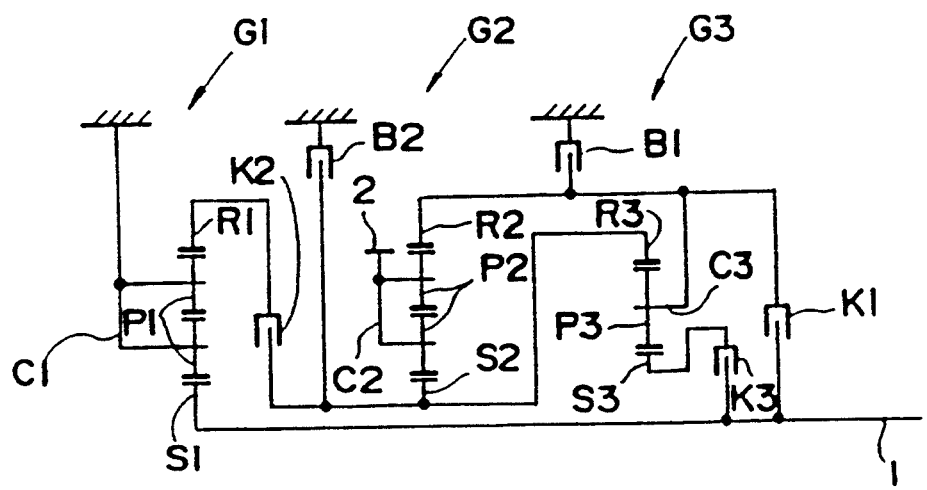

FIG. 63 shows a skelton of a planetary gear transmission according to a 27th embodiment. The transmission shown in FIG. 63 differs from the transmission shown in FIG. 61 only as to the first planetary gear train G1. Specifically, the first sun gear S1 is securely coupled to the input shaft 1, and the first carrier C1 is nonrotatably fixed to a stationary member. The other details of the transmission shown in FIG. 63 are identical to those of the transmission shown in FIG. 61. FIG. 64 shows how the elements are coupled into first through fifth rotational members in the transmission shown in FIG. 63. The speed diagram of the first planetary gear train G1 corresponds to FIG. 6C.

Figures 65, 66:
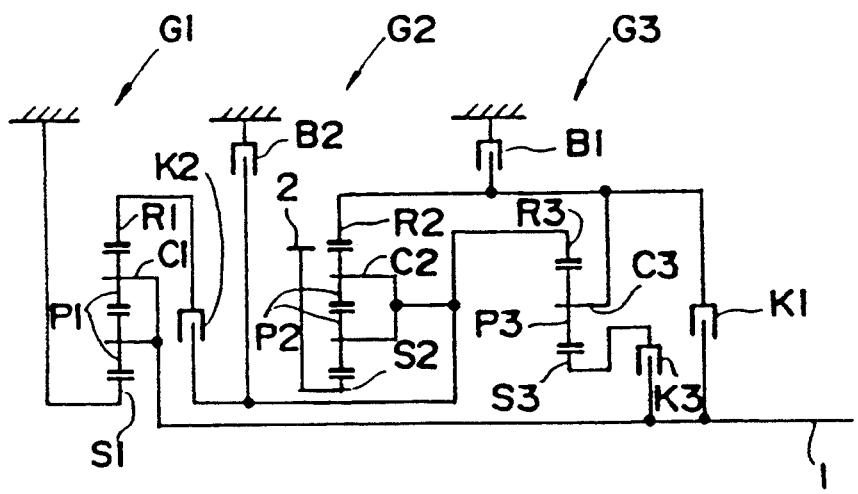

FIG. 65 shows a skelton of a planetary gear transmission according to a 28th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 66 shows how the elements are coupled into first through fifth rotational members.

The sun gear S1 serves as the first rotational member. The ring gear R1, the carrier C2, and the ring gear R3 jointly serve as the second rotational member. The ring gear R2 and the carrier C3 jointly serve as the third rotational member. The sun gear S2 serves as the fourth rotational member. The carrier C1 and the sun gear S3 serve as the fifth rotational member.

Figures 67, 68:
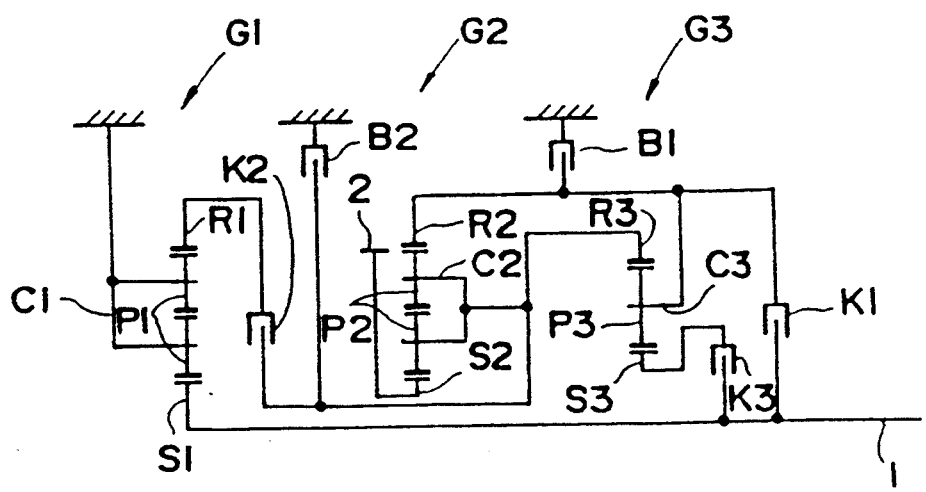

FIG. 67 shows a skelton of a planetary gear transmission according to a 29th embodiment. The transmission shown in FIG. 67 differs from the transmission shown in FIG. 65 only as to the first planetary gear train G1. Specifically, the first sun gear S1 is securely coupled to the input shaft 1, and the first carrier C1 is nonrotatably fixed to a stationary member. The other details of the transmission shown in FIG. 67 are identical to those of the transmission shown in FIG. 65. FIG. 68 shows how the elements are coupled into first through fifth rotational members in the transmission shown in FIG. 67. The speed diagram of the first planetary gear train G1 corresponds to FIG. 6C.

Figures 69, 70:
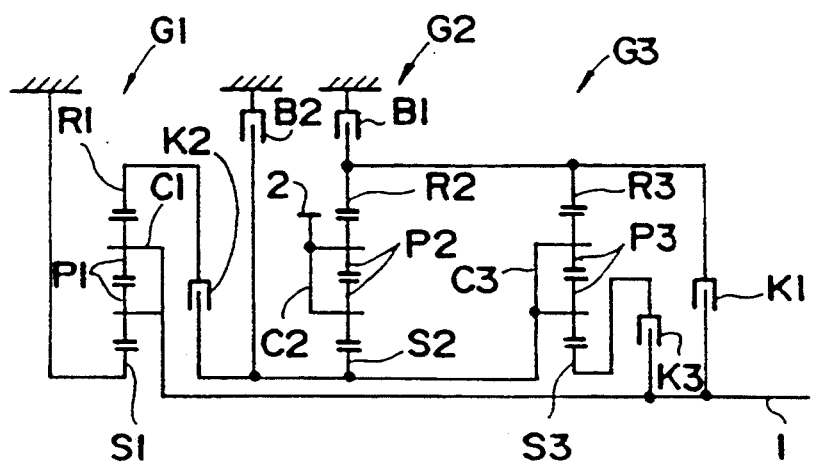

FIG. 69 shows a skelton of a planetary gear transmission according to a 30th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 70 shows how the elements are coupled into first through fifth rotational members.

The sun gear S1 serves as the first rotational member. The ring gear R1, the sun gear S2, and the carrier C3 jointly serve as the second rotational member. The ring gear R2 and the ring gear R3 jointly serve as the third rotational member. The carrier C2 serves as the fourth rotational member. The carrier C1 and the sun gear S3 jointly serve as the fifth rotational member.

Figures 71, 72:
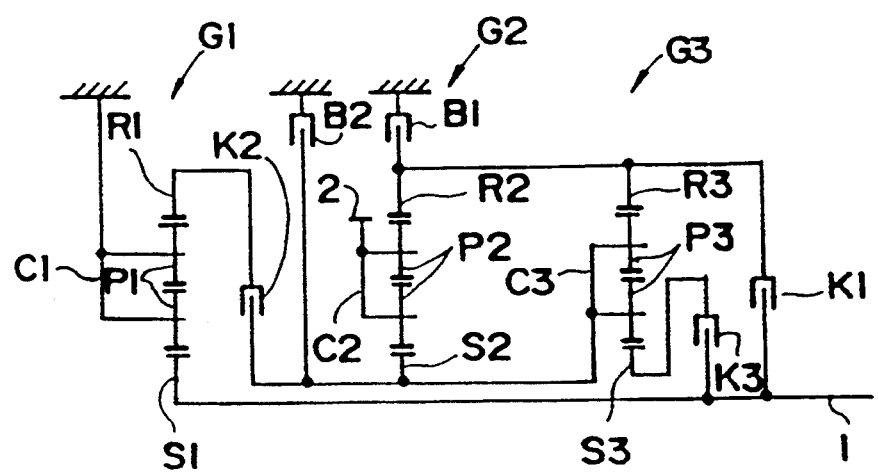

FIG. 71 shows a skelton of a planetary gear transmission according to a 31st embodiment. The transmission shown in FIG. 71 differs from the transmission shown in FIG. 69 only as to the first planetary gear train G1. Specifically, the first sun gear S1 is securely coupled to the input shaft 1, and the first carrier C1 is nonrotatably fixed to a stationary member. The other details of the transmission shown in FIG. 71 are identical to those of the transmission shown in FIG. 69. FIG. 72 shows how the elements are coupled into first through fifth rotational members in the transmission shown in FIG. 71. The speed diagram of the first planetary gear train G1 corresponds to FIG. 6C.

Figures 73, 74:
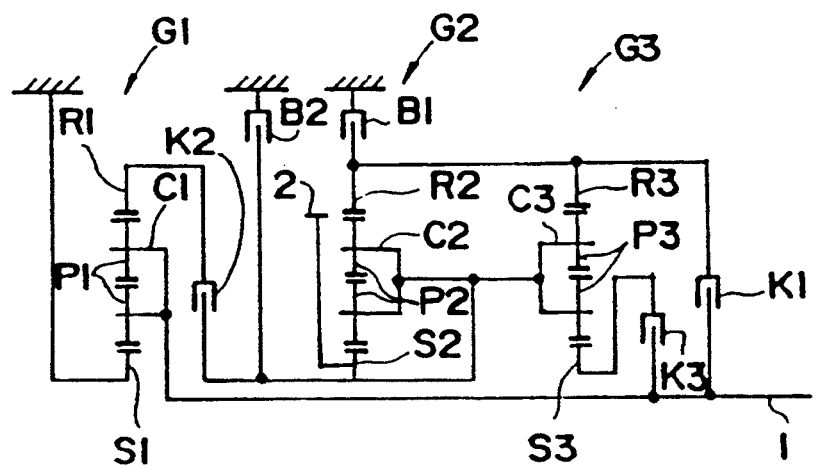

FIG. 73 shows a skelton of a planetary gear transmission according to a 32nd embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 74 shows how the elements are coupled into first through fifth rotational members.

The sun gear S1 serves as the first rotational member. The ring gear R1, the carrier C2, and the carrier C3 jointly serve as the second rotational member. The ring gear R2 and the ring gear R3 jointly serve as the third rotational member. The sun gear S2 serves as the fourth rotational member. The carrier C1 and the sun gear S3 jointly serve as the fifth rotational member.

Figures 75, 76:
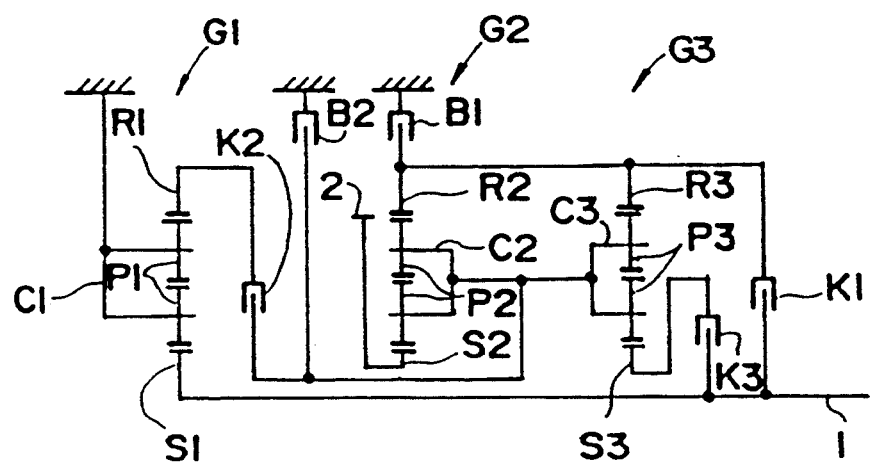

FIG. 75 shows a skelton of a planetary gear transmission according to a 33rd embodiment. The transmission shown in FIG. 75 differs from the transmission shown in FIG. 73 only as to the first planetary gear train G1. Specifically, the first sun gear S1 is securely coupled to the input shaft 1, and the first carrier C1 is nonrotatably fixed to a stationary member. The other details of the transmission shown in FIG. 75 are identical to those of the transmission shown in FIG. 73. FIG. 76 shows how the elements are coupled into first through fifth rotational members in the transmission shown in FIG. 75. The speed diagram of the first planetary gear train G1 corresponds to FIG. 6C.

Figures 77, 78:
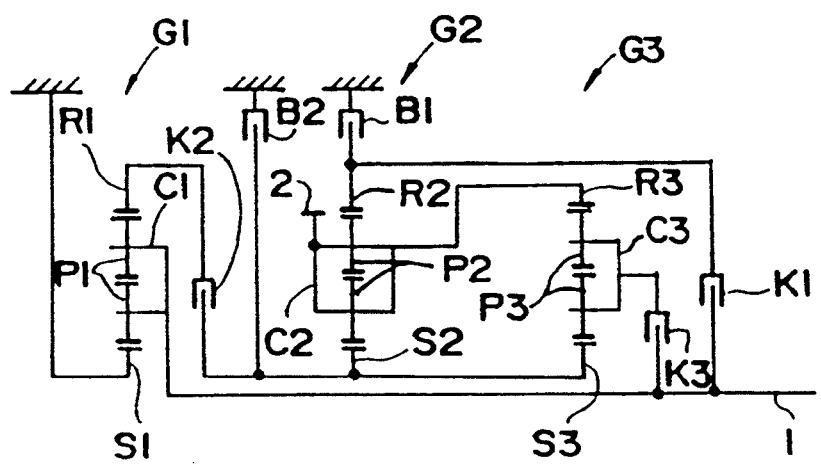

FIG. 77 shows a skelton of a planetary gear transmission according to a 34th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 78 shows how the elements are coupled into first through fifth rotational members.

The sun gear S1 serves as the first rotational member. The ring gear R1, the sun gear S2, and the sun gear S3 jointly serve as the second rotational member. The ring gear R2 serves as the third rotational member. The carrier C2 and the ring gear R3 jointly serve as the fourth rotational member. The carrier C1 and the carrier C3 jointly serve as the fifth rotational member.

Figures 79, 80:
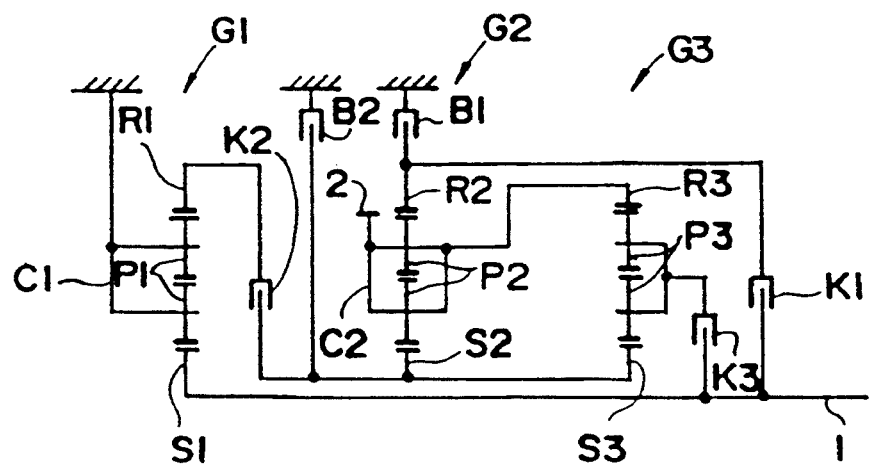

FIG. 79 shows a skelton of a planetary gear transmission according to a 35th embodiment. The transmission shown in FIG. 79 differs from the transmission shown in FIG. 77 only as to the first planetary gear train G1. Specifically, the first sun gear S1 is securely coupled to the input shaft 1, and the first carrier C1 is nonrotatably fixed to a stationary member. The other details of the transmission shown in FIG. 79 are identical to those of the transmission shown in FIG. 77. FIG. 80 shows how the elements are coupled into first through fifth rotational members in the transmission shown in FIG. 79. The speed diagram of the first planetary gear train G1 corresponds to FIG. 6C.

Figures 81, 82:
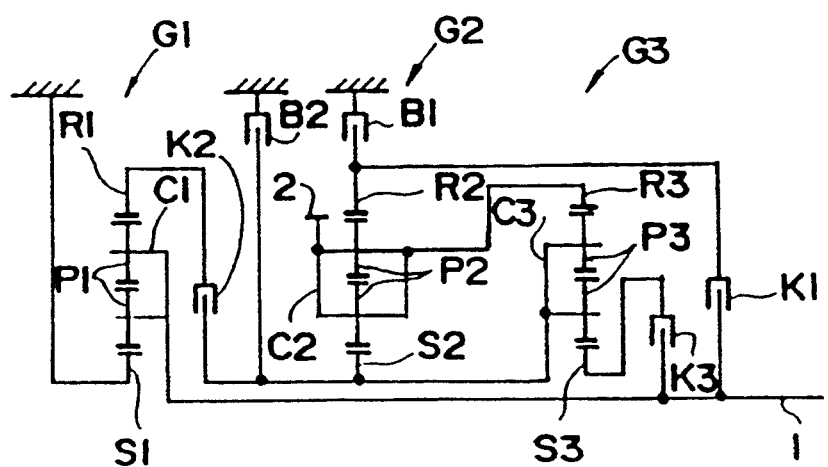

FIG. 81 shows a skelton of a planetary gear transmission according to a 36th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 82 shows how the elements are coupled into first through fifth rotational members.

The sun gear S1 serves as the first rotational member. The ring gear R1, the sun gear S2, and the carrier C3 jointly serve as the second rotational member. The ring gear R2 serves as the third rotational member. The carrier C2 and the ring gear R3 jointly serve as the fourth rotational member. The carrier C1 and the sun gear S3 jointly serve as the fifth rotational member.

Figures 83, 84:
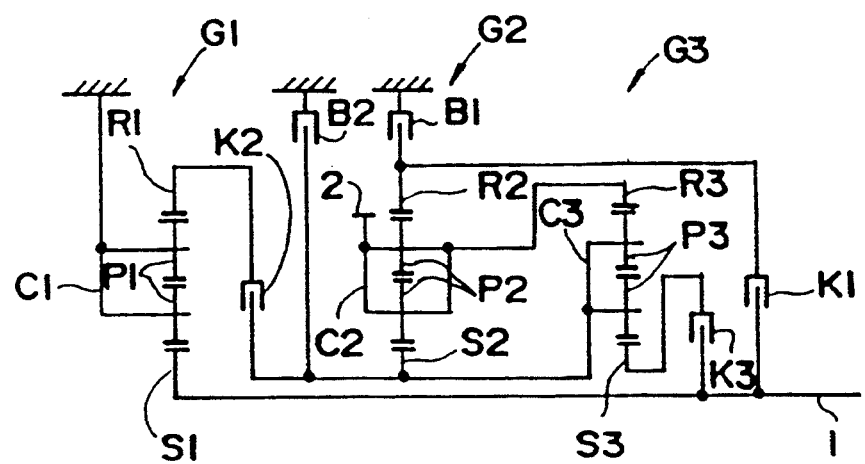

FIG. 83 shows a skelton of a planetary gear transmission according to a 37th embodiment. The transmission shown in FIG. 83 differs from the transmission shown in FIG. 81 only as to the first planetary gear train G1. Specifically, the first sun gear S1 is securely coupled to the input shaft 1, and the first carrier C1 is nonrotatably fixed to a stationary member. The other details of the transmission shown in FIG. 83 are identical to those of the transmission shown in FIG. 81. FIG. 84 shows how the elements are coupled into first through fifth rotational members in the transmission shown in FIG. 83. The speed diagram of the first planetary gear train G1 corresponds to FIG. 6C.

Figures 85, 86:
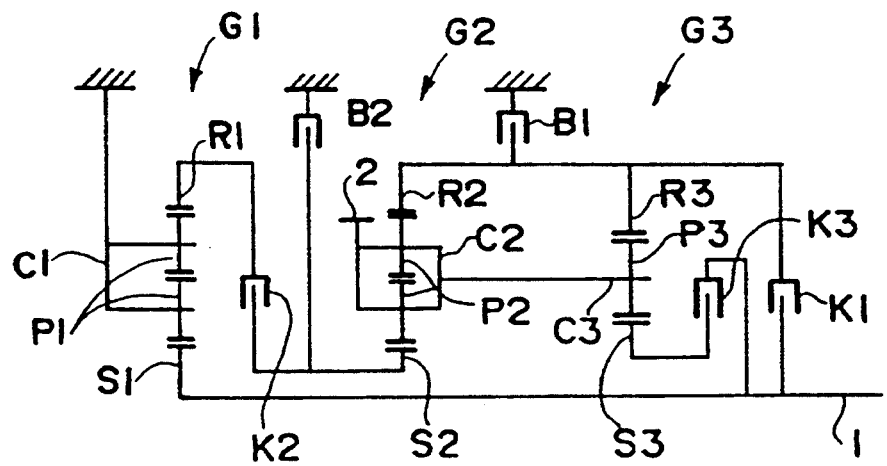

FIG. 85 shows a skelton of a planetary gear transmission according to a 38th embodiment. The transmission has first, second, and third planetary gear trains G1, G2, G3 which are coaxially arranged parallel to each other. The first and second planetary gear trains G1, G2 comprise double-pinion planetary gear trains, and the third train G3 comprises a single-pinion planetary gear trains.

The first carrier C1 is nonrotatably fixed to a stationary member, and the first sun gear 51 is securely connected to an input shaft 1, with the first planetary gear train G1 being of a structure as shown in FIG. 6D. FIG. 86 shows how the elements are coupled into first through fifth rotational members.

The sun gear S1 serves as the first rotational member. The ring gear R1 and the sun gear S2 jointly serve as the second rotational member. The ring gear R2 and the ring gear R3 jointly serve as the third rotational member. The carrier C2 and the carrier C3 jointly serve as the fourth rotational member. The carrier C1 and the sun gear S3 jointly serve as the fifth rotational member.

Figures 87, 88:
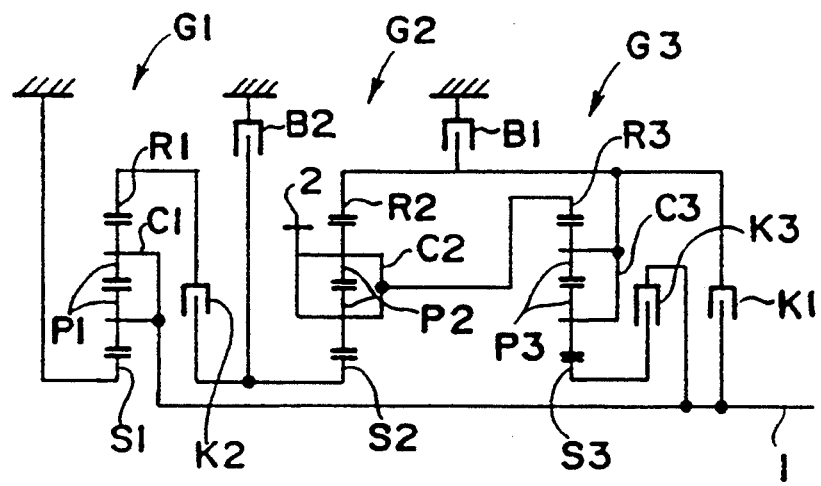

FIG. 87 shows a skelton of a planetary gear transmission according to a 39th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 88 shows how the elements are coupled into first through fifth rotational members.

The sun gear S1 serves as the first rotational member. The ring gear R2 and the sun gear S2 jointly serve as the second rotational member. The ring gear R2 and the carrier C3 jointly serve as the third rotational member. The carrier C2 and the ring gear R3 jointly serve as the fourth rotational member. The carrier C1 and the sun gear S3 jointly serve as the fifth rotational member.

Figures 89, 90:
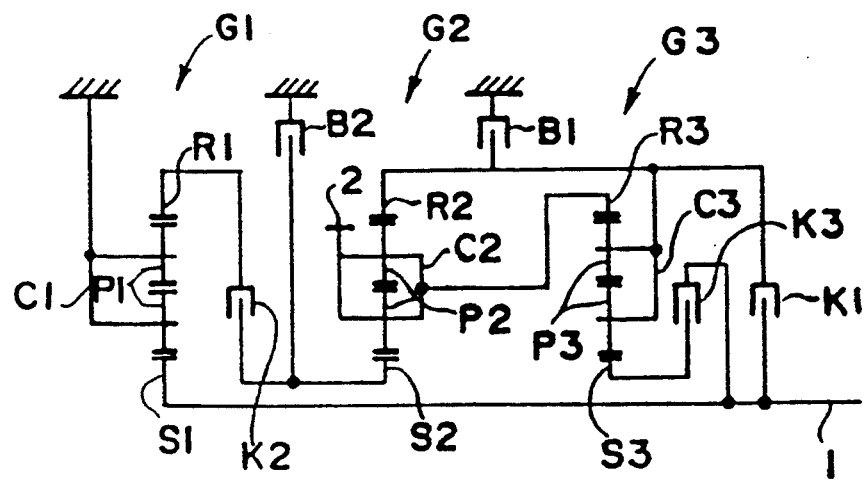

FIG. 89 shows a skelton of a planetary gear transmission according to a 40th embodiment. The transmission shown in FIG. 89 differs from the transmission shown in FIG. 87 only as to the first planetary gear train G1. Specifically, the first sun gear S1 is securely coupled to the input shaft 1, and the first carrier C1 is nonrotatably fixed to a stationary member. The other details of the transmission shown in FIG. 89 are identical to those of the transmission shown in FIG. 87. FIG. 90 shows how the elements are coupled into first through fifth rotational members in the transmission shown in FIG. 89. The speed diagram of the first planetary gear train G1 corresponds to FIG. 6C.

Figures 91, 92:
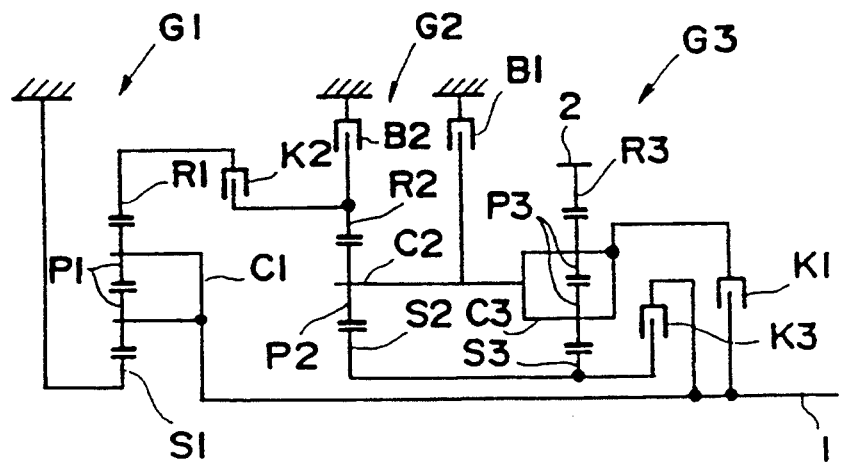

FIG. 91 shows a skelton of a planetary gear transmission according to a 41st embodiment. The transmission has first, second, and third planetary gear trains G1, G2, G3 which are coaxially arranged parallel to each other. The first and third planetary gear trains G1, G3 comprise double-pinion planetary gear trains, and the second train G2 comprises a single-pinion gear train.

The first sun gear S1 is nonrotatably fixed to a stationary member, and the first carrier C1 is securely connected to an input shaft 1, with the first planetary gear train G1 being of a structure as shown in FIG. 6D. FIG. 92 shows how the elements are coupled into first through fifth rotational members.

The sun gear S1 serves as the first rotational member. The ring gear R1 and the ring gear R2 jointly serve as the second rotational member. The carrier C2 and the carrier C3 jointly serve as the third rotational member. The ring gear R3 serves the fourth rotational member. The carrier C1, the sun gear S2, the fifth rotational member.

Figure 93:
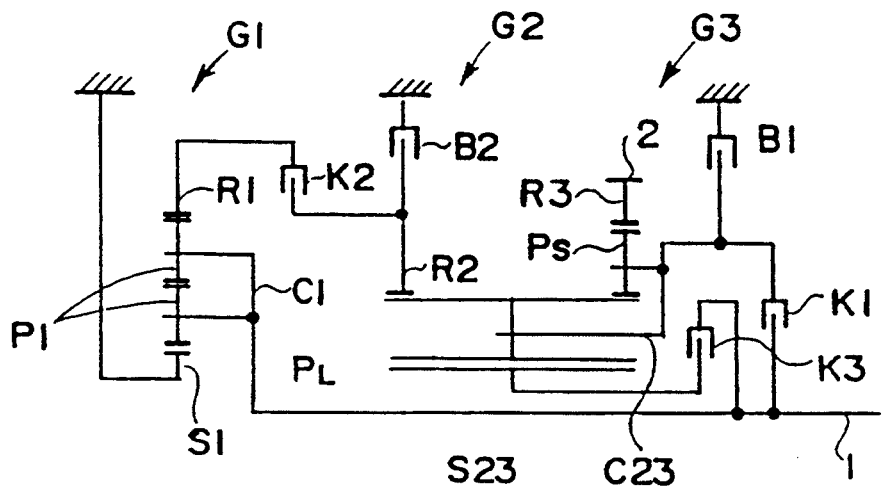

A planetary gear transmission according to a 42nd embodiment can comprise a Ravigneaux gear train in the second and the third planetary gear trains G2, G3 as shown in FIG. 93. In this embodiment, a common sun gear S23 is used in the trains G2, G3. A long pinion $P_L$ and a short pinion $P_S$ are disposed as shown, and are rotatably supported by a common carrier C23. Accordingly, in the embodiment, the second planetary gear train G2 comprises the common sun gear S23, the common carrier C23, the long pinion $P_L$ and the second ring gear R2. The third planetary gear train G3 comprises the common sun gear S23, the common carrier C23, the long pinion $P_L$, the short pinion $P_S$ and the third ring gear R3.

Figure 94:
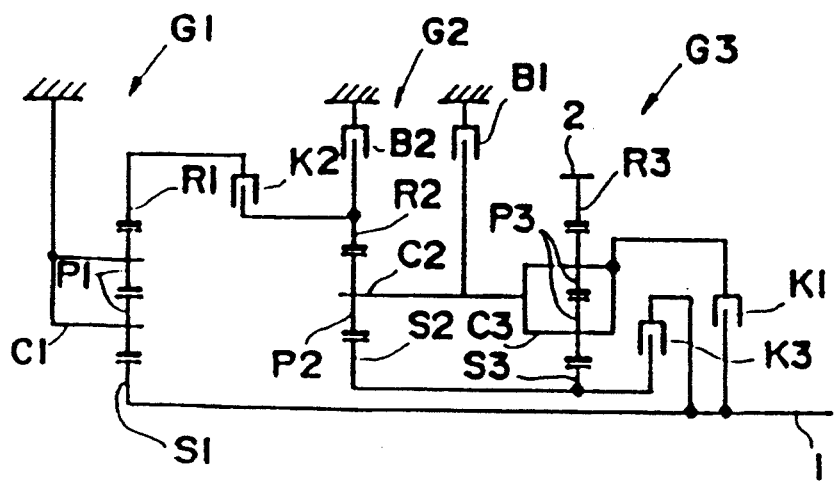
Figures 95, 96:
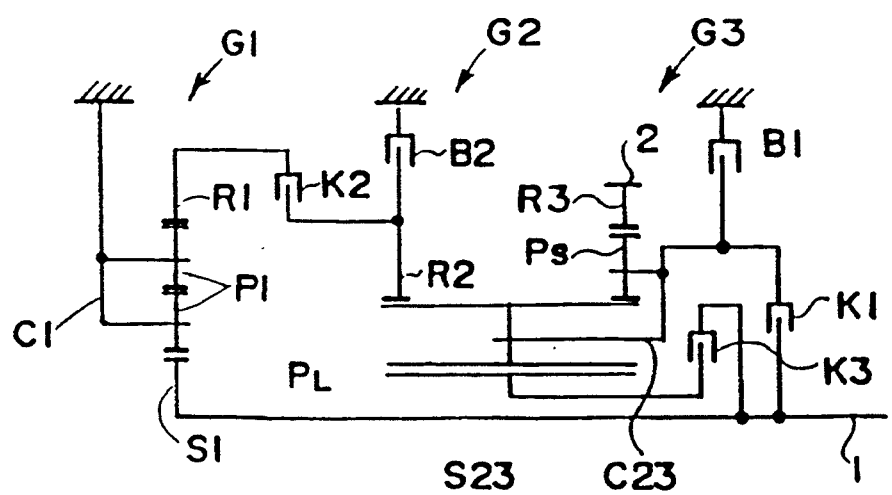

FIG. 94 shows a skelton of a planetary gear transmission according to a 43rd embodiment. The transmission shown in FIG. 94 differs from the transmission shown in FIG. 91 only as to the first planetary gear train G1. Specifically, the first sun gear S1 is securely coupled to the input shaft 1, and the first carrier C1 is nonrotatably fixed to a stationary member. The other details of the transmission shown in FIG. 94 are identical to those of the transmission shown in FIG. 91. FIG. 95 shows how the elements are coupled into first through fifth rotational members in the transmission shown in FIG. 94. The speed diagram of the first planetary gear train G1 corresponds to FIG. 6C.

A planetary gear transmission according to a 44th embodiment can also comprise a Ravigneaux gear train in the second and the third planetary gear trains G2, G3 as shown in FIG. 96. In this embodiment, the second planetary gear train G2 comprises the common sun gear S23, the common carrier C23, the long pinion $P_L$ and the second ring gear R2. The third planetary gear train G3 comprises the common sun gear S23, the common carrier C23, the long pinion $P_L$, the short pinion $P_S$ and the third ring gear R3.

Figures 97, 98:
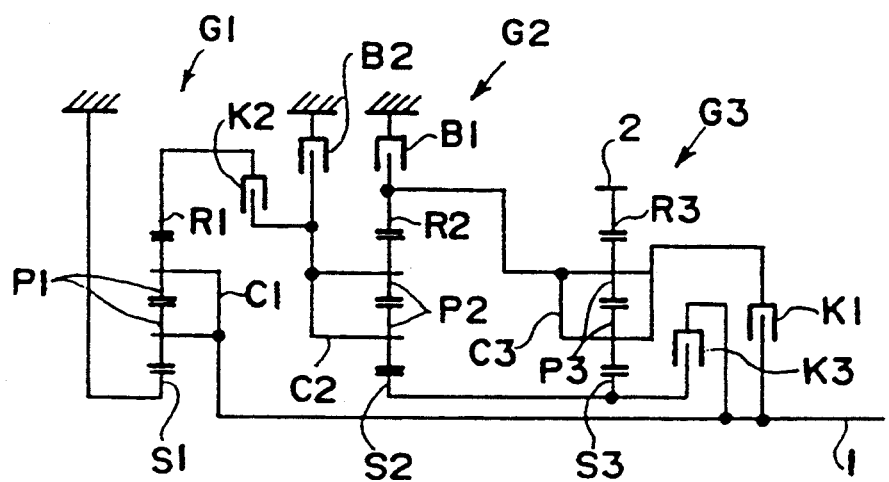

FIG. 97 shows a skeleton of a planetary gear transmission according to a 45th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 98 shows how the elements are coupled into first through fifth rotational members.

The sun gear S1 serves as the first rotational member. The ring gear R1 and the carrier C2 jointly serve as the second rotational member. The ring gear R2 and the carrier C3 jointly serve as the third rotational member. The ring gear R3 serves as the fourth rotational member. The carrier C1, the sun gear S2, and the sun gear S3 jointly serve as the fifth rotational member.

Figures 99, 100:
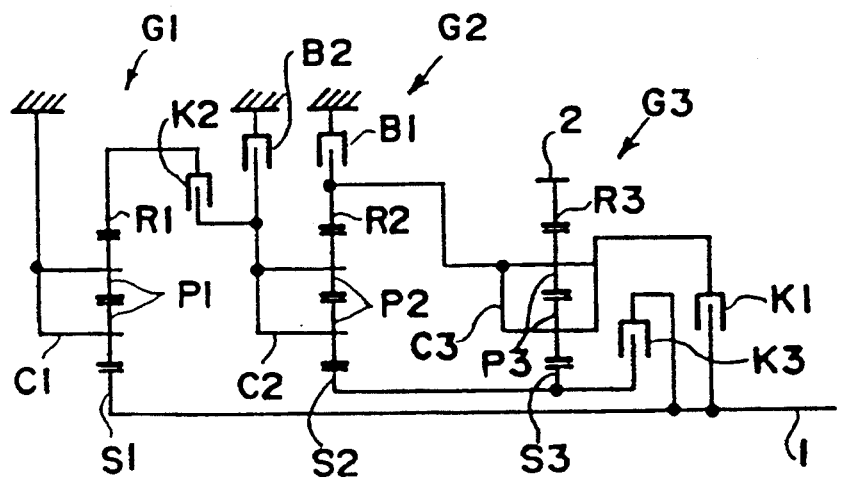

FIG. 99 shows a skeleton of a planetary gear transmission according to a 46th embodiment. The transmission shown in FIG. 99 differs from the transmission shown in FIG. 97 only as to the first planetary gear train G1. Specifically, the first sun gear S1 is securely coupled to the input shaft 1, and the first carrier C1 is nonrotatably fixed to a stationary member. The other details of the transmission shown in FIG. 99 are identical to those of the transmission shown in FIG. 97. FIG. 100 shows how the elements are coupled into first through fifth rotational members in the transmission shown in FIG. 99. The speed diagram of the first planetary gear train G1 corresponds to FIG. 6C.

Figures 101, 102:
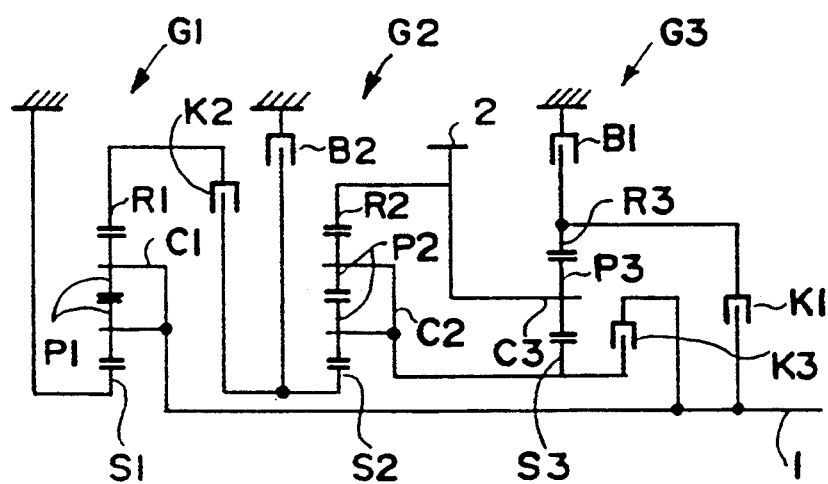

FIG. 101 shows a skeleton of a planetary gear transmission according to a 47th embodiment. The transmission has first, second, and third planetary gear trains G1, G2, G3 which are coaxially arranged parallel to each other. The first and second planetary gear trains G1, G2 comprise double-pinion planetary gear trains, and the third train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 102 shows how the elements are coupled into first through fifth rotational members.

The sun gear S1 serves the first rotational member. The ring gear R1 and the sun gear S2 jointly serve as the second rotational member. The ring gear R3 serves as the third rotational member. The ring gear R2 and the carrier C3 jointly serve as the fourth rotational member. The carrier C1, the carrier C2, and the sun gear S3 jointly serve as the fifth rotational member.

Figures 103, 104:
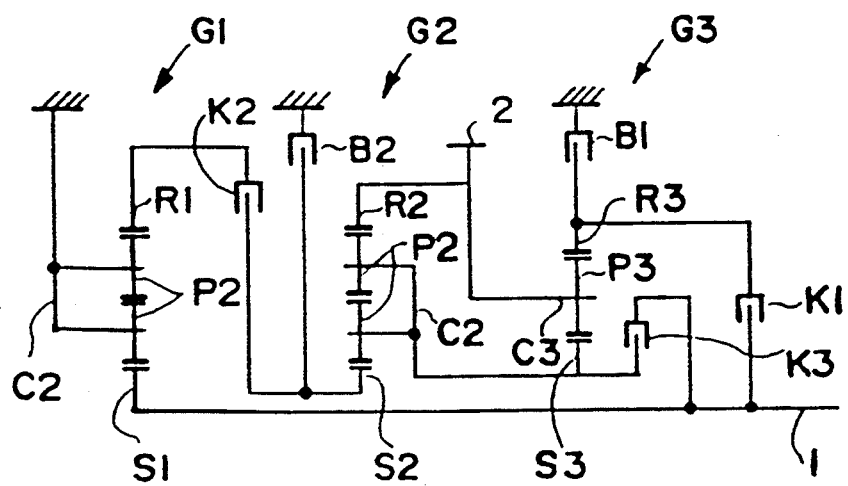

FIG. 103 shows a skeleton of a planetary gear transmission according to a 48th embodiment. The transmission shown in FIG. 103 differs from the transmission shown in FIG. 101 only as to the first planetary gear train G1. Specifically, the first sun gear S1 is securely coupled to the input shaft 1, and the first carrier C1 is nonrotatably fixed to a stationary member. The other details of the transmission shown in FIG. 103 are identical to those of the transmission shown in FIG. 101. FIG. 104 shows how the elements are coupled into first through fifth rotational members in the transmission shown in FIG. 103. The speed diagram of the first planetary gear train G1 corresponds to FIG. 6C.

Figures 105, 106:
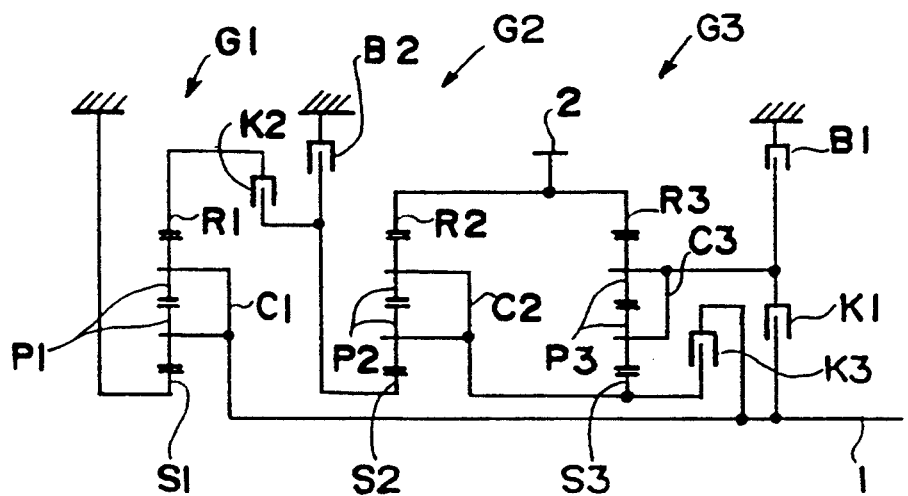

FIG. 105 shows a skeleton of a planetary gear transmission according to a 49th embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 106 shows how the elements are coupled into first through fifth rotational members.

The sun gear S1 serves as the first rotational member. The ring gear R1 and the sun gear S2 jointly serve as the second rotational member. The carrier C3 serves as the third rotational member. The ring rear R2 and the ring gear R3 jointly serve as the fourth rotational member. The carrier C1, the carrier C2, and the sun gear S3 jointly serve as the fifth rotational member.

Figures 107, 108:
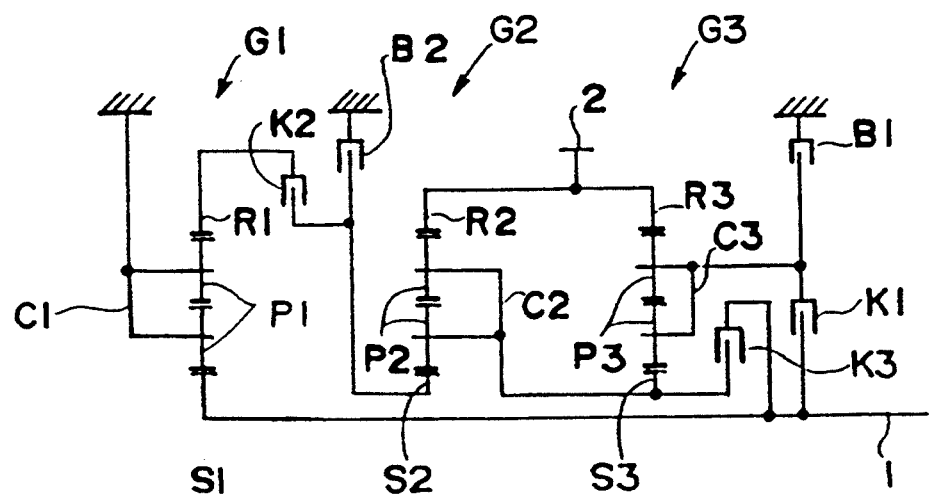

FIG. 107 shows a skeleton of a planetary gear transmission according to a 50th embodiment. The transmission shown in FIG. 107 differs from the transmission shown in FIG. 105 only as to the first planetary gear train G1. Specifically, the first sun gear S1 is securely coupled to the input shaft 1, and the first carrier C1 is nonrotatably fixed to a stationary member. The other details of the transmission shown in FIG. 107 are identical to those of the transmission shown in FIG. 105. FIG. 108 shows how the elements are coupled into first through fifth rotational members in the transmission shown in FIG. 107. The speed diagram of the first planetary gear train G1 corresponds to FIG. 6C.

Figures 109, 110:
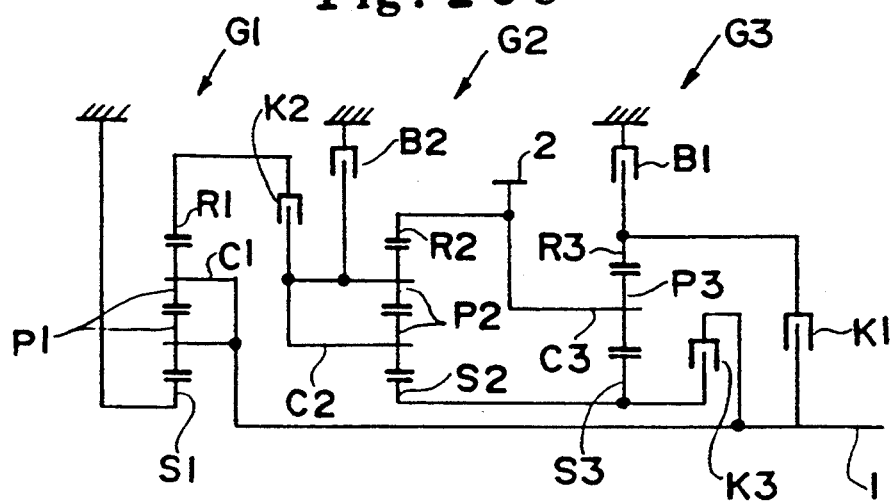

FIG. 109 shows a skeleton of a planetary gear transmission according to a 51st embodiment. The transmission has first, second, and third planetary gear trains G1, G2, G3 which are coaxially arranged parallel to each other. The first and second planetary gear trains G1, G2 comprise double-pinion planetary gear trains, and the third train G3 comprises a single-pinion planetary gear train.

The first sun gear S1 is nonrotatably fixed to a stationary member, and the first carrier C1 is securely connected to an input shaft 1, with the first planetary gear train G1 being of a structure as shown in FIG. 6D. FIG. 110 shows how the elements are coupled into first through fifth rotational members.

The sun gear S1 serves as the first rotational member. The ring gear R1 and the carrier C2 jointly serve as the second rotational member. The ring gear R3 serves as the third rotational member. The ring gear R2 and the carrier C3 jointly serve as the fourth rotational member. The carrier C1, the sun gear S2, and the sun gear S3 jointly serve as the fifth rotational member.

Figures 111, 112:
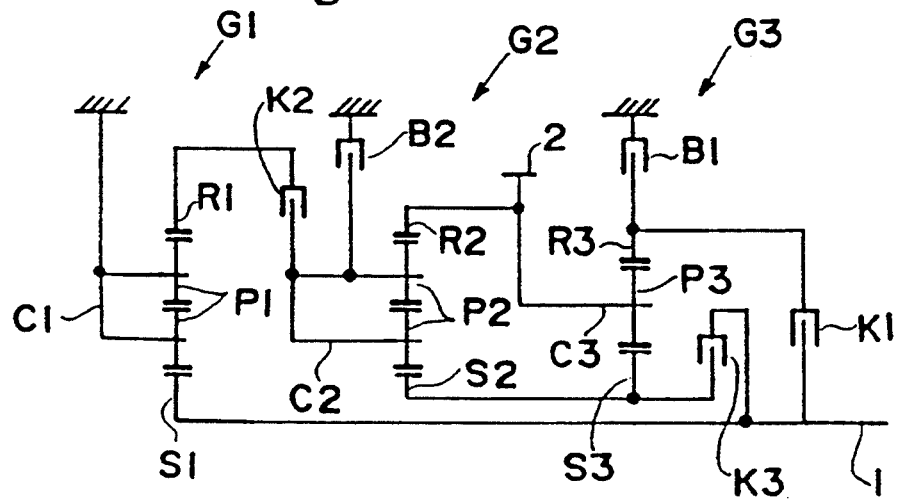

FIG. 111 shows a skeleton of a planetary gear transmission according to a 52nd embodiment. The transmission shown in FIG. 111 differs from the transmission shown in FIG. 109 only as to the first planetary gear train G1. Specifically, the first sun gear S1 is securely coupled to the input shaft 1, and the first carrier C1 is nonrotatably fixed to a stationary member. The other details of the transmission shown in FIG. 111 are identical to those of the transmission shown in FIG. 109. FIG. 112 shows how the elements are coupled into first through fifth rotational members in the transmission shown in FIG. 111. The speed diagram of the first planetary gear train G1 corresponds to FIG. 6C.

Figures 113, 114:
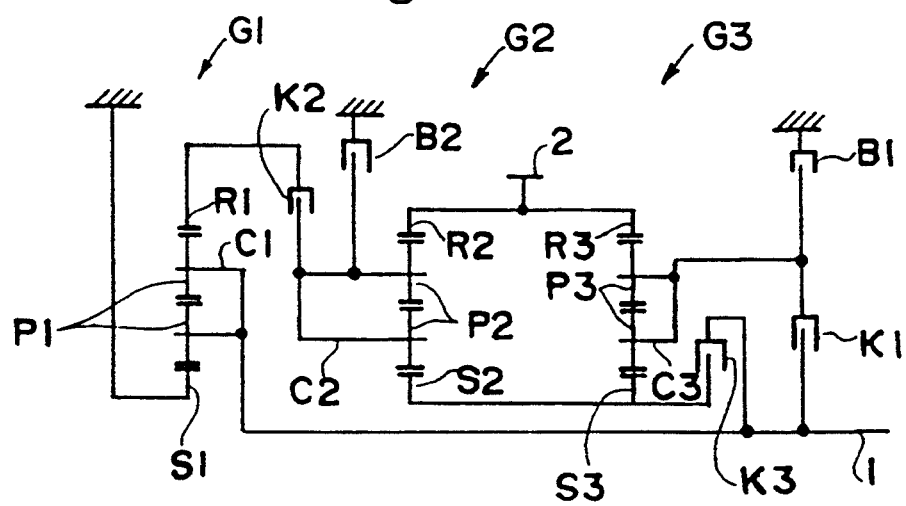

FIG. 113 shows a skeleton of a planetary gear transmission according to a 53rd embodiment. The transmission has first, second, and third planetary gear trains G1, G2, G3 which are coaxially arranged parallel to each other, and all of the planetary gear trains G1, G2, G3 comprise double-pinion planetary gear trains, respectively.

The first sun gear S1 is nonrotatably fixed to a stationary member, and the first carrier C1 is securely connected to an input shaft 1, with the first planetary gear train G1 being of a structure as shown in FIG. 6D. FIG. 114 shows how the elements are coupled into first through fifth rotational members.

The sun gear S1 serves as the first rotational member. The ring gear R1 and the carrier C2 jointly serve as the second rotational member. The carrier C3 serves as the third rotational member. The ring gear R2 and the ring gear R3 serve as the fourth rotational member. The carrier C1, the sun gear S2, and the sun gear S3 jointly serve as the fifth rotational member.

Figures 115, 116:
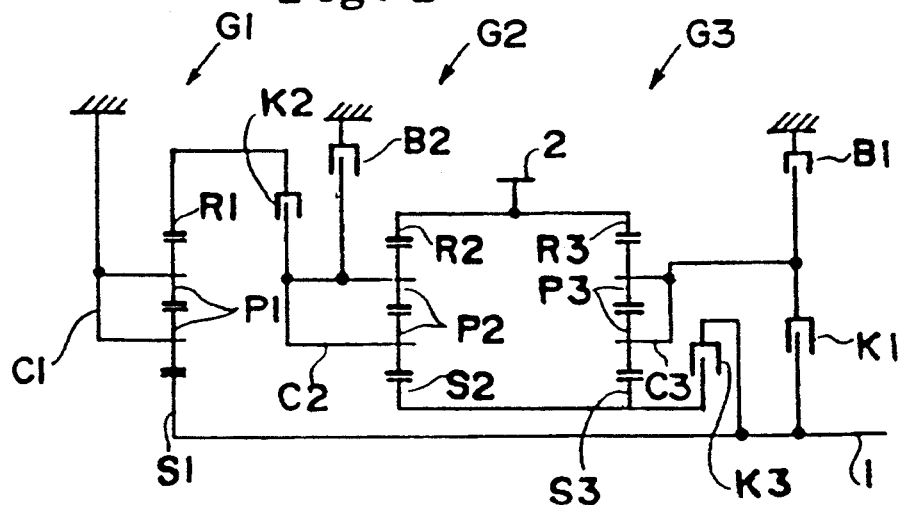

FIG. 115 shows a skeleton of a planetary gear transmission according to a 54th embodiment. The transmission shown in FIG. 115 differs from the transmission shown in FIG. 113 only as to the first planetary gear train G1. Specifically, the first sun gear S1 is securely coupled to the input shaft 1, and the first carrier C1 is nonrotatably fixed to a stationary member. The other details of the transmission shown in FIG. 115 are identical to those of the transmission shown in FIG. 113. FIG. 116 shows how the elements are coupled into first through fifth rotational members in the transmission shown in FIG. 115. The speed diagram of the first planetary gear train G1 corresponds to FIG. 6C.

Supplemental Description of the Embodiments

As described above, the first planetary gear train G1 comprises the first, second and fifth rotational members ①, ② and ⑤. On the other hand, the second and third planetary gear train G2 and G3 comprise the second, third, fourth and fifth rotational members ②, ③, ④ and ⑤. The planetary gear transmissions according to the present invention can be represented by five combinations of the first-fifth rotational members as shown in FIGS. 117, 119, 121, 123 and 125. In these figures, one of the three element (sun gear, carrier and ring gear) is respectively provided at the place where the symbol (O) is marked.

The combination as shown in FIG. 117 is divided into three types based on the position of clutch means K in a diagram as shown in FIG. 118. In the combination of FIG. 117, the second planetary gear train G2 comprises the 2nd, 3rd and 4th rotational members ②, ③ and ④, and the third planetary gear train G3 comprises the 2nd, 3rd and 5th rotational members ②, ③ and ⑤.

Figure 118A:
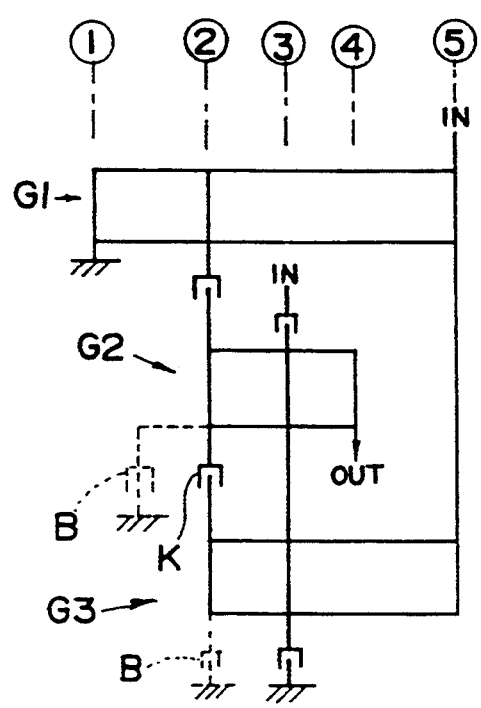

In the first type as shown in FIG. 118(A), a clutch means K is provided in the second rotational member ② and between the 2nd gear train G2 and the 3rd gear train G3. In the diagram, a brake B (shown by broken lines) can be provided either on the second gear train G2 or on the third gear train G3. The first type as shown in FIG. 118(A) comprises the transmissions of the 2nd embodiment (FIG. 7), 3rd embodiment (FIG. 11), 4th embodiment (FIG. 13), 5th embodiment (FIG. 17), 6th embodiment (FIG. 19), 7th embodiment (FIG. 23), 8th embodiment (FIG. 25) and 9th embodiment (FIG. 27).

Figure 118B:
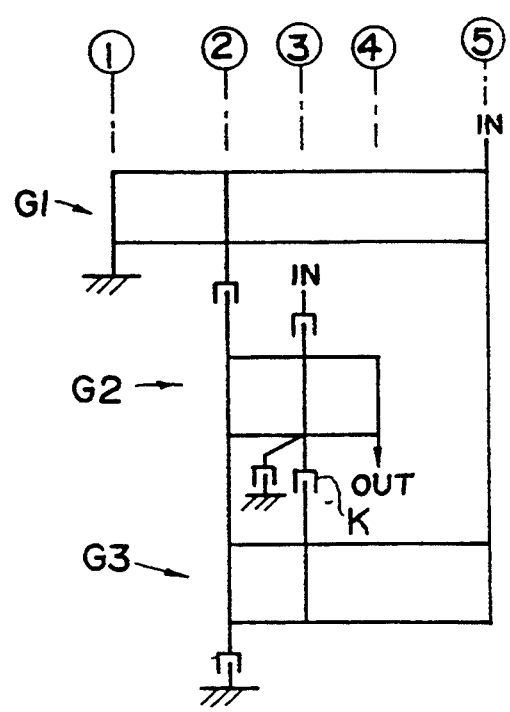

In the second type as shown in FIG. 118(B), a clutch means K is provided in the third rotational member ③ and between the 2nd gear train G2 and the 3rd gear train G3. The second type as shown in FIG. 118(B) comprises the transmissions of the 14th embodiment (FIG. 37), 15th embodiment (FIG. 39), 16th embodiment (FIG. 41), 17th embodiment (FIG. 43), 18th embodiment (FIG. 45), 19th embodiment (FIG. 47), 20th embodiment (FIG. 49) and 21st embodiment (FIG. 51).

Figure 118C:
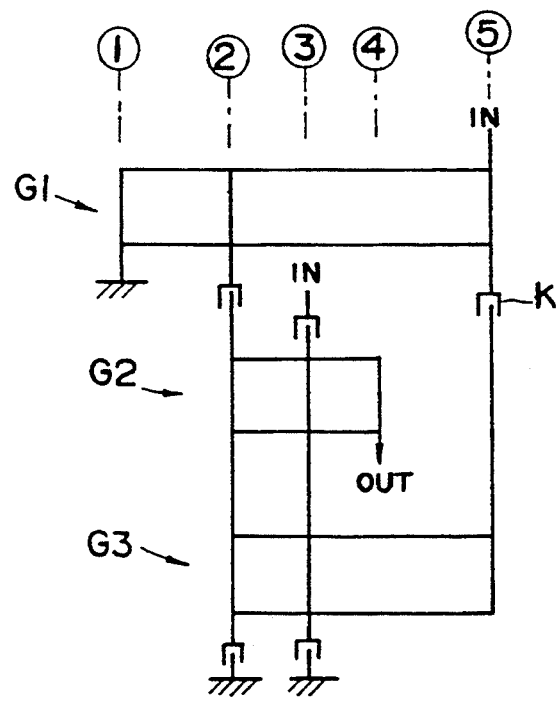

In the third type as shown in FIG. 118(C), a clutch K is provided in the fifth rotational member ⑤ and between the 1st gear train G1 and the 3rd gear train G3. The third type as shown in FIG. 118(C) comprises the transmissions of the 26th embodiment (FIG. 61), 27th embodiment (FIG. 63), 28th embodiment (FIG. 65), 29th embodiment (FIG. 67), 30th embodiment (FIG. 69), 31st embodiment (FIG. 71), 32nd embodiment (FIG. 73) and 33rd embodiment (FIG. 75).

The combination as shown in FIG. 119 is divided into two types as shown in FIG. 120 based on the position of clutch means K. In the combination of FIG. 119, the second planetary gear train G2 comprises the 2nd, 3rd and 4th rotational members ②, ③ and ④, and the third planetary gear train G3 comprises the 2nd, 4th and 5th rotational members ②, ④ and ⑤.

In the first type as shown in FIG. 120(A), a clutch K is provided in the fifth rotational member ⑤ and between the 1st gear train G1 and the third gear train G3. The first type as shown in FIG. 120(A) comprises the transmissions of the 34th embodiment (FIG. 77), 35th embodiment (FIG. 79), 36th embodiment (FIG. 81) and 37th embodiment (FIG. 83).

In the second type as shown in FIG. 120(B), a clutch K is provided in the second rotational member ② and between the 2nd gear train G2 and the 3rd gear train G3. In FIG. 120(B), a brake B (shown by broken lines) can be provided either on the second gear train G2 or on the third gear train G3. The second type as shown in FIG. 120(B) comprises the transmissions of the 10th embodiment (FIG. 29), 11th embodiment (FIG. 31), 12th embodiment (FIG. 33) and 13th embodiment (FIG. 35).

The combination as shown in FIG. 121 is divided into two types as shown in FIG. 122 based on the position of clutch K. In the combination of FIG. 121, the second planetary gear train G2 comprises the 2nd, 3rd and 4th rotational members ②, ③ and ④, and the third planetary gear train G3 comprises the 3rd, 4th and 5th rotational members ③, ④ and ⑤.

In the first type as shown in FIG. 122(A), a clutch K is provided in the 5th rotational member ⑤ and between the first gear train G1 and the third gear train G3. The first type as shown in FIG. 122(A) comprises the transmissions of the 1st embodiment (FIG. 1), 38th embodiment (FIG. 85), 39th embodiment (FIG. 87) and 40th embodiment (FIG. 89).

In the second type as shown in FIG. 122(B), a clutch K is provided in the 3rd rotational member ③ and between the second gear train G2 and the third gear train G3. The second type as shown in FIG. 122(B) comprises the transmissions of the 22nd embodiment (FIG. 53), 23rd embodiment (FIG. 55), 24th embodiment (FIG. 57) and 25th embodiment (FIG. 59).

Figures 123, 124:
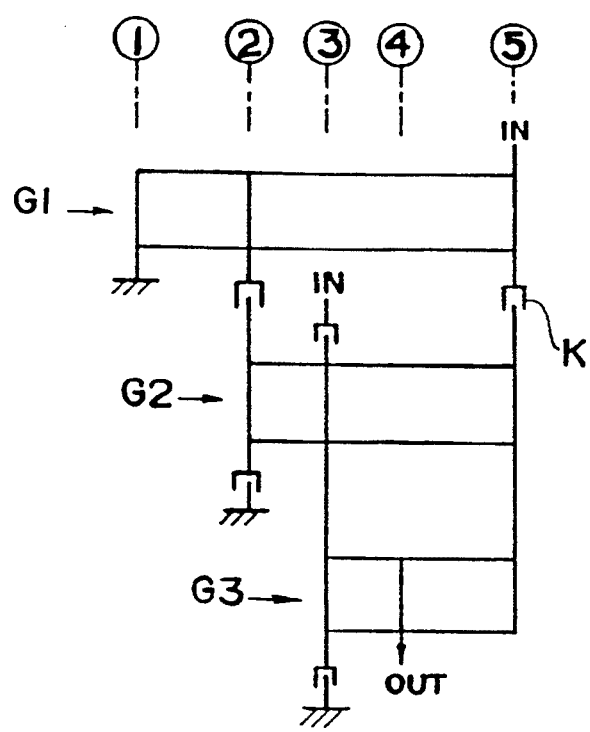

The combination as shown in FIG. 123 has one type of diagram as shown in FIG. 124. In the combination of FIG. 123, the second planetary gear train G2 comprises the 2nd, 3rd and 5th rotational members ②, ③ and ⑤, and the third planetary gear train G3 comprises the 3rd, 4th and 5th rotational members ③, ④ and ⑤. The type as shown in FIG. 124 comprises the transmissions of the 41st embodiment (FIG. 91), 42nd embodiment (FIG. 93), 43rd embodiment (FIG. 94), 44th embodiment (FIG. 96), 45th embodiment (FIG. 97), and 46th embodiment (FIG. 99).

Figures 125, 126:
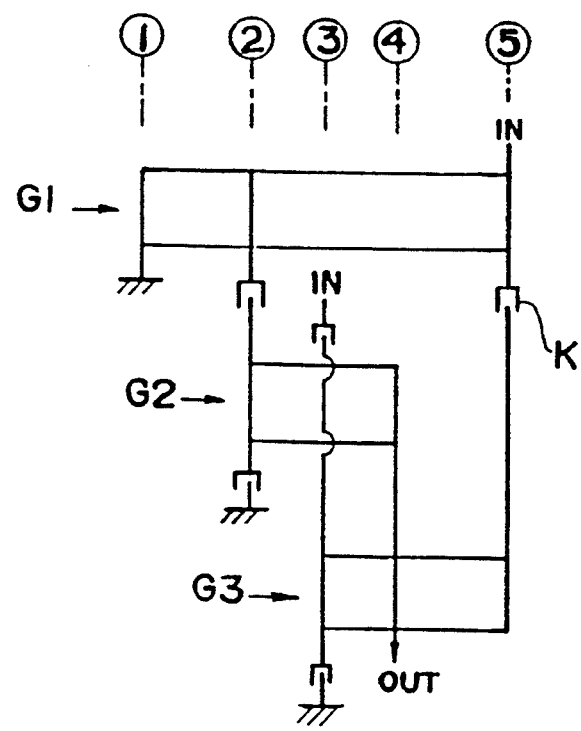

The combination as shown in FIG. 125 has one type of diagram as shown in FIG. 126. In the combination of FIG. 125, the second planetary gear train G2 comprises the 2nd, 4th and 5th rotational members ②, ④ and ⑤, and the third planetary gear train G3 comprises the 3rd, 4th and 5th rotational members ③, ④ and ⑤. The type as shown in FIG. 126 comprises the transmissions of the 47th embodiment (FIG. 101), 48th embodiment (FIG. 103), 49th embodiment (FIG. 105), 50th embodiment (FIG. 107), 51st embodiment (FIG. 109), 52nd embodiment (FIG. 111), 53rd embodiment (FIG. 113) and 54th embodiment (FIG. 115).

Although certain preferred embodiments of the present invention has been shown and described in detail, it should be understood that various changes and modifications may be made therein without departing from the scope of the appended claims.

What is claimed is:

1. A planetary gear transmission comprising:
    an input member;
    first, second, and third planetary gear trains arranged coaxially with each other and each having elements including a sun gear, a carrier, and a ring gear, two of the elements of each of said first, second, and third planetary gear trains being directly or disengageably coupled to elements of the other planetary gear trains;
    an output member;
    three clutch means and two brake means for selectively establishing a power transmitting path from said input member to said output member through said first, second, and third planetary gear trains;
    said first planetary gear train comprising a double-pinion planetary gear train, one of the sun gear and the carrier of said first planetary gear train being fixedly coupled to the input member and the other of the sun gear and the carrier of said first planetary gear train being nonrotatably fixed;
    at least one of said second and third planetary gear trains comprising a double-pinion planetary gear train; and
    said elements of the first, second, and third planetary gear trains being corotatably coupled into first, second, third, fourth, and fifth rotational members for establishing five forward speeds and one reverse speed through the transmission by selectively engaging two of said three clutch means and two brake means at a time, said third and fifth rotational members being coupled to said input member, and said fourth rotational member being coupled to said output member.

2. A planetary gear transmission according to claim 1, wherein said first and second planetary gear trains comprise double-pinion planetary gear trains, respectively, and said third planetary gear train comprises a single-pinion planetary gear train;
    the sun gear of said first planetary gear train being coupled to said input member, and the carrier of said first planetary gear train being nonrotatably fixed;
    the carrier of said first planetary gear train serving as said first rotational member;

the ring gear of said first planetary gear train and the sun gear of said second planetary gear train jointly serving as said second rotational member;

the ring gear of said second planetary gear train and the ring gear of said third planetary gear train jointly serving as said third rotational member;

the carrier of said second planetary gear train and the carrier of said third planetary gear train jointly serving as said fourth rotational member;

the sun gear of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said first planetary gear train being disengageably connected with the sun gear of said third planetary gear train through a third clutch means of the three clutch means;

The ring gear of said second planetary gear train and the ring gear of said third planetary gear train being disengageably connected with a nonrotational member through a first brake means of the two brake means; and the sun gear of said second planetary gear train being disengageably connected with the nonrotational member through a second brake means of the two brake means.

3. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of second planetary gear train being disengageably connected with the ring gear of said third planetary gear train through a third clutch means of the three clutch means;

the ring gear of said second planetary gear train and the carrier to said third planetary gear train being disengageably connected with a nonrotational member through a first brake means of the two brake means; and the sun gear of said second planetary gear train being disengageably connected with the nonrotational member through a second brake means of the two brake means.

4. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the sun gear of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the ring gear of said third planetary gear train through a third clutch means of the three clutch means;

the ring gear of said second planetary gear train and the carrier of said third planetary gear train being disengageably connected with a nonrotational member through a first brake means of the two brake means; and the sun gear of said second planetary gear train being disengageably connected with the nonrotational member through a second brake means of the two brake means.

5. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train and the carrier of said third planetary gear train jointly serving as said third rotational member;

the sun gear of said second planetary gear train serving as said fourth rotational member;

the carrier of said first planetary gear train and the sun gear of said third planetary gear train jointly serving as aid fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train through a second clutch means of the three clutch means;

the carrier of said second planetary gear train being disengageably connected with the ring gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train being disengageably connected with the nonrotational member through a second brake means of the two brake means.

6. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train and the carrier of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train through a second clutch means of the three clutch means;

the carrier of said second planetary gear train being disengageably connected with the ring gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train being disengageably connected with the nonrotational member through a second brake means of the two brake means.

7. A planetary gear transmission according to claim 1, wherein said first, second, and third planetary gear trains comprises double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train and the ring gear of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the carrier of said third planetary gear train through a third clutch means of three clutch means;

the ring gear of said second planetary gear train and the ring gear of said third planetary gear train being disengageably connected with a nonrotational member through a first brake means of the two brake means; and the sun gear of said second planetary gear train being disengageably connected with the nonrotational member through a second brake means of the two brake means.

8. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train and the carrier of said third planetary gear train jointly serving as said second rotational member;

the ring gear of said planetary gear train and the ring gear of said third planetary gear train jointly serving as said third rotational member;

the carrier of said second planetary gear train serving as said fourth rotational member;

the sun gear of said first planetary gear train and the sun gear of said third planetary gear train jointly serving as said fifth rotational member;

the ring gear of said planetary gear train and the ring gear of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the carrier of said third planetary gear train through a third clutch means of the three clutch means;

the ring gear of said second planetary gear train and the ring gear of said third planetary gear train being disengageably connected with a nonrotational member through a first brake means of the two brake means; and the sun gear of said second planetary gear train being disengageably connected with the rotational member through a second brake means of the two brake means.

9. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the carrier of said first planetary gear train and the sun gear of said third planetary gear train jointly serving as said fifth rotational member;

the ring gear of said second planetary gear train and there ring gear of said third planetary gear train being disengageably connected with the input member through a first clutch means of the three clutch means;

the ring gear of said planetary gear train being disengageably connected with the carrier of said second planetary gear train through a second clutch means of the three clutch means;

the carrier of said second planetary gear train being disengageable connected with the carrier of said third planetary gear train through a third clutch means of the three clutch means;

the ring gear of said second planetary gear train and the ring gear of said third planetary gear train being disengageably connected with a nonrotational member through a first brake means of the two brake means; and the carrier of said second planetary gear train being disengageably connected with the nonrotational member through a second brake means of the two brake means.

10. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train and the ring gear of said third planetary gear train being disengageably connected with the input member through a first clutch means of three clutch means;

the ring gear of said first planetary gear train being disengageably connected with the carrier of said second planetary gear train through a second clutch means of the three clutch means;

the carrier of said second planetary gear train being disengageably connected with the carrier of said third planetary gear train through a third clutch means of the three clutch means;

the ring gear of said second planetary gear train and the ring gear of said third planetary gear train being disengageably connected with a nonrotational member through a first brake means of the two brake means; and the carrier of said second planetary gear train being disengageably connected with the nonrotational member through a second brake means of the two brake means.

11. A planetary gear transmission according to claim 1 wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the sun gear of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the carrier of said first planetary gear train and the carrier of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the sun gear of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

12. A planetary gear transmission according to claim 1, wherein said first, second, and third planetary gear trains comprise double-pinion planetary gear trains, respectively;

the sun gear of said planetary gear train being coupled to said input member, and the carrier of said first planetary gear train being nonrotatably fixed;

the carrier of said first planetary gear train serving as said first rotational member; p1 the ring gear of said first planetary gear train, the sun gear of said second planetary gear train, and the sun gear of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the sun gear of said first planetary gear train and carrier of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the sun gear of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

13. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

14. A planetary gear transmission according to claim 1, wherein said first, second, and third planetary gear trains comprise double-pinion planetary gear trains, respectively;

the sun gear of said first planetary gear train being coupled to said input member and the carrier of said first planetary gear train being nonrotatably fixed;

the carrier of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

15. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the ring gear of said third planetary gear train through a second clutch means of the three clutch means;

the ring gear of said second planetary gear train being disengageably connected with the carrier of said third planetary gear train through a third clutch means of the three clutch means;

the ring gear of second planetary gear train being disengageably connected with nonrotational member through a first brake means of the two brake means; and the sun gear of said second planetary gear train and the ring gear of said third planetary gear train being disengageably connected with the rotational member through a second brake means of the two brake means.

16. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train, and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the ring gear of said third planetary gear train through a second clutch means of the three clutch means;

the ring gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train and the ring gear of said third planetary gear train being disengageably connected with the rotational member through a second brake means of the two brake means.

17. A planetary gear transmission according to claim 1, wherein said first and second planetary gear trains comprise double-pinion planetary gear trains, respectively, and said third planetary gear train comprises a single-pinion planetary gear trains;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train and the carrier of said third planetary gear train jointly serving as said third rotational member;

the sun gear of said second planetary gear train serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the carrier of said second planetary gear train and the ring gear of said third planetary gear train through a second clutch means of the three clutch means;

the ring gear of said second planetary gear train being disengageably connected with the carrier of said third planetary gear train through a third clutch means of the three clutch means;

the ring gear of said second planetary gear train being disengageably connected with rotational member through a first brake means of the two brake means; and the carrier of said second planetary gear train and the ring gear of said train planetary gear train being disengageably connected with the nonrotational member through a second brake means of the two brake means.

18. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train and the carrier of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the carrier of said second planetary gear train and the ring gear of said third planetary gear train through a second clutch means of the three clutch means;

the ring gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the carrier of said second planetary gear train and the ring gear of said third planetary gear train being disengageably connected with the nonrotational member through a second brake means of the two brake means.

19. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train and the ring gear of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a rotational member through a first brake means of the two brake means; and the sun gear of said second planetary gear train and the carrier of said third planetary gear train being disengageably connected with the rotational member through a second brake means of the two brake means.

20. A planetary gear transmission according to claim 1, wherein said first, second and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train the sun gear of said second planetary gear train, and the carrier of said third planetary gear train jointly serving as said second rotational member;

the ring gear of said second planetary gear train and the ring gear of said third planetary gear train jointly serving as said third rotational member;

the carrier of said second planetary gear train serving as said fourth rotational member;

the sun gear of said first planetary gear train arid the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a nonrotational member through a first brake means of the two brake means; and the sun gear of said second planetary gear train and the carrier of said third planetary gear train being disengageably connected with the nonrotational member through a second brake means of the two brake means.

21. A planetary gear transmission according to claim 1, wherein said first, second, and third planetary gear trains comprise double-pinion planetary trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the carrier of said second planetary gear train and the carrier of said third planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a nonrotational member through a first brake means of the two brake means; and the carrier of said second planetary gear train and the carrier of said third planetary gear train being disengageably connected with the nonrotational member through a second brake means of the two brake means.

22. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the carrier of said second planetary gear train and the carrier of said third planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a nonrotational member through a first brake means of the two brake means; and the carrier of said second planetary gear train and the carrier of said third planetary gear train being disengageably connected with the nonrotational member through a second brake means of the two brake means.

23. A planetary gear transmission according to claim 1, wherein said first and second planetary gear trains comprise double-pinion planetary gear trains, respectively, and said third planetary gear train comprises a single-pinion gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the ring gear of said second planetary gear train and the ring gear of said third planetary gear train jointly serving as said third rotational member;

the carrier of said second planetary gear train and the carrier of said third planetary gear train jointly serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

24. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the sun gear of said second planetary gear train jointly serving as said second rotational member;

the ring gear of said second planetary gear train and the ring gear of said third planetary gear train jointly serving as said third rotational member;

the carrier of said second planetary gear train and the carrier of said third planetary gear train jointly serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the ring gear of said second planetary gear train being disengageably connected with the ring gear of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

25. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the ring gear of said second planetary gear train and the carrier of said third planetary gear train jointly serving as said third rotational member;

the carrier of said second planetary gear train and the ring gear of said third planetary gear train jointly serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the ring gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

26. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the sun gear of said second planetary gear train jointly serving as said second rotational member;

the ring gear of said second planetary gear train and the carrier of said third planetary gear train jointly serving as said third rotational member;

the carrier of said second planetary gear train and the ring gear of said third planetary gear train jointly serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train through a second clutch means of the three clutch means;

the ring gear of said second planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train being disengageably connected with the nonrotational member through a second brake means of the two brake means.

27. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train and the ring gear of said third planetary gear train through a second clutch means of the three clutch means;

the carrier of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the sun gear of said second planetary gear train and the ring gear of said third planetary gear train being disengageably connected with the nonrotational member through a second brake means of the two brake means.

28. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train, and the ring gear of said third planetary gear train jointly serving as said second rotational member;

the ring gear of said second planetary gear train and the carrier of said third planetary gear train jointly serving as said third rotational member;

the carrier of said second planetary gear train serving as said fourth rotational member;

the sun gear of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train and the ring gear of said third planetary gear train through a second clutch means of the three clutch means;

the sun gear of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the sun gear of said second planetary gear train and the ring gear of said third planetary gear train being disengageably connected with the nonrotational member through a second brake means of the two brake means.

29. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train and the carrier of said third planetary gear train jointly serving as said third rotational member;

the sun gear of said second planetary gear train serving as said fourth rotational member;

the carrier of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train and the ring gear of said third planetary gear train through a second clutch means of the three clutch means;

the carrier of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train and the ring gear of said third planetary gear train being disengageably connected with the nonrotational member through a second brake means of the two brake means.

30. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotational fixed;

the carrier of said first planetary gear train serving as said first rotational member;

the ring gear of said first planetary gear train, the carrier of said second planetary gear train, and the ring gear of said third planetary gear train jointly serving as said second rotational member;

the ring gear of said second planetary gear train, and the carrier of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train and the ring gear of said third planetary gear train through a second clutch means of the three clutch means;

the sun gear of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train and the ring gear of said third planetary gear train being disengageably connected with the nonrotational member through a second brake means of the two brake means.

31. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train and the ring gear of said third planetary gear train jointly serving as said third rotational member;

the carrier of said second planetary gear train serving as said fourth rotational member;

the carrier of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means;

the carrier of said first planetary gear train being disengageably connected with the sun gear of said third planetary gear train through a third clutch means of the three clutch means;

the ring gear of said second planetary gear train and the ring gear of said third planetary gear train being disengageably connected with a nonrotational member through a first brake means of the two brake means; and the sun gear of said second planetary gear train and the carrier of said third planetary gear train being disengageably connected with the nonrotational member through a second brake means of the two brake means.

32. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train and the ring gear of said third planetary gear train jointly serving as said third rotational member;

the carrier of said second planetary gear train serving as said fourth rotational member;

the sun gear of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means;

the sun gear of said first planetary gear train being disengageably connected with the sun gear of said third planetary gear train through a third clutch means of the three clutch means;

the ring gear of said second planetary gear train and connected with a nonrotational member through a first brake means of the two brake means; and the sun gear of said second planetary gear train and the carrier of said third planetary gear train being disengageably connected with the nonrotational member through a second brake means of the two brake means.

33. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the carrier of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the carrier of said second planetary gear train and the carrier of said third planetary gear train through a second clutch means of the three clutch means;

the carrier of said first planetary gear train being disengageably connected with the sun gear of said third planetary gear train through a third clutch means of the three clutch means;

the ring gear of said second planetary gear train and the ring gear of said third planetary gear train being disengageably connected with a nonrotational member through a first brake means of the two brake means; and the carrier of said second planetary gear train and the carrier of said third planetary gear train being disengageably connected with the nonrotational member through a second brake means of the two brake means.

34. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the carrier of said second planetary gear train, and the carrier of said third planetary gear train jointly serving as said second rotational member;

the ring gear of said second planetary gear train and the ring gear of said third planetary gear train jointly serving as said third rotational member;

the sun gear of said second planetary gear train serving as said fourth rotational member;

the sun gear of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the carrier of said second planetary gear train and the carrier of said third planetary gear train through a second clutch means of the three clutch means;

the sun gear of said first planetary gear train being disengageably connected with the sun gear of said third planetary gear train through a third clutch means of the three clutch means;

the ring gear of said second planetary gear train and the ring gear of said third planetary gear train being disengageably connected with a nonrotational member through a first brake means of the two brake means; and the carrier of said second planetary gear train and the carrier of said third planetary gear train being disengageably connected with the nonrotational member through a second brake means of the two brake means.

35. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the sun gear of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the carrier of said first planetary gear train and the carrier of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the sun gear of said third planetary gear train through a second clutch means of the three clutch means;

the carrier of said first planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train and the sun gear of said third planetary gear train being disengageably connected with the nonrotational member through a second brake means of the two brake means.

36. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train, and the sun gear of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the sun gear of said first planetary gear train and the carrier of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the sun gear of said third planetary gear train through a second clutch means of the three clutch means;

the sun gear of said first planetary gear train being disengageably connected with the carrier of said third planetary gear train through a third clutch means of the three clutch means;

the ring gear of said second planetary gear train being disengageably connected with a nonrotational member through a first brake means of the two brake means; and the sun gear of said second planetary gear train and the sun gear of said third planetary gear train being disengageably connected with the nonrotational member through a second brake means of the two brake means.

37. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the carrier of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means;

the carrier of said first planetary gear train being disengageably connected with the sun gear of said third planetary gear train through a third clutch means of the three clutch means;

the ring gear of said second planetary gear train being disengageably connected with a nonrotational member through a first brake means of the two brake means; and the sun gear of said second planetary gear train and the carrier of said third planetary gear train being disengageably connected with the nonrotational member through a second brake means of the two brake means.

38. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train, the sun gear of said second planetary gear train, and the carrier of said third planetary gear train jointly serving as said second rotational member;

the ring gear of said second planetary gear train serving as said third rotational member;

the carrier of said second planetary gear train and the ring gear of said third planetary gear train jointly serving as said fourth rotational member;

the sun gear of said first planetary gear train and the sun gear of said third planetary gear train jointly serving as said fifth rotational member;

the ring gear of said second planetary gear train being disengageably connected with the input member through a first clutch means of the three clutch means;

the ring gear of said first planetary gear train being disengageably connected with the sun gear of said second planetary gear train and the carrier of said third planetary gear train through a second clutch means of the three clutch means; the sun gear of said first planetary gear train being disengageably connected with the sun gear of said third planetary gear train through a third clutch means of the three clutch means;

the ring gear of said second planetary gear train being disengageably connected with a nonrotational member through a first brake means of the two brake means; and the sun gear of said second planetary gear train and the carrier of said third planetary gear train being disengageably connected with the nonrotational member through a second brake means of the two brake means.

39. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the ring gear of said second planetary gear train and the ring gear of said third planetary gear train jointly serving as said third rotational member;

the carrier of said second planetary gear train and the carrier of said third planetary gear train jointly serving as said fourth rotational member;

the carrier of said first planetary gear train and the sun gear of said third planetary gear train jointly serving as said fifth rotational member;

the ring gear of said second planetary gear train and the ring gear of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said first planetary gear train being disengageably connected with the sun gear of said third planetary gear train through a third clutch means of the three clutch means;

the ring gear of said second planetary gear train and the ring gear of said third planetary gear train being disengageably connected with a nonrotational member through a first brake means of the two brake means; and the sun gear of said first planetary gear train being disengageably connected with the nonrotational member through a second brake means of the two brake means.

40. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the ring gear of said second planetary gear train and the carrier of said third planetary gear train jointly serving as said third rotational member;

the carrier of said second planetary gear train and the ring gear of said third planetary gear train jointly serving as said fourth rotational member;

the carrier of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train through a second clutch means of the three clutch means;

the carrier of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the sun gear of said second planetary gear train being disengageably connected with the nonrotational member through a second brake means of the two brake means.

41. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the sun gear of said second planetary gear train jointly serving as said second rotational member;

the ring gear of said second planetary gear train and the carrier of said third planetary gear train jointly serving as said third rotational member;

the carrier of said second planetary gear train and the ring gear of said third planetary gear train jointly serving as said fourth rotational member;

the sun gear of said first planetary gear train and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said first planetary gear train being disengageably connected with the sun gear of said third planetary gear train through a third clutch means of the three clutch means;

the ring gear of said second planetary gear train and the carrier of said third planetary gear train being disengageably connected with a nonrotational member through a first brake means of the two brake means; and the sun gear of said second planetary gear train being disengageably connected with the nonrotational member through a second brake means of the two brake means.

42. A planetary gear transmission according to claim 1, wherein said first and third planetary gear trains comprise double-pinion planetary gear trains, respectively, and said second planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the ring gear of said second planetary gear train jointly serving as said second rotational member;

the carrier of said second planetary gear train and the carrier of said third planetary gear train jointly serving as said third rotational member;

the ring gear of said third planetary gear train serving as said fourth rotational member;

the carrier of said first planetary gear train, the sun gear of said second planetary gear train, and the sun gear of said third planetary gear train jointly serving as said fifth rotational member;

the carrier of said second planetary gear train and the carrier of said third planetary gear train being disengageably connected with the input member through a first clutch means of the three clutch means;

the ring gear of said first planetary gear train being disengageably connected with the ring gear of said second planetary gear train through a second clutch means of the three clutch means;

the carrier of said first planetary gear train being disengageably connected with the sun gear of said second planetary gear train and the sun gear of said third planetary gear train through a third clutch means of the three clutch means;

the carrier of said second planetary gear train and the carrier of said third planetary gear train being disengageably connected with a nonrotational member through a first brake means of the two brake means; and the ring gear of said second planetary gear train being disengageably connected with the nonrotational member through a second brake means of the two brake means.

43. A planetary gear transmission according to claim 1, wherein said first planetary gear train comprises a double-pinion planetary gear train and said second and third planetary gear trains comprise a Ravigneaux planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the ring gear of said second planetary gear train (a Ravigneaux small ring gear) jointly serving as said second rotational member;

the carrier of said second planetary gear train and the carrier of said third planetary gear train jointly comprising a Ravigneaux carrier, and serving as said third rotational member;

the ring gear of said third planetary gear train (a Ravigneaux large ring gear) serving as said fourth rotational member;

the sun gear of said second planetary gear train and the sun gear of said third planetary gear train jointly comprising a Ravigneaux sun gear, and serving with the carrier of said first planetary gear train as said fifth rotational member;

the Ravigneaux carrier being disengageably connected with the input member through a first clutch means of the three clutch means;

the ring gear of said first planetary gear train being disengageably connected with the Ravigneaux small ring gear through a second clutch means of the three clutch means;

the carrier of said first planetary gear train being disengageably connected with the Ravigneaux sun gear through a third clutch means of the three clutch means;

the Ravigneaux carrier being disengageably connected with a nonrotational member through a first brake means of the two brake means; and the Ravigneaux small ring gear being disengageably connected with the nonrotational member through a second brake means of the two brake means.

44. A planetary gear transmission according to claim 1, wherein said first and third planetary gear trains comprise double-pinion planetary gear trains, respectively, and said second planetary gear train G2 comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the ring gear of said second planetary gear train jointly serving as said second rotational member;

the carrier of said second planetary gear train and the carrier of said third planetary gear train jointly serving as said third rotational member;

the ring gear of said third planetary gear train serving as said fourth rotational member;

the sun gear of said first planetary gear train, the sun gear of said second planetary gear train, and the sun gear of said third planetary gear train jointly serving as said fifth rotational member;

the carrier of said second planetary gear train and the carrier of said third planetary gear train being disengageably connected with the input member through a first clutch means of the three clutch means;

the ring gear of said first planetary gear train being disengageably connected with the ring gear of said second planetary gear train through a second clutch means of the three clutch means;

the sun gear of said first planetary gear train being disengageably connected with the sun gear of said second planetary gear train and the sun gear of said third planetary gear train through a third clutch means of the three clutch means;

the carrier of said second planetary gear train and the carrier of said third planetary gear train being disengageably connected with a nonrotational member through a first brake means of the two brake means; and the ring gear of said second planetary gear train being disengageably connected with the nonrotational member through a second brake means of the two brake means.

45. A planetary gear transmission according to claim 1, wherein said first planetary gear train comprises a double-pinion planetary gear train and said second and third planetary gear trains comprise a Ravigneaux planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the ring gear of said second planetary gear train (a Ravigneaux small ring gear) jointly serving as said second rotational member;

the carrier of said second planetary gear train and the carrier of said third planetary gear train jointly comprising a Ravigneaux carrier, and serving as said third rotational member;

the ring gear of said third planetary gear train (a Ravigneaux large ring gear) serving as said fourth rotational member;

the sun gear of said second planetary gear train and the sun gear of said third planetary gear train jointly comprising a Ravigneaux sun gear, and serving with the sun gear of said first planetary gear train as said fifth rotational member;

the Ravigneaux carrier being disengageably connected with the input member through a first clutch means of the three clutch means;

the ring gear of said first planetary gear train being disengageably connected with the ring gear of said second planetary gear train through a second clutch means of the three clutch means;

the sun gear of said first planetary gear train being disengageably connected with the Ravigneaux sun gear through a third clutch means of the three clutch means;

the Ravigneaux carrier being disengageably connected with the nonrotational member through a first brake means of the two brake means; and the Ravigneaux small ring gear being disengageably connected with the nonrotational member through a second brake means of the two brake means.

46. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the carrier of said second planetary gear train jointly serving as said second rotational member;

the ring gear of said second planetary gear train and the carrier of said third planetary gear train jointly serving as said third rotational member;

the ring gear of said third planetary gear train serving as said fourth rotational member;

the carrier of said first planetary gear train, the sun gear of said second planetary gear train, and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train through a second clutch means of the three clutch means;

the carrier of said first planetary gear train being disengageably connected with the sun gear of said second planetary gear train and the sun gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train being disengageably connected with the nonrotational member through a second brake means of the two brake means.

47. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the carrier of said second planetary gear train jointly serving as said second rotational member;

the ring gear of said second planetary gear train and the carrier of said third planetary gear train jointly serving as said third rotational member;

the ring gear of said third planetary gear train serving as said fourth rotational member;

the sun gear of said first planetary gear train, the sun gear of said second planetary gear train, and the sun gear of said third planetary gear train jointly serving as said fifth rotational member;

the ring gear of said second planetary gear train and the carrier of said third planetary gear train being disengageably connected with the input member through a first clutch means of the three clutch means;

the ring gear of said first planetary gear train being disengageably connected with the carrier of said second planetary gear train through a second clutch means of the three clutch means;

the sun gear of said first planetary gear train being disengageably connected with the sun gear of said second planetary gear train and the sun gear of said third planetary gear train through a third clutch means of the three clutch means;

the ring gear of said second planetary gear train and the carrier of said third planetary gear train being disengageably connected with a nonrotational member through a first brake means of the two brake means; and the carrier of said second planetary gear train being disengageably connected with the nonrotational member through a second brake means of the two brake means.

48. A planetary gear transmission according to claim 1, wherein said first and second planetary gear trains comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the ring gear of said third planetary gear train serving as said third rotational member;

the ring gear of said second planetary gear train and the carrier of said third planetary gear train jointly serving as said fourth rotational member;

the carrier of said first planetary gear train, the carrier of said second planetary gear train, and the sun gear of said third planetary gear train jointly serving as said fifth rotational member;

the ring gear of said third planetary gear train being disengageably connected with the input member through a first clutch means of the three clutch means;

the ring gear of said first planetary gear train being disengageably connected with the ring gear of said second planetary gear train through a second clutch means of the three clutch means;

the carrier of said first planetary gear train being disengageably connected with the carrier of said second planetary gear train and the sun gear of said third planetary gear train through a third clutch means of the three clutch means;

the ring gear of said third planetary gear train being disengageably connected with a nonrotational member through a first brake means of the two brake means; and the sun gear of said second planetary gear train being disengageably connected with the nonrotational member through a second brake means of the two brake means.

49. A planetary gear transmission according to claim 1, wherein said first and second planetary gear trains comprise double-pinion planetary gear trains, respectively, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the sun gear of said second planetary gear train jointly serving as said second rotational member;

the ring gear of said third planetary gear train serving as said third rotational member;

the ring gear of said second planetary gear train and the carrier of said third planetary gear train jointly serving as said fourth rotational member;

the sun gear of said first planetary gear train, the carrier of said second planetary gear train, and the sun gear of said third planetary gear train jointly serving as said fifth rotational member;

the ring gear of said third planetary gear train being disengageably connected with the input member through a first clutch means of the three clutch means;

the ring gear of said first planetary gear train being disengageably connected with the sun gear of said second planetary gear train through a second clutch means of the three clutch means;

the sun gear of said first planetary gear train being disengageably connected with the carrier of said second planetary gear train and the sun gear of said third planetary gear train through a third clutch means of the three clutch means;

the ring gear of said third planetary gear train being disengageably connected with a nonrotational member through a first brake means of the two brake means; and the sun gear of said second planetary gear train being disengageably connected with the nonrotational member through a second brake means of the two brake means.

50. A planetary gear transmission according to claim 1, wherein said first, second, and third planetary gear trains comprise double-pinion planetary gear trains, respectively;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the sun gear of said second planetary gear train jointly serving as said second rotational member;

the carrier of said third planetary gear train serving as said third rotational member;

the ring gear of said second planetary gear train and the ring gear of said third planetary gear train jointly serving as said fourth rotational member;

the carrier of said first planetary gear train, the carrier of said second planetary gear train, and the sun gear of said third planetary gear train jointly serving as said fifth rotational member;

the carrier of said third planetary gear train being disengageably connected with the input member through a first clutch means of the three clutch means;

the ring gear of said first planetary gear train being disengageably connected with the sun gear of said second planetary gear train through a second clutch means of the three clutch means;

the carrier of said first planetary gear train being disengageably connected with the carrier of said second planetary gear train and the sun gear of said third planetary gear train through a third clutch means of the three clutch means;

the carrier of said third planetary gear train being disengageably connected with a nonrotational member through a first brake means of the two brake means; and the sun gear of said second planetary gear train being disengageably connected with the nonrotational member through a second brake means of the two brake means.

51. A planetary gear transmission according to claim 1, wherein said first, second, and third planetary gear trains comprise double-pinion planetary gear trains, respectively;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the sun gear of said second planetary gear train jointly serving as said second rotational member;

the carrier of said third planetary gear train serving as said third rotational member;

the ring gear of said second planetary gear train and the ring gear of said third planetary gear train jointly serving as said fourth rotational member;

the sun gear of said first planetary gear train, the carrier of said second planetary gear train, and the sun gear of said third planetary gear train jointly serving as said fifth rotational member;

the carrier of said third planetary gear train being disengageably connected with the input member through a first clutch means of the three clutch means;

the ring gear of said first planetary gear train being disengageably connected with the sun gear of said second planetary gear train through a second clutch means of the clutch means;

the sun gear of said first planetary gear train being disengageably connected with the carrier of said second gear train and the sun gear of said third planetary gear train through a third clutch means of the three clutch the carrier of said third planetary gear train being disengageably connected with a nonrotational member through a first brake means of the two brake means; and the sun gear of said second planetary gear train being disengageably connected with the nonrotational member through second brake means of the two brake means.

52. A planetary gear transmission according to claim 1, wherein said first and second planetary gear comprise double-pinion planetary gear trains, respectively, and said third planetary gear train comprises a single-pinion planetary gear train;

the carrier of said first planetary gear train being coupled to said input member, and the sun gear of said first planetary gear train being nonrotatably fixed;

the sun gear of said first planetary gear train serving as said first rotational member;

the ring gear of said first planetary gear train and the carrier of said second planetary gear train jointly serving as said third rotational member;

the ring gear of said third planetary gear train serving as said third rotational member;

the ring gear of said second planetary gear train and the carrier of said third planetary gear train jointly serving as said fourth rotational member;

the sun gear of said first planetary gear train, the sun gear of said second planetary gear train, and the sun gear of said third planetary gear train jointly serving as said fifth rotational member;

the ring gear of said third planetary gear train being disengageably connected with the input member through a first clutch means of the three clutch means;

the ring gear of said first planetary gear train being disengageably connected with the carrier of said second gear train through a second clutch means of the three clutch means;

the carrier of said first planetary gear train being disengageably connected with the sun gear of said second planetary gear train and the sun gear of said third planetary gear train through a third clutch means of the three clutch means;

the ring gear of said third planetary gear train being disengageably connected with a nonrotational member through a first brake means of the two brake means; and the carrier of said second planetary gear train being disengageably connected with the nonrotational member through second brake means of the two brake means.

53. A planetary gear transmission according to claim 1, wherein said first and second planetary gear comprise double-pinion planetary gear trains, and said third planetary gear train comprises a single-pinion planetary gear train;

the sun gear of said first planetary gear train being coupled to said input member, and the carrier of said first planetary gear train being nonrotatably fixed;

the carrier of said first planetary gear train serving as said first rotational member;

the ring gear of said first planetary gear train and the carrier of said second planetary gear train jointly serving as said second rotational member;

the ring gear of said third planetary gear train serving as said third rotational member;

the ring gear of said second planetary gear train and the carrier of said third planetary gear train jointly serving as said fourth rotational member;

the sun gear of said first planetary gear train, the sun gear of said second planetary gear train, and the sun gear of said third planetary gear train jointly serving as said fifth rotational member;

the ring gear of said third planetary gear train being disengageably connected with the input member through a first clutch means of the three clutch means;

the ring gear of said first planetary gear train being disengageably connected with the carrier of said second gear train through a second clutch means of the three clutch means;

the sun gear of said first planetary gear train being disengageably connected with the sun gear of said second planetary gear train and the sun gear of said third planetary gear train through a third clutch means of the three clutch means;

the ring gear of said third planetary gear train being disengageably connected with a nonrotational member through a first brake means of the two brake means; and the carrier of said second planetary gear train being disengageably connected with the nonrotational member through second brake means of the two brake means.

54. A planetary gear transmission according to claim 1, wherein said first, second, and third planetary trains comprise double-pinion planetary gear trains, respectively;
- the carrier of said first planetary gear train being coupled to said input member, and the sun gear of said first planetary gear train being nonrotatably fixed;
- the sun gear of said first planetary gear train serving as said first rotational member;
- the ring gear of said first planetary gear train and the carrier of said second planetary gear train jointly serving as said second rotational member;
- the carrier of said third planetary gear train serving as said third rotational member;
- the ring gear of said second planetary gear train and the ring gear of said third planetary gear train jointly serving as said fourth rotational member;
- the carrier of said first planetary gear train, the sun gear of said second planetary gear train, and the sun gear of said third planetary gear train jointly serving as said fifth rotational member;
- the carrier of said third planetary gear train being disengageably connected with the input member through a first clutch means of the three clutch means;
- the ring gear of said first planetary gear train being disengageably connected with the carrier of said second planetary gear train through a second clutch means of the three clutch means;
- the carrier of said first planetary gear train being disengageably connected with the sun gear of said second planetary gear train and the sun gear of said third planetary gear train through a third clutch means of the three clutch means;
- the carrier of said third planetary gear train being disengageably connected with a nonrotational member through a first brake means of the two brake means; and
- the carrier of said second planetary gear train being disengageably connected with the nonrotational member through a second brake means of the two brake means.

55. A planetary gear transmission according to claim 1, wherein said first, second, and third planetary gear trains comprise double-pinion planetary gear trains, respectively;
- the sun gear of said first planetary gear train being coupled to said input member, and the carrier of said first planetary gear train being nonrotatably fixed;
- the carrier of said first planetary gear train serving as said first rotational member;
- the ring gear of said first planetary gear train and the carrier of said second planetary gear train jointly serving as said second rotational member;
- the carrier of said third planetary gear train serving as said third rotational member;
- the ring gear of said second planetary gear train and the ring gear of said third planetary gear train jointly serving as said fourth rotational member;
- the sun gear of said first planetary gear train, the sun gear of said second planetary gear train, and the sun gear of said third planetary gear train jointly serving as said fifth rotational member;
- the carrier of said third planetary gear train being disengageably connected with the input member through a first clutch means of the three clutch means;
- the ring gear of said first planetary gear train being disengageably connected with the carrier of said second planetary gear train through a second clutch means of the three clutch means;
- the sun gear of said first planetary gear train being disengageably connected with the sun gear of said second planetary gear train and the sun gear of said third planetary gear train through a third clutch means of the three clutch means;
- the carrier of said third planetary gear train being disengageably connected with a nonrotational member through a first brake means of the two brake means; and
- the carrier of said second planetary gear train being disengageably connected with the nonrotational member through a second brake means of the two brake means.

56. A planetary gear transmission comprising:
an input member;
first, second, and third planetary gear trains (G1, G2, G3) arranged coaxially with each other and each having elements including first through third sun gears (S1, S2, S3), first through third carriers (C1, C2, C3), and first through third ring gears (R1, R2, R3), respectively, two of the elements of each of said first, second, and third planetary gear trains being directly or disengageably coupled to elements of the other planetary gear trains;
an output member;
a first, a second, and a third clutch means (K1, K2, K3) and a first and a second brake means (B1, B2) for selectively establishing a power transmitting path from said input member to said output member through said first, second, and third planetary gear trains (G1, G2, G3);
said first planetary gear train (G1) comprising a double-pinion planetary gear train, one of the first sun gear (S1) and the first carrier (C1) of said first planetary gear train (G1) being firmly coupled to said input member, and the other of said first sun gear (S1) and said first carrier (C1) being firmly connected to a stationary member at all times;
at least one of said second and third planetary gear trains (G2, G3) comprising a double-pinion planetary gear train;
said second sun gear (S2) being disengageably connected to said first ring gear (R1) through said second clutch means (K2) and also being disengageably connected to the stationary member through said second brake means (B2);
said second ring gear (R2) being disengageably connected to the input member through said first clutch means (K1) and also being disengageably connected to the stationary member through said first brake means (B1); and
said second carrier (C2) being firmly connected to the output member.

57. A planetary gear transmission according to claim 56, wherein;
- the second ring gear (R2) is firmly connected to one of the third carrier (C3) and the third ring gear (R3);

the second carrier (C2) is firmly connected to the other of the third carrier (C3) and the third ring gear (R3); and said one of the first sun gear (S1) and the first carrier (C1) is disengageably connected to the third sun gear (S3) through the third clutch means (K3).

58. A planetary gear transmission according to claim 57, wherein:

the first carrier (C1) is firmly connected to the stationary member, and the first sun gear (S1) is firmly connected to the input member;

the second ring gear (R2) is firmly connected to the third ring gear (R3), and the second carrier (C2) is firmly connected to the third carrier (C3); and the first sun gear (S1) is disengageably connected to the third sun gear (S3) through the third clutch means (K3).

59. A planetary gear transmission according to claim 57, wherein:

the first sun gear (S1) is firmly connected to the stationary member, and the first carrier (C1) is firmly connected to the input member;

the second ring gear (R2) is firmly connected to the third ring gear (R3), and the second carrier (C2) is firmly connected to the third carrier (C3); and the first carrier (C1) is disengageably connected to the third sun gear (S3) through the third clutch means (K3).

60. A planetary gear transmission according to claim 57, wherein the first sun gear (S1) is firmly connected to the stationary member, and the first carrier (C1) is firmly connected to the input member;

the second ring gear (R2) is firmly connected to the third carrier (C3), and the second carrier (C2) is firmly connected to the third ring gear (R3); and the first carrier (C1) is disengageably connected to the third sun gear (S3) through the third clutch means (K3).

61. A planetary gear transmission according to claim 57, wherein the first carrier (c1) is firmly connected to the stationary member, and the first sun gear (S1) is firmly connected to the input member;

the second ring gear (R2) is firmly connected to the third carrier (C3), and the second carrier (C2) is firmly connected to the third ring gear (R3); and the first sun gear (S1) is disengageably connected to the third sun gear (S3) through the third clutch means (K3).

62. A planetary gear transmission according to claim 56, wherein the second ring gear (R2) is disengageably connected to one of the third carrier (C3) and the third ring gear (R3) through the third clutch means (K3);

the second carrier (C2) is firmly connected to the other of the third carrier (C3) and the third ring gear (R3); and said one of the first sun gear (S1) and the first carrier (C1) is firmly connected to the third sun gear (S3).

63. A planetary gear transmission according to claim 62, wherein the first carrier (C1) is firmly connected to the stationary member, and the first sun gear (S1) is firmly connected to the input member;

the second ring gear (R2) is disengageably connected to the third ring gear (R3) through the third clutch (K3), and the second carrier (C2) is firmly connected to the third carrier (C3); and the first carrier (C1) is firmly connected to the third sun gear (S3).

64. A planetary gear transmission according to claim 62, wherein the first carrier (C1) is firmly connected to the stationary member, and the first sun gear (S1) is firmly connected to the input member;

the second ring gear (R2) is disengageably connected to the third ring gear (R3) through the third clutch (K3), and the second carrier (C2) is firmly connected to the third carrier (C3); and the first sun gear (S1) is firmly connected to the third sun gear (S3).

65. A planetary gear transmission according to claim 62, wherein the first sun gear (S1) is firmly connected to the stationary member, and the first carrier (C1) is firmly connected to the input member;

the second ring gear (R2) is disengageably connected to the third carrier (C3) through the third clutch (K3), and the second carrier (C2) is firmly connected to the third ring gear (R3); and the first carrier (C1) is firmly connected to the third sun gear (S3).

66. A planetary gear transmission according to claim 62, wherein the first carrier (C1) is firmly connected to the stationary member, and the first sun gear (S1) is firmly connected to the input member;

the second ring gear (R2) is disengageably connected to the third carrier (C3) through the third clutch (K3), and the second carrier (C2) is firmly connected to the third ring gear (R3); and the first sun gear (S1) is firmly connected to the third sun gear.

67. A planetary gear transmission comprising:

an input member;

first, second, and third planetary gear trains arranged coaxially with each other and each having elements including a sun gear, a carrier, and a ring gear, two of the elements of each of said first, second, and third planetary gear trains being directly or disengageably coupled to elements of the other planetary gear trains;

an output member;

three clutch means and two brake means for selectively establishing a power transmitting path from said input member to said output member through said first, second, and third planetary gear trains;

said first and second planetary gear trains G1, G2 comprising double-pinion planetary gear trains, respectively, and said third planetary gear train G3 comprising a single-pinion planetary gear train;

the sun gear S1 of said first planetary gear train G1 being coupled to said input member 1, and the carrier C1 of said first planetary gear train G1 being nonrotatably fixed;

said elements of the first, second, and third planetary gear trains being corotatably coupled into first, second, third, fourth, and fifth rotational members;

the carrier of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the ring gear R3 of said third planetary gear train G3 jointly serving as said third rotational member;

the carrier C2 of said second planetary gear train G2 and the carrier C3 of said third planetary gear train G3 jointly serving as said fourth rotational member;

the sun gear S1 of said first planetary gear train G1 and the sun gear S3 of said third planetary gear train G3 jointly serving as said fifth rotational member; and said third and fifth rotational members being coupled to said input member, and said fourth rotational member being coupled to said output member.

68. A planetary gear transmission comprising:

an input member;

first, second, and third planetary gear trains arranged coaxially with each other and each having elements including a sun gear, a carrier, and a ring gear, two of the elements of each of the first, second, and third planetary gear trains being directly or disengageably coupled to elements of the other planetary gear trains;

an output member;

three clutch means and two brakes means for selectively establishing a power transmitting path from the input member to the output member through the first, second, and third planetary gear trains;

wherein the first and second planetary gear trains comprise double-pinion planetary gear trains, and the third planetary gear train comprises a single-pinion planetary gear train;

the sun gear of the first planetary gear train being coupled to the input member, and the carrier of the first planetary gear train being nonrotatably fixed;

at least one of the three clutch means connected between an element of one of the first, second, and third planetary gear trains and an element of another of the first, second, and third planetary gear trains for selectively connecting those two elements, the elements of the first, second, and third planetary gear trains being corotatably coupled into first, second, third, fourth, and fifth rotational members for establishing five forward speeds and one reverse speed through the transmission, the third and fifth rotational members being coupled to the input member, and the fourth rotational member being coupled to the output member;

the carrier of the first planetary gear train serving as the first rotational member;

the ring gear of the first planetary gear train and the sun gear of the second planetary gear train jointly serving as the second rotational member;

the ring gear of the second planetary gear train and the ring gear of the third planetary gear train jointly serving as the third rotational member;

the carrier of the second planetary gear train and the carrier of the third planetary gear train jointly serving as the fourth rotational member; and the sun gear of the first planetary gear train and the sun gear of the third planetary gear train jointly serving as the fifth rotational member.

69. A planetary gear transmission comprising:

an input member;

first, second, and third planetary gear trains arranged coaxially with each other and each having elements including first through third sun gears, first through third carriers, and first through third ring gears, two of the elements of each of the first, second, and third planetary gear trains being directly or disengageably coupled to elements of the other planetary gear trains;

an output member;

a first, a second, and a third clutch means and a first and a second brake means for selectively establishing a power transmitting path from the input member to the output member through the first, second, and third planetary gear trains;

the first planetary gear train comprising a double-pinion planetary gear train, one of the first sun gear and the first carrier of the first planetary gear train being firmly coupled to the input member, and the other of the first sun gear and the first carrier being firmly connected to a stationary member at all times;

the second sun gear being disengageably connected to the first ring gear through the second clutch means and also being disengageably connected to the stationary member through the second brake means;

the second ring gear being disengageably connected to the input member through the first clutch means and also being disengageably connected to the stationary member through the first brake means and also being firmly connected to one of the third carrier and the third ring gear;

the second carrier being firmly connected to the output member and also being firmly connected to the other of the third carrier and the third ring gear; and the one of the first sun gear and the first carrier is disengageably connected to the third sun gear through the third clutch means.

70. A planetary gear transmission comprising:

an input member;

first, second, and third planetary gear trains arranged coaxially with each other and each having elements including first through third sun gears, first through third carriers, and first through third ring gears, respectively, two of the elements of each of the first, second, and third planetary gear trains being directly or disengageably coupled to elements of the other planetary gear trains;

an output member;

a first, a second, and a third clutch means and a first and a second brake means for selectively establishing a power transmitting path from the input member to the output member through the first, second, and third planetary gear trains;

the first planetary gear train comprising a double-pinion planetary gear train, the first sun gear being firmly coupled to the input member, and the first carrier being firmly connected to a stationary member at all times;

the second sun gear being disengageably connected to the first ring gear through the second clutch means and also being disengageably connected to the stationary member through the second brake means;

the second ring gear being disengageably connected to the input member through the first clutch means and also being disengageably connected to the stationary member through the first brake means and also being firmly connected to the third ring gear;

the second carrier being firmly connected to the output member and also being firmly connected to the third carrier; and the first sun gear being disengageably connected to the third sun gear through the third clutch means.

71. A planetary gear transmission comprising:

an input member;

first, second, and third planetary gear trains arranged coaxially with each other and each having elements including first through third sun gears, first through third carriers, and first through third ring gears, respectively, two of the elements of each of the first, second, and third planetary gear trains being directly or disengageably coupled to elements of the other planetary gear trains;

an output member;

a first, a second, and a third clutch means and a first and a second brake means for selectively establishing a power transmitting path from the input member to the output member through the first, second, and third planetary gear trains;

the first planetary gear train comprising a double-pinion planetary gear train, the first sun gear being firmly coupled to the input member, and the first carrier being firmly connected to a stationary member at all times;

the second sun gear being disengageably connected to the first ring gear through the second clutch means and also being disengageably connected to the stationary member through the second brake means;

the second ring gear being disengageably connected to the input member through the first clutch means and also being disengageably connected to the stationary member through the first brake means and also being firmly connected to the third carrier;

the second carrier being firmly connected to the output member and also being firmly connected to the third ring gear; and the first sun gear being disengageably connected to the third sun gear through the third clutch means.

* * * * *

UNITED STATES PATENT AND TRADEMARK OFFICE
CERTIFICATE OF CORRECTION

PATENT NO. : 5,342,257
DATED : August 30, 1994
INVENTOR(S) : Hotta et al.

It is certified that error appears in the above-indentified patent and that said Letters Patent is hereby corrected as shown below:

Column 47, line 8, before "connected" insert -- the ring gear of said third planetary gear train being disengageably --.

Signed and Sealed this

Thirteenth Day of December, 1994

Attest:

BRUCE LEHMAN

*Attesting Officer*  *Commissioner of Patents and Trademarks*